(12) United States Patent
Forbes, Jr.

(10) Patent No.: US 11,263,710 B2
(45) Date of Patent: *Mar. 1, 2022

(54) SYSTEM, METHOD, AND APPARATUS FOR SETTLEMENT FOR PARTICIPATION IN AN ELECTRIC POWER GRID

(71) Applicant: Causam Enterprises, Inc., Raleigh, NC (US)

(72) Inventor: Joseph W. Forbes, Jr., Raleigh, NC (US)

(73) Assignee: CAUSAM EXCHANGE, INC., Raleigh, NC (US)

( * ) Notice: Subject to any disclaimer, the term of this patent is extended or adjusted under 35 U.S.C. 154(b) by 274 days.

This patent is subject to a terminal disclaimer.

(21) Appl. No.: 16/694,232

(22) Filed: Nov. 25, 2019

(65) Prior Publication Data
US 2020/0111177 A1    Apr. 9, 2020

Related U.S. Application Data

(63) Continuation of application No. 15/644,080, filed on Jul. 7, 2017, now Pat. No. 10,497,073, which is a
(Continued)

(51) Int. Cl.
*G06Q 50/06* (2012.01)
*G06Q 10/00* (2012.01)
(Continued)

(52) U.S. Cl.
CPC .......... *G06Q 50/06* (2013.01); *B60L 53/305* (2019.02); *B60L 53/63* (2019.02); *B60L 53/64* (2019.02);
(Continued)

(58) Field of Classification Search
CPC ........ G06Q 50/06; G06Q 10/00; G06Q 40/04; G06Q 20/14; G06Q 30/0206; G06Q 40/00;
(Continued)

(56) References Cited

U.S. PATENT DOCUMENTS

| 3,906,242 A | 9/1975 | Stevenson |
| 4,023,043 A | 5/1977 | Stevenson |

(Continued)

FOREIGN PATENT DOCUMENTS

| EP | 1729223 A2 | 12/2006 |
| EP | 2159749 A1 | 3/2010 |

(Continued)

OTHER PUBLICATIONS

Sarri, S, and N.D Hatziargyriou. "Interdependencies Between Smart Grids and Electricity Markets: European Status Quo." Mediterranean Conference on Power Generation, Transmission, Distribution and Energy Conversion (MEDPOWER 2018). Stevenage, UK: IET, 2018. 75-. Web. (Year: 2018).*

(Continued)

*Primary Examiner* — Ashford S Hayles
(74) *Attorney, Agent, or Firm* — Neo IP

(57) ABSTRACT

Systems and methods for market-based financial settlement of transactions within an electric power grid are disclosed. At least one active grid element is constructed and configured in Internet Protocol (IP)-based network communication with a settlement processor via at least one coordinator in real-time or in a predetermined timeframe. The at least one active grid element generates revenue grade metrology data based on measurement and verification for a participation of the at least one active grid element in the electric power grid. The at least one active grid element provides automated messaging to the settlement processor. The settlement pro-
(Continued)

cessor provides a market-based financial settlement message based upon the revenue grade metrology data and a kilowatt packet (KWP) unit. The KWP unit provides a quantifying market rate for monetization for any unit of kilowatts with respect to time.

20 Claims, 8 Drawing Sheets

Related U.S. Application Data continuation of application No. 14/610,181, filed on Jan. 30, 2015, now Pat. No. 9,704,206, which is a continuation of application No. 14/292,418, filed on May 30, 2014, now Pat. No. 8,996,419, which is a continuation of application No. 14/193,600, filed on Feb. 28, 2014, now Pat. No. 8,775,283, which is a continuation of application No. 14/050,325, filed on Oct. 9, 2013, now Pat. No. 8,706,583, which is a continuation of application No. 13/746,703, filed on Jan. 22, 2013, now Pat. No. 8,583,520, which is a continuation of application No. 13/659,564, filed on Oct. 24, 2012, now Pat. No. 8,849,715.

(51) Int. Cl.
| | | |
|---|---|---|
| *G06Q 20/14* | (2012.01) | |
| *G06Q 20/10* | (2012.01) | |
| *G06Q 30/04* | (2012.01) | |
| *G06Q 30/02* | (2012.01) | |
| *G06Q 40/00* | (2012.01) | |
| *G06Q 40/04* | (2012.01) | |
| *H02J 13/00* | (2006.01) | |
| *G07F 15/00* | (2006.01) | |
| *H02J 3/00* | (2006.01) | |
| *B60L 53/64* | (2019.01) | |
| *B60L 55/00* | (2019.01) | |
| *B60L 53/63* | (2019.01) | |
| *B60L 53/30* | (2019.01) | |
| *B60L 53/68* | (2019.01) | |
| *G05D 17/00* | (2006.01) | |
| *G05D 3/12* | (2006.01) | |
| *H04L 29/06* | (2006.01) | |
| *H04L 29/08* | (2006.01) | |
| *H04L 69/22* | (2022.01) | |
| *H04L 69/325* | (2022.01) | |

(52) U.S. Cl.
CPC ............... *B60L 53/68* (2019.02); *B60L 55/00* (2019.02); *G05D 3/12* (2013.01); *G05D 17/00* (2013.01); *G06Q 10/00* (2013.01); *G06Q 20/102* (2013.01); *G06Q 20/14* (2013.01); *G06Q 20/145* (2013.01); *G06Q 30/0206* (2013.01); *G06Q 30/0283* (2013.01); *G06Q 30/04* (2013.01); *G06Q 40/00* (2013.01); *G06Q 40/04* (2013.01); *G07F 15/008* (2013.01); *H02J 3/008* (2013.01); *H02J 13/0086* (2013.01); *H04L 69/22* (2013.01); *H04L 69/325* (2013.01); *H02J 2203/20* (2020.01); *Y02E 60/00* (2013.01); *Y02P 80/10* (2015.11); *Y02P 90/845* (2015.11); *Y02T 10/70* (2013.01); *Y02T 10/7072* (2013.01); *Y02T 90/12* (2013.01); *Y02T 90/14* (2013.01); *Y02T 90/16* (2013.01); *Y02T 90/167* (2013.01); *Y04S 10/126* (2013.01); *Y04S 30/14* (2013.01); *Y04S 40/128* (2013.01); *Y04S 50/10* (2013.01); *Y04S 50/12* (2013.01); *Y04S 50/14* (2013.01)

(58) Field of Classification Search
CPC .. G06Q 30/0283; G06Q 30/04; G06Q 20/102; G06Q 20/145; H02J 13/00; H02J 13/0086; H02J 3/008; H02J 2203/20; H02J 13/00034; H02J 13/00028; B60L 53/64; B60L 55/00; B60L 53/63; B60L 53/305; B60L 53/68; H04L 69/22; H04L 69/325; G07F 15/008; G05D 17/00; G05D 3/12; Y02E 60/00; Y02E 60/7869; Y02P 80/10; Y02P 90/845; Y02T 10/70; Y02T 10/7072; Y02T 90/12; Y02T 90/167; Y02T 90/16; Y02T 90/14; Y02T 90/169; Y04S 10/126; Y04S 30/14; Y04S 50/14; Y04S 40/128; Y04S 50/10; Y04S 50/12

See application file for complete search history.

(56) References Cited

U.S. PATENT DOCUMENTS

| | | |
|---|---|---|
| 4,589,075 A | 5/1986 | Buennagel |
| 4,799,059 A | 1/1989 | Grindahl et al. |
| 4,819,180 A | 4/1989 | Hedman et al. |
| 4,819,229 A | 4/1989 | Pritty et al. |
| 5,237,507 A | 8/1993 | Chasek |
| 5,361,982 A | 11/1994 | Liebl et al. |
| 5,388,101 A | 2/1995 | Dinkins |
| 5,481,546 A | 1/1996 | Dinkins |
| 5,502,339 A | 3/1996 | Hartig |
| 5,544,036 A | 8/1996 | Brown et al. |
| 5,560,022 A | 9/1996 | Dunstan et al. |
| 5,570,002 A | 10/1996 | Castleman |
| 5,592,491 A | 1/1997 | Dinkins |
| 5,640,153 A | 6/1997 | Hildebrand et al. |
| 5,644,173 A | 7/1997 | Elliason et al. |
| 5,675,503 A | 10/1997 | Moe et al. |
| 5,696,695 A | 12/1997 | Ehlers et al. |
| 5,721,936 A | 2/1998 | Kikinis et al. |
| 5,926,776 A | 7/1999 | Glorioso et al. |
| 5,973,481 A * | 10/1999 | Thompson ............... H02J 3/38 290/2 |
| 6,018,690 A | 1/2000 | Saito et al. |
| 6,078,785 A | 6/2000 | Bush |
| 6,102,487 A | 8/2000 | Oevreboe |
| 6,107,693 A | 8/2000 | Mongia et al. |
| 6,112,136 A | 8/2000 | Paul et al. |
| 6,115,580 A | 9/2000 | Chuprun et al. |
| 6,115,676 A | 9/2000 | Rector et al. |
| 6,154,859 A | 11/2000 | Norizuki et al. |
| 6,216,956 B1 | 4/2001 | Ehlers et al. |
| 6,233,327 B1 | 5/2001 | Petite |
| 6,254,009 B1 | 7/2001 | Proffitt et al. |
| 6,286,021 B1 | 9/2001 | Tran et al. |
| 6,296,612 B1 | 10/2001 | Mo et al. |
| 6,301,528 B1 | 10/2001 | Bertram et al. |
| 6,304,552 B1 | 10/2001 | Chapman et al. |
| 6,327,541 B1 | 12/2001 | Pitchford et al. |
| 6,366,217 B1 * | 4/2002 | Cunningham ......... G01D 4/004 340/870.31 |
| 6,374,101 B1 | 4/2002 | Gelbien |
| 6,437,692 B1 | 8/2002 | Petite et al. |
| 6,512,966 B2 | 1/2003 | Lof et al. |
| 6,519,509 B1 | 2/2003 | Nierlich et al. |
| 6,529,839 B1 | 3/2003 | Uggerud et al. |
| 6,535,797 B1 | 3/2003 | Bowles et al. |
| 6,577,962 B1 | 6/2003 | Afshari |
| 6,583,521 B1 | 6/2003 | Lagod et al. |
| 6,601,033 B1 | 7/2003 | Sowinski |
| 6,621,179 B1 | 9/2003 | Howard |
| 6,622,097 B2 | 9/2003 | Hunter |
| 6,622,925 B2 | 9/2003 | Carner et al. |
| 6,633,823 B2 | 10/2003 | Bartone et al. |
| 6,671,586 B2 | 12/2003 | Davis et al. |
| 6,681,154 B2 | 1/2004 | Nierlich et al. |

(56) References Cited

U.S. PATENT DOCUMENTS

| | | |
|---|---|---|
| 6,687,574 B2 | 2/2004 | Pietrowicz et al. |
| 6,732,055 B2 | 5/2004 | Bagepalli et al. |
| 6,747,368 B2 | 6/2004 | Jarrett |
| 6,778,882 B2 | 8/2004 | Spool et al. |
| 6,784,807 B2 | 8/2004 | Petite et al. |
| 6,826,267 B2 | 11/2004 | Daum et al. |
| 6,832,135 B2 | 12/2004 | Ying |
| 6,834,811 B1 | 12/2004 | Huberman et al. |
| 6,836,737 B2 | 12/2004 | Petite et al. |
| 6,850,557 B1 | 2/2005 | Gronemeyer |
| 6,862,498 B2 | 3/2005 | Davis et al. |
| 6,865,450 B2 | 3/2005 | Masticola et al. |
| 6,868,293 B1 | 3/2005 | Schurr et al. |
| 6,879,059 B2 | 4/2005 | Sleva |
| 6,891,838 B1 | 5/2005 | Petite et al. |
| 6,897,931 B2 | 5/2005 | Lee et al. |
| 6,900,556 B2 | 5/2005 | Provanzana et al. |
| 6,904,336 B2 | 6/2005 | Raines et al. |
| 6,906,617 B1 | 6/2005 | Van der Meulen |
| 6,909,942 B2 | 6/2005 | Andarawis et al. |
| 6,914,533 B2 | 7/2005 | Petite |
| 6,914,893 B2 | 7/2005 | Petite |
| 6,934,316 B2 | 8/2005 | Cornwall et al. |
| 6,944,555 B2 | 9/2005 | Blackett et al. |
| 6,961,641 B1 | 11/2005 | Forth et al. |
| 6,978,931 B2 | 12/2005 | Brobeck |
| 6,990,593 B2 | 1/2006 | Nakagawa |
| 7,003,640 B2 | 2/2006 | Mayo et al. |
| 7,019,667 B2 | 3/2006 | Petite et al. |
| 7,035,719 B2 | 4/2006 | Howard et al. |
| 7,039,532 B2 | 5/2006 | Hunter |
| 7,053,756 B2 | 5/2006 | Mollenkopf et al. |
| 7,053,767 B2 | 5/2006 | Petite et al. |
| 7,085,739 B1 | 8/2006 | Winter et al. |
| 7,088,014 B2 | 8/2006 | Nierlich et al. |
| 7,103,511 B2 | 9/2006 | Petite |
| 7,111,018 B1 | 9/2006 | Goodrich et al. |
| 7,123,994 B2 | 10/2006 | Weik et al. |
| 7,133,750 B2 | 11/2006 | Raines et al. |
| 7,141,321 B2 | 11/2006 | McArthur et al. |
| 7,142,949 B2 | 11/2006 | Brewster et al. |
| 7,177,728 B2 | 2/2007 | Gardner |
| 7,181,320 B2 | 2/2007 | Whiffen et al. |
| 7,184,861 B2 | 2/2007 | Petite |
| 7,200,134 B2 | 4/2007 | Proctor et al. |
| 7,206,350 B2 | 4/2007 | Korobkov et al. |
| 7,206,670 B2 | 4/2007 | Pimputkar et al. |
| 7,209,804 B2 | 4/2007 | Curt et al. |
| 7,209,840 B2 | 4/2007 | Petite et al. |
| 7,233,843 B2 | 6/2007 | Budhraja et al. |
| 7,263,073 B2 | 8/2007 | Petite et al. |
| 7,263,450 B2 | 8/2007 | Hunter |
| 7,274,975 B2 | 9/2007 | Miller |
| 7,282,921 B2 | 10/2007 | Sela et al. |
| 7,289,887 B2 | 10/2007 | Rodgers |
| 7,295,128 B2 | 11/2007 | Petite |
| 7,305,282 B2 | 12/2007 | Chen |
| 7,313,465 B1 | 12/2007 | O'Donnell |
| 7,337,153 B2 | 2/2008 | Peljto et al. |
| 7,343,341 B2 | 3/2008 | Sandor et al. |
| 7,345,998 B2 | 3/2008 | Cregg et al. |
| 7,346,463 B2 | 3/2008 | Petite et al. |
| 7,366,164 B1 | 4/2008 | Habib et al. |
| 7,397,907 B2 | 7/2008 | Petite |
| 7,406,364 B2 | 7/2008 | Rissanen et al. |
| 7,412,304 B2 | 8/2008 | Uenou |
| 7,424,268 B2 | 9/2008 | Diener et al. |
| 7,424,527 B2 | 9/2008 | Petite |
| 7,440,871 B2 | 10/2008 | McConnell et al. |
| 7,451,019 B2 | 11/2008 | Rodgers |
| 7,468,661 B2 | 12/2008 | Petite et al. |
| 7,480,501 B2 | 1/2009 | Petite |
| 7,486,681 B2 | 2/2009 | Weber |
| 7,502,698 B2 | 3/2009 | Uenou et al. |
| 7,528,503 B2 | 5/2009 | Rognli et al. |
| 7,536,240 B2 | 5/2009 | McIntyre et al. |
| 7,541,941 B2 | 6/2009 | Bogolea et al. |
| 7,565,227 B2 | 7/2009 | Richard et al. |
| 7,609,158 B2 | 10/2009 | Banting et al. |
| 7,650,425 B2 | 1/2010 | Davis et al. |
| 7,697,492 B2 | 4/2010 | Petite |
| 7,711,796 B2 | 5/2010 | Gutt et al. |
| 7,715,951 B2 | 5/2010 | Forbes et al. |
| 7,738,999 B2 | 6/2010 | Petite |
| 7,739,378 B2 | 6/2010 | Petite |
| 7,747,165 B2 | 6/2010 | Emery et al. |
| 7,844,370 B2 | 11/2010 | Pollack et al. |
| 7,890,436 B2 | 2/2011 | Kremen |
| 7,925,552 B2 | 4/2011 | Tarbell et al. |
| 7,940,901 B2 | 5/2011 | Paraskevakos et al. |
| 7,949,435 B2 | 5/2011 | Pollack et al. |
| 8,010,812 B2 | 8/2011 | Forbes et al. |
| 8,032,233 B2 | 10/2011 | Forbes et al. |
| 8,032,461 B2 | 10/2011 | Winter et al. |
| 8,045,660 B1 | 10/2011 | Gupta |
| 8,060,259 B2 | 11/2011 | Budhraja et al. |
| 8,068,938 B2 | 11/2011 | Fujita |
| 8,095,233 B1 | 1/2012 | Shankar et al. |
| 8,145,361 B2 | 3/2012 | Forbes et al. |
| 8,260,468 B2 | 9/2012 | Ippolito et al. |
| 8,260,470 B2 | 9/2012 | Forbes et al. |
| 8,305,215 B2 | 11/2012 | Markhovsky et al. |
| 8,307,225 B2 | 11/2012 | Forbes et al. |
| 8,311,483 B2 | 11/2012 | Tillman et al. |
| 8,315,717 B2 | 11/2012 | Forbes et al. |
| 8,315,743 B2 | 11/2012 | Sackman et al. |
| 8,359,124 B2 | 1/2013 | Zhou et al. |
| 8,359,215 B1 | 1/2013 | Robbins et al. |
| 8,364,609 B2 * | 1/2013 | Ozog .................. H02J 13/0006 705/412 |
| 8,407,252 B2 | 3/2013 | Bennett et al. |
| 8,417,569 B2 | 4/2013 | Gross |
| 8,428,752 B2 | 4/2013 | Bennett et al. |
| 8,442,917 B1 | 5/2013 | Burke |
| 8,457,802 B1 | 6/2013 | Steven et al. |
| 8,467,353 B2 | 6/2013 | Proctor |
| 8,473,111 B1 | 6/2013 | Shankar et al. |
| 8,521,337 B1 | 8/2013 | Johnson |
| 8,565,811 B2 | 10/2013 | Tan et al. |
| 8,571,930 B1 | 10/2013 | Galperin |
| 8,583,520 B1 * | 11/2013 | Forbes, Jr. ............ B60L 53/305 705/34 |
| 8,583,799 B2 | 11/2013 | Podila |
| 8,588,991 B1 | 11/2013 | Forbes |
| 8,639,392 B2 | 1/2014 | Chassin |
| 8,684,266 B2 | 4/2014 | Bennett et al. |
| 8,704,678 B2 | 4/2014 | Wang et al. |
| 8,761,051 B2 | 6/2014 | Brisebois et al. |
| 8,761,952 B2 | 6/2014 | Forbes |
| 8,818,283 B2 | 8/2014 | McHenry et al. |
| 10,295,969 B2 | 5/2019 | Forbes, Jr. |
| 2001/0030468 A1 | 10/2001 | Anderson et al. |
| 2001/0038343 A1 | 11/2001 | Meyer et al. |
| 2002/0019758 A1 * | 2/2002 | Scarpelli ............ G06Q 30/0605 705/26.2 |
| 2002/0019802 A1 * | 2/2002 | Malme .................. G06Q 40/04 705/37 |
| 2002/0035496 A1 | 3/2002 | Fukushima et al. |
| 2002/0036430 A1 | 3/2002 | Welches et al. |
| 2002/0084655 A1 | 7/2002 | Lof et al. |
| 2002/0091626 A1 | 7/2002 | Johnson et al. |
| 2002/0109607 A1 | 8/2002 | Cumeralto et al. |
| 2002/0138176 A1 | 9/2002 | Davis et al. |
| 2002/0143693 A1 | 10/2002 | Soestbergen et al. |
| 2002/0161648 A1 | 10/2002 | Mason et al. |
| 2002/0198629 A1 * | 12/2002 | Ellis ..................... G06Q 50/06 700/286 |
| 2003/0006613 A1 | 1/2003 | Lof et al. |
| 2003/0009705 A1 | 1/2003 | Thelander et al. |
| 2003/0036820 A1 | 2/2003 | Yellepeddy et al. |
| 2003/0074244 A1 | 4/2003 | Braxton |
| 2003/0083980 A1 | 5/2003 | Satake |
| 2003/0144864 A1 | 7/2003 | Mazzarella |
| 2003/0149937 A1 | 8/2003 | McElfresh et al. |

(56) References Cited

U.S. PATENT DOCUMENTS

| | | |
|---|---|---|
| 2003/0160595 A1 | 8/2003 | Provanzana et al. |
| 2003/0167178 A1 | 9/2003 | Jarman et al. |
| 2003/0171851 A1 | 9/2003 | Brickfield et al. |
| 2003/0176952 A1 | 9/2003 | Collins |
| 2003/0198304 A1 | 10/2003 | Sugar et al. |
| 2003/0204756 A1 | 10/2003 | Ransom et al. |
| 2003/0220864 A1 | 11/2003 | Peljto et al. |
| 2003/0225483 A1 | 12/2003 | Santinato et al. |
| 2003/0229572 A1 | 12/2003 | Raines et al. |
| 2003/0233201 A1 | 12/2003 | Horst et al. |
| 2004/0006439 A1 | 1/2004 | Hunter |
| 2004/0024483 A1* | 2/2004 | Holcombe ............ G06Q 30/02 700/122 |
| 2004/0044571 A1 | 3/2004 | Bronnimann et al. |
| 2004/0088083 A1 | 5/2004 | Davis et al. |
| 2004/0095237 A1 | 5/2004 | Chen et al. |
| 2004/0107025 A1* | 6/2004 | Ransom ................ G06Q 50/06 700/286 |
| 2004/0117330 A1 | 6/2004 | Ehlers et al. |
| 2004/0128266 A1 | 7/2004 | Yellepeddy et al. |
| 2004/0138834 A1 | 7/2004 | Blackett et al. |
| 2004/0153170 A1 | 8/2004 | Santacatterina et al. |
| 2004/0158417 A1 | 8/2004 | Bonet |
| 2004/0158478 A1 | 8/2004 | Zimmerman |
| 2004/0162793 A1 | 8/2004 | Scott et al. |
| 2004/0193329 A1 | 9/2004 | Ransom et al. |
| 2004/0203826 A1 | 10/2004 | Sugar et al. |
| 2004/0206813 A1 | 10/2004 | Brobeck |
| 2004/0225514 A1* | 11/2004 | Greenshields ......... G06Q 40/00 705/35 |
| 2004/0230533 A1 | 11/2004 | Benco |
| 2005/0021397 A1 | 1/2005 | Cui et al. |
| 2005/0033481 A1 | 2/2005 | Budhraja et al. |
| 2005/0055432 A1 | 3/2005 | Rodgers |
| 2005/0065742 A1 | 3/2005 | Rodgers |
| 2005/0080772 A1 | 4/2005 | Bem |
| 2005/0096856 A1 | 5/2005 | Lubkeman et al. |
| 2005/0096857 A1 | 5/2005 | Hunter |
| 2005/0096979 A1 | 5/2005 | Koningstein |
| 2005/0097204 A1 | 5/2005 | Horowitz et al. |
| 2005/0125243 A1 | 6/2005 | Villalobos |
| 2005/0127680 A1* | 6/2005 | Lof .......................... F03D 9/257 290/44 |
| 2005/0131583 A1 | 6/2005 | Ransom |
| 2005/0138432 A1 | 6/2005 | Ransom et al. |
| 2005/0144437 A1 | 6/2005 | Ransom et al. |
| 2005/0192711 A1 | 9/2005 | Raines et al. |
| 2005/0192713 A1 | 9/2005 | Weik et al. |
| 2005/0197742 A1 | 9/2005 | Scott et al. |
| 2005/0216302 A1 | 9/2005 | Raji et al. |
| 2005/0216580 A1 | 9/2005 | Raji et al. |
| 2005/0227625 A1 | 10/2005 | Diener |
| 2005/0234600 A1 | 10/2005 | Boucher et al. |
| 2005/0240314 A1 | 10/2005 | Martinez |
| 2005/0240315 A1 | 10/2005 | Booth et al. |
| 2005/0246190 A1 | 11/2005 | Sandor et al. |
| 2005/0267642 A1 | 12/2005 | Whiffen et al. |
| 2005/0276222 A1 | 12/2005 | Kumar et al. |
| 2005/0288954 A1 | 12/2005 | McCarthy et al. |
| 2006/0020544 A1 | 1/2006 | Kaveski |
| 2006/0020596 A1 | 1/2006 | Liu et al. |
| 2006/0022841 A1 | 2/2006 | Hoiness et al. |
| 2006/0025891 A1 | 2/2006 | Budike |
| 2006/0031934 A1 | 2/2006 | Kriegel |
| 2006/0038672 A1 | 2/2006 | Schoettle |
| 2006/0064205 A1 | 3/2006 | Ying |
| 2006/0069616 A1 | 3/2006 | Bau |
| 2006/0106635 A1 | 5/2006 | Ulrich et al. |
| 2006/0119368 A1 | 6/2006 | Sela et al. |
| 2006/0142900 A1 | 6/2006 | Rothman et al. |
| 2006/0142961 A1 | 6/2006 | Johnson et al. |
| 2006/0161310 A1 | 7/2006 | Lal |
| 2006/0161450 A1 | 7/2006 | Carey et al. |
| 2006/0168191 A1 | 7/2006 | Ives |
| 2006/0190354 A1 | 8/2006 | Meisel et al. |
| 2006/0195334 A1 | 8/2006 | Reeb et al. |
| 2006/0212350 A1 | 9/2006 | Ellis et al. |
| 2006/0224615 A1 | 10/2006 | Korn et al. |
| 2006/0241244 A1 | 10/2006 | Soeda et al. |
| 2006/0241314 A1 | 10/2006 | Sullivan et al. |
| 2006/0271244 A1 | 11/2006 | Cumming et al. |
| 2006/0271314 A1 | 11/2006 | Hayes |
| 2006/0276938 A1 | 12/2006 | Miller |
| 2006/0282328 A1 | 12/2006 | Gerace et al. |
| 2007/0021874 A1 | 1/2007 | Rognli et al. |
| 2007/0026857 A1 | 2/2007 | Kotzin |
| 2007/0038563 A1 | 2/2007 | Ryzerski |
| 2007/0058453 A1 | 3/2007 | Shaffer et al. |
| 2007/0058629 A1 | 3/2007 | Luft |
| 2007/0067132 A1 | 3/2007 | Tziouvaras et al. |
| 2007/0070895 A1 | 3/2007 | Narvaez |
| 2007/0085702 A1 | 4/2007 | Walters et al. |
| 2007/0091900 A1 | 4/2007 | Asthana et al. |
| 2007/0100503 A1 | 5/2007 | Balan et al. |
| 2007/0100961 A1 | 5/2007 | Moore |
| 2007/0124026 A1 | 5/2007 | Troxell et al. |
| 2007/0150353 A1 | 6/2007 | Krassner et al. |
| 2007/0156621 A1 | 7/2007 | Wright et al. |
| 2007/0156887 A1 | 7/2007 | Wright et al. |
| 2007/0174114 A1 | 7/2007 | Bigby et al. |
| 2007/0192333 A1 | 8/2007 | Ali |
| 2007/0203722 A1 | 8/2007 | Richards et al. |
| 2007/0204176 A1 | 8/2007 | Shaffer et al. |
| 2007/0213878 A1 | 9/2007 | Chen |
| 2007/0214118 A1 | 9/2007 | Schoen et al. |
| 2007/0214132 A1 | 9/2007 | Grubb et al. |
| 2007/0255457 A1 | 11/2007 | Whitcomb et al. |
| 2007/0260540 A1* | 11/2007 | Chau .................... G06Q 20/102 705/40 |
| 2007/0276547 A1 | 11/2007 | Miller |
| 2007/0286210 A1 | 12/2007 | Gutt et al. |
| 2007/0291644 A1 | 12/2007 | Roberts et al. |
| 2007/0293171 A1 | 12/2007 | Li et al. |
| 2007/0299562 A1 | 12/2007 | Kates |
| 2008/0010212 A1 | 1/2008 | Moore et al. |
| 2008/0015976 A1 | 1/2008 | Sandor et al. |
| 2008/0039979 A1 | 2/2008 | Bridges et al. |
| 2008/0039980 A1 | 2/2008 | Pollack et al. |
| 2008/0039989 A1 | 2/2008 | Pollack et al. |
| 2008/0040223 A1 | 2/2008 | Bridges et al. |
| 2008/0040295 A1 | 2/2008 | Kaplan et al. |
| 2008/0040296 A1 | 2/2008 | Bridges et al. |
| 2008/0040479 A1 | 2/2008 | Bridge et al. |
| 2008/0046387 A1 | 2/2008 | Gopal et al. |
| 2008/0052145 A1 | 2/2008 | Kaplan et al. |
| 2008/0091580 A1 | 4/2008 | Kremen |
| 2008/0091581 A1 | 4/2008 | Kremen |
| 2008/0091590 A1 | 4/2008 | Kremen |
| 2008/0091625 A1 | 4/2008 | Kremen |
| 2008/0091626 A1 | 4/2008 | Kremen |
| 2008/0104026 A1 | 5/2008 | Koran |
| 2008/0109387 A1* | 5/2008 | Deaver ............ G01R 19/16547 705/412 |
| 2008/0130673 A1 | 6/2008 | Cregg et al. |
| 2008/0133604 A1 | 6/2008 | Kim |
| 2008/0147465 A1 | 6/2008 | Raines et al. |
| 2008/0154801 A1 | 6/2008 | Fein et al. |
| 2008/0165714 A1 | 7/2008 | Dettinger et al. |
| 2008/0172312 A1 | 7/2008 | Synesiou et al. |
| 2008/0177423 A1 | 7/2008 | Brickfield et al. |
| 2008/0177678 A1* | 7/2008 | Di Martini ............ G01D 4/002 705/412 |
| 2008/0186202 A1 | 8/2008 | Vaswani et al. |
| 2008/0195462 A1 | 8/2008 | Magdon-Ismail et al. |
| 2008/0209117 A1 | 8/2008 | Kajigaya |
| 2008/0224892 A1 | 9/2008 | Bogolea et al. |
| 2008/0231114 A1 | 9/2008 | Tolnar et al. |
| 2008/0238710 A1 | 10/2008 | Tolnar et al. |
| 2008/0249832 A1 | 10/2008 | Richardson et al. |
| 2008/0255899 A1 | 10/2008 | McConnell et al. |
| 2008/0263025 A1 | 10/2008 | Koran |
| 2008/0270223 A1 | 10/2008 | Collins et al. |
| 2008/0272934 A1 | 11/2008 | Wang et al. |
| 2008/0281473 A1 | 11/2008 | Pitt |

(56) References Cited

U.S. PATENT DOCUMENTS

| | | |
|---|---|---|
| 2008/0306824 A1 | 12/2008 | Parkinson |
| 2008/0306830 A1 | 12/2008 | Lasa et al. |
| 2008/0313632 A1 | 12/2008 | Kumar et al. |
| 2008/0319893 A1* | 12/2008 | Mashinsky ........ G06Q 10/06313 705/37 |
| 2009/0012996 A1 | 1/2009 | Gupta et al. |
| 2009/0018884 A1 | 1/2009 | McConnell et al. |
| 2009/0024718 A1 | 1/2009 | Anagnostopoulos et al. |
| 2009/0040029 A1 | 2/2009 | Bridges et al. |
| 2009/0043519 A1 | 2/2009 | Bridges et al. |
| 2009/0043520 A1 | 2/2009 | Pollack et al. |
| 2009/0045804 A1 | 2/2009 | Durling et al. |
| 2009/0046625 A1 | 2/2009 | Diener et al. |
| 2009/0055031 A1 | 2/2009 | Slota et al. |
| 2009/0055032 A1 | 2/2009 | Rodgers |
| 2009/0062970 A1 | 3/2009 | Forbes et al. |
| 2009/0063228 A1 | 3/2009 | Forbes |
| 2009/0063680 A1 | 3/2009 | Bridges et al. |
| 2009/0066287 A1 | 3/2009 | Pollack et al. |
| 2009/0088907 A1* | 4/2009 | Lewis ..................... H04Q 9/00 700/286 |
| 2009/0111463 A1 | 4/2009 | Simms et al. |
| 2009/0112701 A1 | 4/2009 | Turpin |
| 2009/0112758 A1 | 4/2009 | Herzig |
| 2009/0119039 A1 | 5/2009 | Banister et al. |
| 2009/0124241 A1 | 5/2009 | Krishnaswamy et al. |
| 2009/0125462 A1 | 5/2009 | Krishnaswamy et al. |
| 2009/0135836 A1 | 5/2009 | Veillette |
| 2009/0138362 A1 | 5/2009 | Schroedl et al. |
| 2009/0157529 A1 | 6/2009 | Ehlers et al. |
| 2009/0157545 A1 | 6/2009 | Mobley |
| 2009/0177548 A1 | 7/2009 | Eisenlohr |
| 2009/0187284 A1 | 7/2009 | Kreiss et al. |
| 2009/0187344 A1* | 7/2009 | Brancaccio ........ G01R 19/2513 702/4 |
| 2009/0187499 A1 | 7/2009 | Mulder et al. |
| 2009/0195349 A1 | 8/2009 | Frader-Thompson et al. |
| 2009/0198384 A1* | 8/2009 | Ahn .................. H02J 13/00016 700/292 |
| 2009/0200988 A1 | 8/2009 | Bridges et al. |
| 2009/0207950 A1 | 8/2009 | Tsuruta et al. |
| 2009/0228335 A1 | 9/2009 | Niyogi et al. |
| 2009/0240381 A1 | 9/2009 | Lane |
| 2009/0240677 A1 | 9/2009 | Parekh et al. |
| 2009/0281673 A1 | 11/2009 | Taft |
| 2009/0281674 A1 | 11/2009 | Taft |
| 2009/0313034 A1 | 12/2009 | Ferro et al. |
| 2009/0313103 A1 | 12/2009 | Ambrosio et al. |
| 2009/0319415 A1* | 12/2009 | Stoilov .................. G06Q 40/04 705/37 |
| 2009/0326726 A1 | 12/2009 | Ippolito et al. |
| 2010/0023337 A1 | 1/2010 | Case |
| 2010/0076835 A1* | 3/2010 | Silverman .............. G06Q 30/02 705/14.33 |
| 2010/0094981 A1 | 4/2010 | Cordray et al. |
| 2010/0100250 A1 | 4/2010 | Budhraja et al. |
| 2010/0106332 A1 | 4/2010 | Chassin et al. |
| 2010/0106342 A1 | 4/2010 | Ko et al. |
| 2010/0106575 A1 | 4/2010 | Bixby |
| 2010/0106641 A1 | 4/2010 | Chassin et al. |
| 2010/0138452 A1 | 6/2010 | Henkin et al. |
| 2010/0146599 A1 | 6/2010 | Padmanabha et al. |
| 2010/0163634 A1 | 7/2010 | Klein et al. |
| 2010/0164749 A1 | 7/2010 | Hope et al. |
| 2010/0169175 A1 | 7/2010 | Koran |
| 2010/0179862 A1 | 7/2010 | Chassin et al. |
| 2010/0191862 A1 | 7/2010 | Forbes et al. |
| 2010/0198535 A1 | 8/2010 | Brown et al. |
| 2010/0217452 A1* | 8/2010 | McCord ................ G06Q 50/06 700/295 |
| 2010/0217549 A1 | 8/2010 | Galvin et al. |
| 2010/0217550 A1* | 8/2010 | Crabtree .......... H02J 13/00034 702/62 |
| 2010/0217642 A1* | 8/2010 | Crubtree ................ G06Q 10/00 705/7.12 |
| 2010/0218108 A1* | 8/2010 | Crabtree ................ G06Q 50/06 715/738 |
| 2010/0228601 A1 | 9/2010 | Vaswani et al. |
| 2010/0235008 A1 | 9/2010 | Forbes et al. |
| 2010/0250590 A1 | 9/2010 | Galvin |
| 2010/0255794 A1 | 10/2010 | Agnew |
| 2010/0259998 A1 | 10/2010 | Kwon et al. |
| 2010/0274407 A1 | 10/2010 | Creed |
| 2010/0293045 A1* | 11/2010 | Burns ................ G06Q 30/0208 705/14.11 |
| 2010/0306033 A1* | 12/2010 | Oved .................. G07F 17/0014 705/7.37 |
| 2010/0324748 A1 | 12/2010 | Voysey |
| 2010/0325719 A1 | 12/2010 | Etchegoyen |
| 2010/0328849 A1 | 12/2010 | Ewing et al. |
| 2010/0332373 A1* | 12/2010 | Crabtree ................ G06Q 40/04 705/37 |
| 2011/0007824 A1 | 1/2011 | Bridges et al. |
| 2011/0010016 A1 | 1/2011 | Giroti |
| 2011/0015799 A1 | 1/2011 | Pollack et al. |
| 2011/0022242 A1 | 1/2011 | Bukhin et al. |
| 2011/0025556 A1* | 2/2011 | Bridges ................ B60L 53/665 342/357.25 |
| 2011/0029655 A1 | 2/2011 | Forbes et al. |
| 2011/0040666 A1 | 2/2011 | Crabtree et al. |
| 2011/0055036 A1* | 3/2011 | Helfan ................ G06Q 50/06 705/26.1 |
| 2011/0060474 A1* | 3/2011 | Schmiegel ............. H02J 3/466 700/291 |
| 2011/0060476 A1 | 3/2011 | Iino et al. |
| 2011/0080044 A1* | 4/2011 | Schmiegel ............. H02J 3/383 307/23 |
| 2011/0090939 A1 | 4/2011 | Diener et al. |
| 2011/0106321 A1 | 5/2011 | Cherian et al. |
| 2011/0106729 A1 | 5/2011 | Billingsley et al. |
| 2011/0115302 A1 | 5/2011 | Slota et al. |
| 2011/0130982 A1 | 6/2011 | Haag et al. |
| 2011/0133655 A1 | 6/2011 | Recker et al. |
| 2011/0145061 A1 | 6/2011 | Spurr et al. |
| 2011/0161250 A1* | 6/2011 | Koeppel ................ G06Q 10/04 705/412 |
| 2011/0172837 A1 | 7/2011 | Forbes, Jr. |
| 2011/0172841 A1 | 7/2011 | Forbes, Jr. |
| 2011/0185303 A1* | 7/2011 | Katagi ................ G06Q 10/06 715/771 |
| 2011/0196546 A1 | 8/2011 | Muller et al. |
| 2011/0196547 A1 | 8/2011 | Park et al. |
| 2011/0202418 A1 | 8/2011 | Kempton et al. |
| 2011/0204717 A1 | 8/2011 | Shaffer |
| 2011/0204719 A1 | 8/2011 | Sackman et al. |
| 2011/0208365 A1 | 8/2011 | Miller |
| 2011/0208366 A1 | 8/2011 | Taft |
| 2011/0208367 A1 | 8/2011 | Sackman et al. |
| 2011/0231028 A1 | 9/2011 | Ozog |
| 2011/0235656 A1* | 9/2011 | Pigeon ................ H04L 61/6022 370/475 |
| 2011/0251730 A1 | 10/2011 | Pitt |
| 2011/0254269 A1 | 10/2011 | Kaiser |
| 2011/0257809 A1 | 10/2011 | Forbes et al. |
| 2011/0258022 A1 | 10/2011 | Forbes et al. |
| 2011/0267202 A1 | 11/2011 | Efthymiou et al. |
| 2011/0270454 A1 | 11/2011 | Kreiss et al. |
| 2011/0270457 A1 | 11/2011 | Kreiss et al. |
| 2011/0270550 A1 | 11/2011 | Kreiss et al. |
| 2011/0270682 A1 | 11/2011 | Valin |
| 2011/0282511 A1 | 11/2011 | Unetich |
| 2011/0288905 A1 | 11/2011 | Mrakas |
| 2012/0004872 A1 | 1/2012 | Oh et al. |
| 2012/0029720 A1 | 2/2012 | Cherian et al. |
| 2012/0029897 A1 | 2/2012 | Cherian et al. |
| 2012/0059532 A1 | 3/2012 | Reifenhaeuser et al. |
| 2012/0078427 A1 | 3/2012 | Jang et al. |
| 2012/0089263 A1 | 4/2012 | Park et al. |
| 2012/0095830 A1 | 4/2012 | Contreras Delpiano et al. |
| 2012/0095841 A1 | 4/2012 | Luckerman et al. |
| 2012/0101652 A1 | 4/2012 | Shin et al. |

(56) References Cited

U.S. PATENT DOCUMENTS

| | | |
|---|---|---|
| 2012/0131100 A1 | 5/2012 | Van Olst et al. |
| 2012/0146799 A1 | 6/2012 | Bell et al. |
| 2012/0153888 A1 | 6/2012 | Jung |
| 2012/0154171 A1 | 6/2012 | Hurri et al. |
| 2012/0196482 A1 | 8/2012 | Stokoe |
| 2012/0205977 A1* | 8/2012 | Shin ............... G06Q 30/06 307/26 |
| 2012/0221162 A1 | 8/2012 | Forbes |
| 2012/0223840 A1* | 9/2012 | Guymon ............... H04B 3/54 340/870.02 |
| 2012/0226384 A1 | 9/2012 | Forbes |
| 2012/0230214 A1 | 9/2012 | Kozisek et al. |
| 2012/0232816 A1* | 9/2012 | Oh ............... G06Q 50/06 702/62 |
| 2012/0239218 A1 | 9/2012 | Forbes |
| 2012/0245753 A1 | 9/2012 | Forbes |
| 2012/0246392 A1 | 9/2012 | Cheon |
| 2012/0253540 A1 | 10/2012 | Coyne et al. |
| 2012/0259760 A1* | 10/2012 | Sgouridis ............ G06Q 30/0603 705/37 |
| 2012/0282942 A1 | 11/2012 | Uusitalo et al. |
| 2012/0296482 A1 | 11/2012 | Steven et al. |
| 2012/0296799 A1* | 11/2012 | Playfair ............... G06Q 30/00 705/37 |
| 2012/0303553 A1 | 11/2012 | LaFrance |
| 2012/0310760 A1 | 12/2012 | Phillips et al. |
| 2012/0310800 A1 | 12/2012 | Xia et al. |
| 2012/0316691 A1 | 12/2012 | Boardman et al. |
| 2012/0316697 A1* | 12/2012 | Boardman ............ G05B 15/02 700/297 |
| 2013/0006435 A1 | 1/2013 | Berrios et al. |
| 2013/0020992 A1 | 1/2013 | Wu et al. |
| 2013/0023285 A1 | 1/2013 | Markhovsky et al. |
| 2013/0031201 A1 | 1/2013 | Kagan et al. |
| 2013/0035802 A1* | 2/2013 | Khaitan ............... H02J 3/386 700/297 |
| 2013/0038468 A1 | 2/2013 | Wang et al. |
| 2013/0054036 A1 | 2/2013 | Cherian |
| 2013/0079939 A1 | 3/2013 | Thomas et al. |
| 2013/0079943 A1 | 3/2013 | Darden |
| 2013/0110297 A1 | 5/2013 | Reichmuth et al. |
| 2013/0123998 A1 | 5/2013 | King et al. |
| 2013/0124320 A1 | 5/2013 | Karner |
| 2013/0144768 A1* | 6/2013 | Rohrbaugh ............ H01H 71/04 705/34 |
| 2013/0173360 A1 | 7/2013 | Thatcher |
| 2013/0178990 A1 | 7/2013 | Kayton et al. |
| 2013/0191260 A1 | 7/2013 | Michael |
| 2013/0231793 A1 | 9/2013 | Elliott et al. |
| 2013/0242792 A1 | 9/2013 | Woodings |
| 2014/0018969 A1 | 1/2014 | Forbes |
| 2014/0025486 A1 | 1/2014 | Bigby et al. |
| 2014/0039699 A1 | 2/2014 | Forbes, Jr. |
| 2014/0039701 A1 | 2/2014 | Forbes |
| 2014/0039703 A1 | 2/2014 | Forbes |
| 2014/0114829 A1 | 4/2014 | Forbes, Jr. |
| 2014/0114844 A1 | 4/2014 | Forbes, Jr. |
| 2014/0163309 A1 | 6/2014 | Bernhard et al. |
| 2014/0222698 A1 | 8/2014 | Potdar et al. |
| 2014/0277788 A1 | 9/2014 | Forbes, Jr. |
| 2014/0278851 A1 | 9/2014 | Kopanati |
| 2014/0304025 A1 | 10/2014 | Steven et al. |
| 2014/0351010 A1 | 11/2014 | Kong |
| 2015/0094968 A1* | 4/2015 | Jia ............... G01R 21/133 702/60 |
| 2015/0160672 A1 | 6/2015 | Hakim et al. |
| 2015/0278968 A1 | 10/2015 | Steven et al. |
| 2016/0055507 A1 | 2/2016 | Patil et al. |
| 2017/0025893 A1 | 1/2017 | Forbes, Jr. |
| 2017/0308969 A1 | 10/2017 | Forbes, Jr. |
| 2018/0343339 A1 | 11/2018 | Lotter et al. |

FOREIGN PATENT DOCUMENTS

| | | |
|---|---|---|
| JP | 2000078748 A | 3/2000 |
| JP | 2001306839 A | 11/2001 |
| JP | 2004180412 A | 6/2004 |
| JP | 2004248174 A | 9/2004 |
| JP | 2006060911 A | 3/2006 |
| JP | 2007132553 A | 5/2007 |
| KR | 20050045272 A | 5/2005 |
| KR | 20060036171 A | 4/2006 |
| KR | 20070008321 A | 1/2007 |
| KR | 100701298 B1 | 3/2007 |
| KR | 20070098172 A | 10/2007 |
| KR | 20080112692 A | 12/2008 |
| KR | 20090033299 A | 4/2009 |
| WO | 2007136456 A2 | 11/2007 |
| WO | 2008073477 A2 | 6/2008 |
| WO | 2008125696 A2 | 10/2008 |
| WO | 2011079235 A1 | 6/2011 |
| WO | 2012008979 A2 | 1/2012 |
| WO | 2012015507 A1 | 2/2012 |
| WO | 2012015508 A1 | 2/2012 |
| WO | 2012058114 A2 | 5/2012 |

OTHER PUBLICATIONS

Herold, Rebecca. "Smart Meter Data and Privacy." Data Privacy for the Smart Grid. Auerbach Publications, 2015. 78-97. Web. (Year: 2015).*

Ibrahim, Michael, and Magdy M.A Salama. "Smart Distribution System volt/VAR Control Using Distributed Intelligence and Wireless Communication." IET generation, transmission & distribution 9.4 (2015): 307-318. Web. (Year: 2015).*

Rashdi, Adnan et al. "Remote Energy Monitoring, Profiling and Control Through GSM Network."Arabian Journal for Science and Engineering 38.11 (2013): 3249-3257. Web. (Year: 2013).*

Kamat R, Oren S. Two-settlement Systems for Electricity Markets under Network Uncertainty and Market Power. Journal of Regulatory Economics [serial online], Jan. 2004;25(1):5-37. (Year: 2004).*

Lobsenz G. Maryland Regulators Reject BG&E Smart Grid Proposal. Energy Daily [serial online], Jun. 23, 2010;(118):3. Available from: Business Source Complete, Ipswich, MA. (Year: 2010).*

Byers J. Risk Management and Monetizing the Commodity Storage Option. Natural Gas & Electricity [serial online]. Jul. 2005;21 (12):1-8. Available from: Business Source Complete, Ipswich, MA. (Year: 2005).*

"Adika Christopher, Wang Lingfend, Autonomous Appliance Scheduoing for Household Energy Management, Mar. 2014, IEEETransactions on Smart Grid, vol. 1 No. 5" (Year: 2014).

"Aman Saima, Simmhan Yogesh, Prasanna Viktor, Energy Management Systems: State of the Art and Emerging Trends, Jan. 2013, IEEE Communications Magazine" (Year: 2013).

"Molderink Albert, Bakker Vincent, Bosman Maurice, Hurink Johann, Smith Gerard, Sep. 2010, IEEE Transactions on SmartGrid vol. 1 No. 2" (Year: 2010).

Automated power exchange. (2000). Energy Markets, 19. Retrieved from http://search.proquest.com/docview/228731930?accountid=14753.

B.J. Kirby, Spinning Reserve from Responsive Loads, Oak Ridge National Laboratory, United States Dept of Energy, Mar. 2003 (54 pages).

Byers J. Risk Management and Monetizing the Commodity Storage Option. Natural Gas & Electricity [serial online]. Jul. 2005; 21 (12):1-8. Available from: Business Source Complete, Ipswich, MA.

C. W. Gellings and W.M. Smith, Integrating Demand-Side Management into Utility Planning, Proceedings of the IEEE, vol. 77, Issue: 6, Jun. 1989, pp. 908-918 (Abstract only).

Cazalet, E. G. & Samuelson, R. D. 2000, "The power market: E-commerce for all electricity products", Public Utilities Fortnightly, vol. 138, No. 3, pp. 42-47.

Ercot Settlement Metering Operating Guide. Dec. 2010. http://www.ercot.com/mktrules/guides/settlement/201 0/index.

Eric Hirst and Brendan Kirby, Opportunities for Demand Participation in New England Contingency-Reserve Markets, New England Demand Response Initiative, Feb. 2003 (15 pages).

(56) References Cited

OTHER PUBLICATIONS

Eric Hirst and Richard Cowart, Demand Side Resources and Reliability, New England Demand Response Initiative, Mar. 20, 2002 (32 pages).

Galvin Electricity Institute: Frequently Asked Questions, printed Apr. 23, 2014, same page available through archive.org unchanged Mar. 1, 2008.

GE Digital Energy Residential Electrical Metering Brochure. Sep. 12, 2012. https://web.archive.org/web/20120912144353/http://www.gedigitalenergry.com/products/brochures/1210-Family.pdf.

IDC Energy I. IDC Energy Insights Forecasts 27% Worldwide Growth in the Commercial Smart Building Systems Market. Business Wire (English) [serial online]. 4: Available from: Regional Business News, Ipswich, MA.

Illinois General Assembly: Public Act 094-0977, Effective Date: Jun. 30, 2006.

Kamat R., Oren S. Two-Settlement Systems for Electricity Markets under Network Uncertainty and Market Power Journal of Regulatory Economics [serial online]. Jan. 2004; 25(1):5-37.

Kathleen Spees and Lester B. Lave, Demand Response and Electricity Market Efficiency, The Electricity Journal, vol. 20, Issue 3, Apr. 2007 (online Mar. 27, 2007), pp. 69-85 (Abstract only).

L.T. Anstine, R.E. Burke, J.E. Casey, R. Holgate, R.S. John, and H.G. Stewart, Application of Probability Methods to the Determination of Spinning Reserve Requirements for the Pennsylvania-New Jersey-Maryland Interconnection; IEEE Transactions on Power Apparatus and Systems, vol. 82, Issue 68, Oct. 1963, pp. 726-735 (Abstract only).

Lobsenz G. Maryland Regulators Reject BG&E Smart Grid Proposal. Energy Daily [serial online]. Jun. 23, 2010; (118):3. Available from: Business Source Complete, Ipswich, MA.

M. Rashidi-Nejad, Y.H. Song, and M.H. Javidi-Dasht-Bayaz, Operating Reserve Provision in Deregulated Power Markets, IEEE Power Engineering Society Winter Meeting, vol. 2, 2002, pp. 1305-1310 (Abstract only).

Michael Ahlheim and Friedrich Schneider; "Allowing for Household Preferences in Emission Trading, A Contribution to the Climate Policy Debate"; Environmental and Resource Economics, vol. 21, pp. 317-342; Kluwer Academic Publishers; The Netherlands; 2002.

Moeller, Mar. 15, 2011, NERC, 116 pages.

Olivier Rousse; "Environmental and economic benefits resulting from citizens' participation in $CO_2$ emissions trading: An efficient alternative solution to the voluntary compensation of $CO_2$ emissions", Energy Policy 36 (2008), pp. 388-397; Oct. 29, 2007 (online).

Pablo A. Ruiz and Peter W. Sauer, Valuation of Reserve Services, IEEE Proceedings of the 41 sup.st Hawaii International Conference on System Sciences, 2008 (9 pages).

Paul Darbee, Insteon Compared, SmartLabs, Inc., Jan. 2, 2006, 69 pages.

Paul Darbee, Insteon The Details, Smarthome, Inc., Aug. 11, 2005, 68 pages.

Thomas, K. 2000, "Energy e-commerce takes off", Energy Markets, vol. 5, No. 4, pp. 26.

Woolf, Tim, Demand Response Compensation in Organized Wholesale Energy Markets, May 4, 2010, NARUC, 34 pages.

Zhu Jinxiang, G. Jordan, and S. Ihara, The Market for Spinning Reserve and Its Impacts on Energy Prices, IEEE Power Engineering Society Winter Meeting, vol. 2, 2000, pp. 1202-1207 (Abstract Only).

Rietveld, Get al. "Metrology for Smart Electrical Grids." CPEM 2010. IEEE, 2010. 529-530. Web. (Year: 2010).

Rietveld, Get al. "Realization of a Smart Grid Metrology Infrastructure in Europe." 2012 Conference on Precision Electromagnetic Measurements. IEEE, 2012. 408-409. Web. (Year: 2012).

Chicco, Gianfranco. Load Pattern-Based Classification of Electricity Customers, May 2004, IEEE Transactions on Power Systems, vol. 19, No. 2 (Year: 2004).

Valero Verdu, Sergio. Classification, Filtering, and Identification of Electrical Customer Load Patterns Through the Use of Self-Organizing Maps, Nov. 2006, IEEE Transactions on Power Systems, vol. 21, No. 4 (Year: 2006).

* cited by examiner

SYSTEM, METHOD, AND APPARATUS FOR SETTLEMENT FOR PARTICIPATION IN AN ELECTRIC POWER GRID

CROSS-REFERENCES TO RELATED APPLICATIONS

This application relates to and claims priority from the following U.S. Patent Applications. This application is a continuation of U.S. patent application Ser. No. 15/644,080 filed Jul. 7, 2017, which is a continuation of U.S. patent application Ser. No. 14/610,181 filed Jan. 30, 2015, which is a continuation of U.S. patent application Ser. No. 14/292,418 filed May 30, 2014 and issued as U.S. Pat. No. 8,996,419, which is a continuation of U.S. patent application Ser. No. 14/193,600 filed Feb. 28, 2014 and issued as U.S. Pat. No. 8,775,283, which is a continuation of U.S. patent application Ser. No. 14/050,325 filed Oct. 9, 2013 and issued as U.S. Pat. No. 8,706,583, which is a continuation of U.S. patent application Ser. No. 13/746,703 filed Jan. 22, 2013 and issued as U.S. Pat. No. 8,583,520, which is a continuation of U.S. patent application Ser. No. 13/659,564 filed Oct. 24, 2012 and issued as U.S. Pat. No. 8,849,715, each of which is herein incorporated by reference in its entirety.

BACKGROUND OF THE INVENTION

1. Field of the Invention

The present invention relates generally to the field of electrical power management systems, and more particularly, to systems, methods, and apparatus embodiments for electric power grid and network registration and settlement for participation in energy supply and/or curtailment as supply, and for energy or capacity consumption or usage by grid elements.

2. Description of Related Art

Generally, electric power management systems for an electric power grid are known. However, most prior art systems and methods apply to normal grid management, macro (large) generation subsystems, transmission subsystems for transporting high voltage bulk power to distributions systems where it is sent through distribution level infrastructure and voltages and finally to end customers. Prior art to control power load curves include load curtailment where controls managing the system are used to deactivate or reduce power supplied to predetermined service points from the grid. In addition advances in macro-generation and a transformation from Coal based generation to gas based generation has led to new (large) gas fired turbines and their associated subsystems to manage introduction of supply to the grid, but not particularly operable to smaller distributed supply sources or methods or technologies introduce a new elements to the grid wherein those elements are immediately identified, tracked, and managed within the overall electric grid system for meeting the needs and/or requirements of an energy management system (EMS) and/or a distribution management system (DMS) and or generation management system (GMS) and/or grid governing authority.

In particular, relevant prior art is known for the management of traditional large scale energy supply and technologies associated with transmission, distribution and consumption of electricity in the power system. Collecting, transmitting, storing, and analyzing information associated with a variety of devices associated with the electric power grid is also known in the art. Settlement for macro energy supply, energy storage, energy demand, and/or curtailment as supply is known in the prior art; however, most settlement includes manual and/or non-real-time settlement including significant estimation or modeled data where actual data is missing or not collected, and/or utilization of validation energy equivalence (VEE), and/or collected and settled over a period of time whereby actual contributions by sources/suppliers of generation are not fully known and are estimated and applied to all Market Participants in some cases a full year after a generation day. In particular, losses associated with the transmission and distribution is spread across consumers, also referred by the industry as "loads", by the utility energy supply provider; where data traditionally has not available, these inaccuracies within the settlement systems of prior art place the cost burden for inefficiencies on the consumer of power, not the utility energy provider and/or distribution/transmission provider, which is typically the source of the losses.

By way of example, relevant prior art documents include the following:

U.S. Pat. No. 6,897,931 for Energy credit card system by inventor Brobeck issued Dec. 27, 2005 describes a method of providing an energy credit system for providing redeemable energy or mass transit credits to consumers who contribute power to a shared electric power grid, wherein at least some of the consumers have their own local renewable energy source connected to the power grid including the steps of measuring the excess power generated by each consumer's energy source that is fed into the electric power grid, awarding energy credits to each of the consumers in relation to the excess power contributed to the electric power grid by the consumer, allowing each consumer receiving the energy credits to redeem them by acquiring fuel, power, or mass transit tickets from a fuel or power provider or mass transit system, and requiring the operator of the electric power grid to compensate the fuel for energy provided or mass transit system in direct relation to the energy credits redeemed by each consumer. Additionally, it claims recording the credits at an energy brokerage house, requiring the operator of the power grid to compensate the brokerage house for the expenses generated by the consumers, and allowing the brokerage house to retain as profit a portion of the compensation received from the operator of the power grid. See also, US Patent Application Publication No. 20040206813.

U.S. Pat. No. 6,978,931 by Provanzana, and assigned on the face of the patent to American Electric Power Company, Inc., for Power load-leveling system and packet electrical storage issued May 31, 2005, describing a large-scale, capacitor-based electrical energy storage and distribution system capable of effectuating load-leveling during periods of peak demand and a cost savings associated with the purchase of electrical energy; and disclosing a method of storing and distributing electrical energy to achieve a cost savings associated with the purchase thereof including the steps of providing a source of electrical energy, providing at least one electrical energy storage capacitor capable of storing a significant amount of energy, the capacitor in communication with the source, providing control equipment adapted to analyze and monitor the real-time cost of purchasing electrical energy from the source and to predict a future cost, supplying an amount of electrical energy to the capacitor to charge it in response to a charge signal from control equipment, discharging at least a portion of the stored energy to a load, and repeating to maximize cost savings; also disclosing deducting the value of the electrical energy sold back to the source for any costs of purchasing energy from the source. See also US Patent Application Pub. No. 20030160595.

US Patent Application Pub. No. 20090177548 for Cooperative environmental and life benefit exchange system by Eisnlohr filed Jan. 9, 2009 and published Jul. 9, 2009 describing a cooperative environmental and life benefit system including a grid transmitting available energy, a plurality of rate payers using energy generated from available energy sources, a plurality of utility companies providing the grid, a plurality of credits redeemable for acquiring one or more of a plurality of life benefits, and an administrator overseeing a redemption process, wherein credits are accumulated by the rate payers based on either a predetermined amount of electrical energy purchased from or sold back to the grid; further describing the redemption process wherein credits accumulated by the payers are redeemed at a redemption rate to provide a redemption value, which is remitted by the rate payers to satisfy benefit cost for acquiring the benefits, or portions thereof.

U.S. Pat. No. 7,274,975 for Optimized energy management system by Miller and assigned to Gridpoint, Inc., issued Sep. 25, 2007 describing methods and systems for optimizing the control of energy supply and demand, including activating battery storage and alternative energy sources to sell energy to the power grid during favorable cost conditions, including method steps for allocating energy at a location where the electrical energy is consumed, with computer-implemented steps of: determining a marginal cost for each of a plurality of energy sources available at the location, at least one of which is a non-grid source of electricity; determining a capacity of electrical energy available from each non-grid energy source; determining a demand for electrical energy at the location; dynamically allocating, in order of lowest marginal cost to highest marginal cost, electrical energy capacity from each of the plurality of energy sources to meet the demand; reducing demand at the location by automatically deferring electrical consumption for a device for which consumption can be deferred from a higher-cost time period to a lower-cost time period, including the computer-implemented step of issuing a command to the device to cause the deferral to occur, and further including determining projected marginal costs in each of a plurality of future time frames and deferring electrical consumption for the device to one of the plurality of future time frames, while conforming to an operational constraint for the device, the operational constraint for the device comprising a maximum time duration for which the device can be switched off; further including step of determining, on the basis of time-varying cost of grid-based electrical energy, whether it is cost-effective to sell electrical energy back to a grid-based source, and if so, automatically initiating such sale; and the step of selling electrical energy from a battery to the grid-based source. See also US Patent Application Pub. Nos. 20110208365, 20070276547, and 20060276938.

U.S. Pat. No. 7,890,436 for Billing and payment methods and systems enabling consumer premises equipment by Kremen and assigned to Clean Power Finance, Inc. issued Feb. 15, 2011 and describes a variety of systems and methods enabling renewable energy consumer premises equipment (CPE) such as dual metering techniques, and disclosing supporting by increasing a likelihood of meeting financing obligations, a consumer purchasing, leasing, installing, and/or maintaining renewable energy CPE for power generation at a consumer premises; coupling the CPE to a power grid operable to receive at least a portion of the power generated by the CPE, measuring power generated by the CPE and delivered onto the power grid of a utility, and processing receivables from the utility associated with the power generated and delivered onto the power grid directly to the lender at times corresponding to power measurement to fulfill the consumer's obligation to repay the loan. See also US Patent Ap. Pub. Nos. 20080091625, 20080091581, 20080091626, 20080091590, 20080091580.

Additionally, relevant prior art documents associated with grid elements registration with systems and methods include the following:

U.S. Pat. No. 7,502,698 filed Jul. 5, 2005 by inventors Uenou et al., issued Mar. 10, 2009, and assigned on the face of the issued patent document to IP Power Systems Corp. for Power consumption measuring device and power control system, describes a single phase, 3-wire watt-hour meter that measures power consumption, alters a contract capacity, controls the stop/start of power supply/distribution, and updates programs from a higher level control apparatus, including a central processing unit, a storing means, a communicating means, and interfaces; the device measures the detailed behavior of a power consumption by totaling a power consumption every 30 minutes (and a clocking process for clocking a standard time and for collecting data within that time), interlocks with a gas leakage detector and a fire alarm, controls opening/closing of rain doors and the operation/stop of Internet home electric appliances, and enables low-cost communication by means of dynamic IP address based communication.

U.S. Pat. No. 5,560,022 for Power management coordinator system and interface, describes a power management system and interface providing a flexible and uniform protocol for controlling power management within a computer system including various software layers and add-in components; a programmable power policy manager, which allows user to define a performance/economy setting for the system that is communicated to all registered devices so that dwell and decay times are set by the device; and a programmable event sequencer, which maintains an event notification sequence and control sequence for power events; a programmable power budgeter that maintains and allocates power on a request basis for system elements; a programmable thermal budgeter that maintains and allocates energy based on thermal considerations; and a computer system including a bus for communicating address and data information, a central processor couple to the bus for executing instructions and processing data, and memory coupled to the bus for containing information, and a power management coordinator that includes a power management core for communication of power management information with system devices within the computer system under a uniform power management protocol, wherein particular devices are add-in devices requiring power management, and one of the devices provides programmable dwell time and decay time periods for power management of the add-in devices, wherein power events are generated by clients and broadcast by power management core to power management clients, including a power event sequencer for maintaining a particular sequence of communication about the power events.

U.S. Pat. No. 8,095,233 filed Oct. 10, 2006 by inventors Shankar et al., issued Jan. 10, 2012 and assigned on the face of the issued patent to American Grid, Inc., for Interconnected premises equipment for energy management, describing a system for facilitating direct monitoring and control of energy-consuming appliances, in real time, using automatic programmatic control and a plurality of human interfacing including local display and control, email, web browser, text messaging, and integrated voice response, and describing a monitoring and control coordinator that provides centralized coordination of functions and one or more communicating appliance interfaces that interact with energy consuming appliances that are interconnected via wired and wireless communication networks and protocols, wherein the system allows a user to regulate energy consumption of a premises for heating and air conditioning systems, including a premises control communication gateway in communication with the monitoring and control coordinator.

U.S. Pat. No. 6,301,528 field Aug. 15, 2000 by inventors Bertram et al., issued Oct. 9, 2001, assigned on the face of the patent document to Robert Bosch GmbH, describes a method and an arrangement for controlling electric consumers in a vehicle that are suggested with a control structure provided for consumers, the control structure including at least a high-ranking consumer management that receives requests from the consumers with respect to consumer power individually or as sums; the control structure including a coordinator for the vehicle electrical system and power generation therefor, and for receiving the sum of the requested consumer power from the consumer management; the vehicle electric system adjusting the requested electric power via orders to the vehicle electrical system components and the consumer management taking the generated electrical power via control of the consumers.

US Patent Application Publication No. 20070067132 for Method and apparatus for routing data streams among intelligent electronic devices, disclosing an intelligent electronic device (IED) for protection, monitoring, controlling, metering, or automation of lines in an electrical power system, wherein the IED is adapted to communicated with a variety of other IEDs, including a communication configuration setting that is configured to allow communication with one of the other IEDs; and further including an input element in communication with the communication configuration setting, whereupon a signal from the input element selects a particular communication configuration setting therein, allowing for the communication with other IEDs. Also, including a data stream management device for routing data streams among IEDs associated with the electrical power system, wherein the data streams are substantially unaltered from sent and received forms, and an IED associated with the data stream management device and adapted to communicate with the other IEDs, wherein assertion of an input element selects a particular communication configuration setting.

U.S. Pat. No. 7,609,158 filed Oct. 26, 2006 issued Oct. 27, 2009 for inventors Banting et al., and assigned on the face of the patent document to Cooper Technologies Co., describes a communications network for an electrical power distribution system, the network communicating monitoring signals and control signals for a network of electrical circuits, the network including a sensor node with a sensor device configured to detect an operating condition of the transmission or distribution systems, a sensor communication node corresponding to the sensor device, and configured to transmit a first wireless signal corresponding to the detected operating condition of transmission/distribution, a control communication node separately provided from the sensor communication node, configured to receive the first wireless signal and transmit a second wireless signal corresponding to the first wireless signal, a gateway device in communication with the control communication node and receiving the second wireless signal, and wherein the sensed electrical signals are broadcast.

U.S. Pat. No. 8,060,259 field Jun. 15, 2007 for inventors Budhraj a et al., issued Nov. 15, 2011 and assigned on the face of the patent document to Electric Power Group, LLC, (also see US Patent Application Pub. No. 20100100250) for Wide area, real time monitoring and visualization system, describes a real-time performance monitoring system for monitoring an electrical power grid, including grid portions having control areas, and monitoring of reliability metrics, generations metrics, transmission metrics, suppliers metrics, grid infrastructure security metrics, and markets metrics for the electric power grid, wherein the metrics are stored in a database, and visualization of the metrics is displayed on a computer having a monitor.

US Patent Application Pub. No. 20090119039 filed Nov. 7, 2007 by inventors Banister et al., published May 7, 2009 and assigned on the face to SPROUTLETS, INC., describes an electrical power metering system including a plurality of gated power receptacles, each of them being configured to selectively provide electrical power in response to receiving a wireless signal, and further including a service application configured to receive a request to provide electrical power for one of the receptacles, the request including an identifier that designates the receptacle at which power is requested. A local host application executable on a computing device is configured to send wireless signals via a coordinator module to the receptacle to provide power in response to receiving a communication from the service application that includes the identifier.

In the area of managing supply of energy to the grid, detailed attachment modeling is required; also, due to the requirements that any amount of supply, even micro-scale supply, must comply with standards applicable to full scale utilities or macro-generation supply, this compliance is difficult and expensive. However, there are relevant prior art documents relating to management electric power grids in the field of the present invention.

By way of example, consider the following US Patent and US Patent Application Publication documents:

U.S. Pat. No. 5,560,022 issued Sep. 24, 1996, filed Jul. 19, 1994 by inventors Dunstand, et al., and assigned on the face of the document to Intel Corporation, for Power management coordinator system and interface.

U.S. Pat. No. 6,301,528 issued Oct. 9, 2001, filed Aug. 15, 2000 by inventors Bertram et al., and assigned on the face of the patent to Robert Bosch GmbH for Method and device for controlling electric consumers in a motor vehicle.

U.S. Pat. No. 7,502,698 issued Mar. 10, 2009, filed Jul. 5, 2005 by inventors Uenou et al., and assigned on the face of the patent to IP Power Systems Corp., for Power consumption measuring device and power control system.

U.S. Pat. No. 8,095,233 issued Jan. 10, 2012, filed Oct. 10, 2006 by inventors Shankar et al., and assigned on the face to American Grid, Inc., for Interconnected premises equipment for energy management.

US Patent Application Publication No. 20070067132 published Mar. 22, 2007 and filed Sep. 19, 2006 by inventors Tziouvaras et al., for Method and apparatus for routing data streams among intelligent electronic devices.

US Patent Application Publication No. 20080040479 filed Aug. 9, 2007 by inventors Bridge, et al. and assigned on the face of the publication to V2Green, Inc. for Connection locator in a power aggregation system for distributed electric resources, discloses a method to obtain the physical location of an electric device, such as an electric vehicle, and transforming the physical location into an electric network location, and further including receiving a unique identifier associated with a device in a physical location. See also related publications WO2008073477, US Pat. Application No.'s 20110025556, 20090043519, 20090200988, 20090063680, 20080040296, 20080040223, 20080039979, 20080040295, and 20080052145.

International Patent Application No. WO2011079235 filed Dec. 22, 2010 and published Jun. 30, 2011 by inventor Williams and assigned on the face of the document to Interactive Grid Solutions, LLC for Distributed energy sources system, describes an energy management system that includes distributed energy sources (for example a wind turbine) that communicate with consumer devices and electric utilities, wherein a CPU is in communication with the distributed energy source and is operable to control the flow of energy produced by the distributed energy source.

International Patent Application No. WO2012015508 filed May 2, 2011 and published Feb. 2, 2012 by inventor Cherian, et al. and assigned on the face of the document to Spriae, Inc. for Dynamic distributed power grid control system, describes a control system for a distributed power grid that includes a simulation module operative to directly interface with the operational control of the distributed energy resources (DER) to develop and dynamically modify the control inputs of the distributed power grid, and wherein the distributed control module can simulate control response characteristics of the DER to determine control methodology by conducting decentralized and distributed simulation. See also WO201200879, WO2012015507, US Pat. Application No.'s 20110106321, 20120029720, and 20120029897.

International Patent Application No. WO2012058114 filed Oct. 21, 2011 and published May 3, 2012 by inventor Alatrash, et al. and assigned on the face of the document to Petra Solar, Inc. for Method and system facilitating control strategy for power electronics interface of distributed generations resources, discloses a method and system for implementing a control strategy for distributed generation (DG) units, wherein the DG unit behaves similarly to a synchronous generator.

U.S. Pat. No. 7,949,435 filed Aug. 9, 2007 and issued May 24, 2011 to inventors Pollack, et al. and assigned to V2Green, Inc. on the face of the document entitled User interface and user control in a power aggregation system for distributed electric resources, describes a method and operator interface for users or owners of a distributed power resource, such as an electric vehicle, which connects to a power grid, wherein the user or owner controls a degree of participation of the electric resource power aggregation via the user interface, and further including an energy pricing preference, a vehicle state-of-charge, and a predicted amount of time until the electric resource disconnects from a power grid. See also US Patent Application Pub. Nos. 20090043520 and 20080039989.

US Patent Application Pub. No. 20110282511 filed Mar. 26, 2011 and published Nov. 17, 2011 to inventor Unetich and assigned on the face of the document to Smart Power Devices Ltd for Prediction, communication and control system for distributed power generation and usage, describes an apparatus for obtaining, interpreting and communicating a user reliable and predictive information relevant to the price of electricity service at a prospective time.

U.S. Pat. No. 7,844,370 filed Aug. 9, 2007 and issued Nov. 30, 2010 by inventors Pollack et al. and assigned on the face of the document to GridPoint, Inc. for Scheduling and control in a power aggregation system for distributed electric resources, describes systems and methods for a power aggregation system in which a server establishes individual Internet connections to numerous electric resources intermittently connect to the power grid, such as electric vehicles, wherein the service optimizes power flows to suit the needs of each resource and each resource owner, while aggregating flows across numerous resources to suit the needs of the power grid, and further including inputting constraints of individual electric resources into the system, which signals them to provide power to take power from a grid.

US Patent Application Pub. No. 20090187284 filed Jan. 7, 2009 and published Jul. 23, 2009 by inventors Kreiss et al. for System and method for providing power distribution system information, describes a computer program product for processing utility data of a power grid, including a datamart comprised of physical databases storing utility data applications comprising an automated meter application configured to process power usage data from a plurality of automated meters, a power outage application configured to identify a location of a power outage, and a power restoration application configured to identify a location of a power restoration. See also US Pat. Application No.'s 20110270550, 20110270457, and 20110270454.

The increased awareness of the impact of carbon emissions from the use of fossil fueled electric generation combined with the increased cost of producing base load, intermediate, and peak power during high load conditions has increased the need for alternative solutions utilizing new power technologies as a mechanism to defer, or in some cases eliminate, the need for the deployment of additional macro generation capacity by electric utilities, generating utilities, or distributing utilities or any grid operator or market participant whose primary function is to facilitate the production, distribution, operation and sale of electricity to individual consumers. Existing electric utilities are pressed for methods to defer or eliminate the need for construction of fossil-based or macro large scale electricity generation while dealing with the need to integrate new sources of generation such as renewable energy sources or distributed energy resources whose production and integration into the electric grid is problematic.

Today, a patchwork of systems exist to dispatch macro generation, implement demand response load management programs, dispatch of intermittent renewable resources, and energy management and control. These legacy systems are used for both supplying "negawatts", supply and grid stability to the electric utility grid. In the case of demand management, also referred to in the industry as "Demand Response", various radio subsystems in various frequency bands utilize "one-way" transmit only methods of communication or most recently deployed a plurality of proprietary two-way methods of communications with electric customers or their load consuming device and measurement instruments including, by way of example, "smart meters." In addition, macro generation is controlled and dispatched from centralized control centers either from utilities, Independent Power Producers (IPPs) or other Market Participants that utilize point to point primarily "Plain old telephone service" POTS dedicated low bit rate modems or nailed time division multiplex (TDM) circuits such as T-1s that supply analog telemetry to Energy Management Systems or in some cases physical dispatch to a human operator to "turn on" generation assets in response to grid supply needs or grid stress and high load conditions. These legacy systems operate under a framework supported for decades to attempt to increase the efficiency of existing transmission infrastructure and simultaneously attempt to supply each grid operator, Market Participant or end customer the lowest cost of energy regardless of the type of resource. Unfortunately, these legacy systems, in the industry referred to as "Security Constrained Economic Dispatch" (SCED) utilize complex models with incomplete information to provide both ISOs and Traditional Utilities a means to provide a generation forecast for the next generation time period (for example, day ahead).

SCED has not been successful in the facilitation of new technologies such as Demand Management, Advanced Curtailment contemplated under FERC Order 745, Advanced Storage contemplated under FERC Order 750, or Advanced Distributed Energy Resources contemplated under FERC Order 755.

Existing uses for traditional Demand Response technologies, that are not generally capable of performing to the level contemplated under FERC Order 745, but are used for peak shaving, utilities or other market participants install radio frequency (RF)-controlled relay switches typically attached to a customer's air conditioner, water heater, or pool pumps, or other individual load consuming devices. A blanket command is sent out to a specific geographic area whereby all receiving units within the range of the transmitting station (e.g., typically a paging network) are turned off during peak hours at the election of the power utility. After a period of time when the peak load has passed, a second blanket command is sent to turn on those devices that have been turned off. This "load shifting" has the undesired effect of occasionally causing "secondary peaks" and generally requires consumer incentives for adoption. Furthermore integrating even these simple load shifting assets for purposes of settlements is problematic given that these traditional technologies cannot provide the necessary geodetic, PSV, and other information necessary for these load sources to be integrated into an Energy Management System or settled under the traditional energy dispatch and settlement systems.

Most recent improvements that follow the same concepts for Demand Response are RF networks that utilize a plurality of mesh based, non-standard communications protocols that utilize IEEE 802.15.4 or its derivatives, or "ZigBee" protocol end devices to include load control switches, programmable thermostats that have pre-determined set points for accomplishing the "off" or "cut" or reduce command simultaneously or pre-loaded in the resident memory of the end device. These networks are sometimes referred to in the industry as "Home Area Networks" or (HANs). In these elementary and mostly proprietary solutions, a programmable control thermostat(s) (PCTs) or building management systems (BMS) move the set point of the HVAC (or affect another inductive or resistive device) or remove a resistive device from the electric grid thus accomplishing the same "load shifting" effect previously described. All of these methods require and rely on statistical estimations and modeling for measuring their effectiveness and use historical information that are transmitted via these same "smart meters", interval device recorders (IDRs), or revenue grade meters, to provide after-the-fact evidence that an individual device or consumer complied with the demand response or market driven event. Protocols that are employed for these methods include "Smart Energy Profiles Versions 1 & 2" and its derivatives to provide utilities and their consumers an attempt at standardization amongst various OEMs of PCTs, switching, and control systems through a plurality of protocols and interfaces. These methods remain crude and do not include real time, measurement, verification, settlement and other attributes necessary to have their Demand Response effects utilized for effective Operating Reserves with the exception of limited programs for "Emergency" Capacity Programs as evidenced by programs such as the Energy Reliability Council of Texas' (ERCOT's) Emergency Interruptible Load Service (EILS). Furthermore, for effective settlement and control of mobile storage devices such as Electric Vehicles, these early "Smart Grid" devices are not capable of meeting the requirements of Federal Energy Regulatory Commission (FERC), North American Electric Reliability Corp. (NERC) or other standards setting bodies such as the National Institute of Science & Technology (NIST) Smart Grid Roadmap.

While telemetering has been used for the express purpose of reporting energy usage in real time, no cost effective techniques exist for calculating power consumption, carbon gas emissions, sulfur dioxide ($SO_2$) gas emissions, and/or nitrogen dioxide ($NO_2$) emissions, and reporting the state of a particular device under the control of a two-way positive control load management device or other combinations of load control and generator controls as previously described. In particular, one way wireless communications devices have been utilized to de-activate electrical appliances, such as heating, ventilation, and air-conditioning (HVAC) units, water heaters, pool pumps, and lighting or any inductive or resistive device that is eligible as determined by a utility or market participant for deactivation, from an existing electrical supplier or distribution partner's network. These devices have typically been used in combination with wireless paging receivers or FM radio carrier data modulation, or a plurality of 2-way proprietary radio frequency (RF) technologies that receive "on" or "off" commands from a paging transmitter or transmitter device. Additionally, the one-way devices are typically connected to a serving electrical supplier's control center via landline trunks, or in some cases, microwave transmission to the paging transmitter. The customer subscribing to the load management program receives a discount or some other form of economic incentive, including direct payments for allowing the serving electrical supplier (utility), retail electric provider or any other market participant to connect to their electrical appliances with a one-way load control switch and deactivate those appliances during high energy usage or high energy price periods. This technique of demand response is used mostly by utilities or any market participant for "peak shifting" where the electric load demand curve is moved from a peak period to a less generation intensive time interval and are favored by rate-based utilities who earn capital returns of new power plants or any capital deployed to operate their electric grids that are approved by corresponding Public Utility Commissions. These methods are previous art and generally no conservation of energy is measured. In many instances, secondary peak periods occur when the cumulative effect of all the resistive and inductive devices are released from the "off" state simultaneously causing an unintended secondary peak event, also known as a flash back event.

While one-way devices are generally industry standard and relatively inexpensive to implement, the lack of a return path from the receiver, combined with the lack of information on the actual devices connected to the receiver, make the system highly inefficient and largely inaccurate for measuring the actual load shed to the serving utility or compliant with measurement and verification for presenting a balancing authority or independent system operator for operating reserves and settlements. While the differential current draw is measurable on the serving electric utility's transmission lines and at electrical bus or substations, the actual load shed is approximate and the location of the load deferral is approximated at the control center of the serving utility or other statistical methods are considered to approximate the individual or cumulative effect on an electric utility grid. The aforementioned "two-way" systems are simultaneously defective in addressing real time and near real time telemetry needs that produce generation equivalencies that are now recognized by FERC Orders such as FERC 745 where measurable, verifiable Demand Response "negawatts", defined as real time or near real time load curtailment where measurement and verification can be provided within the tolerances required under such programs presented by FERC, NERC, or the governing body that regulate grid operations. The aforementioned "smart meters" in combination with their data collection systems commonly referred to as "Advanced Metering Infrastructure" (AMI) generally collect interval data from meters in HISTORICAL fashion and report this information to the utility, market participant or grid operator AFTER the utility or grid operator has sent notice for curtailment events or "control events" to initiate due to high grid stress that includes lack of adequate operating reserves to meet demand, frequency variations, voltage support and any other grid stabilizing needs as identified by the utility or grid operator and published and governed by FERC, NERC, or other applicable regulations. Standard AMI meters report historical information at least 15 minutes after the event occurred, but the time lag could be as long as 24 hours.

One exemplary telemetering system is disclosed in U.S. Pat. No. 6,891,838 B1. This patent describes details surrounding a mesh communication of residential devices and the reporting and control of those devices, via WANs, to a computer. The stated design goal in this patent is to facilitate the "monitoring and control of residential automation systems." This patent does not explain how a serving utility or customer could actively control the devices to facilitate the reduction of electricity. In contrast, this patent discloses techniques that could be utilized for reporting information that is being displayed by the serving utility's power meter (as do many other prior applications in the field of telemetering).

An additional exemplary telemetering system is disclosed in U.S. Patent Application Publication No. 2005/0240315 A1. The primary purpose of this published application is not to control utility loads, but rather "to provide an improved interactive system for remotely monitoring and establishing the status of a customer utility load." A stated goal of this publication is to reduce the amount of time utility field personnel have to spend in the field servicing meters by utilizing wireless technology.

Another prior art system is disclosed in U.S. Pat. No. 6,633,823, which describes, in detail, the use of proprietary hardware to remotely turn off or turn on devices within a building or residence. While initially this prior art generally describes a system that would assist utilities in managing power load control, the prior art does not contain the unique attributes necessary to construct or implement a complete system. In particular, this patent is deficient in the areas of security, load accuracy of a controlled device, and methods disclosing how a customer utilizing applicable hardware might set parameters, such as temperature set points, customer preference information, and customer overrides, within an intelligent algorithm that reduces the probability of customer dissatisfaction and service cancellation or churn.

Attempts have been made to bridge the gap between one-way, un-verified power load control management systems and positive control verified power load control management systems. However, until recently, technologies such as smart breakers and command relay devices were not considered for use in residential and commercial environments primarily due to high cost entry points, lack of customer demand, and the cost of power generation relative to the cost of implementing load control or their ability to meet the measurement, telemetry, verification requirements of the grid operator or ISO. Furthermore, submetering technology within the smart breaker, load control device, command relay devices or building control systems have not existed in the prior art.

One such gap-bridging attempt is described in U.S. Patent Application Publication No. US 2005/0065742 A1. This publication discloses a system and method for remote power management using IEEE 802 based wireless communication links. The system described in this publication includes an on-premise processor (OPP), a host processor, and an end device. The host processor issues power management commands to the OPP, which in turn relays the commands to the end devices under its management. While the disclosed OPP does provide some intelligence in the power management system, it does not determine which end devices under its control to turn-off during a power reduction event, instead relying on the host device to make such decision. For example, during a power reduction event, the end device must request permission from the OPP to turn on. The request is forwarded to the host device for a decision on the request in view of the parameters of the on-going power reduction event. The system also contemplates periodic reading of utility meters by the OPP and storage of the read data in the OPP for later communication to the host device. The OPP may also include intelligence to indicate to the host processor that the OPP will not be able to comply with a power reduction command due to the inability of a load under the OPP's control to be deactivated. However, neither the host processor nor the OPP determine which loads to remove in order to satisfy a power reduction command from an electric utility, particularly when the command is issued by one of several utilities under the management of a power management system. Further, neither the host processor nor the OPP tracks or accumulates power saved and/or carbon credits earned on a per customer or per utility basis for future use by the utility and/or customer. Still further, the system of this publication lacks a reward incentive program to customers based on their participation in the power management system. Still further, the system described in this publication does not provide for secure communications between the host processor and the OPP, and/or between the OPP and the end device. As a result, the described system lacks many features that may be necessary for a commercially viable implementation.

Customer profiles are often used by systems for a variety of reasons. One reason is to promote customer loyalty. This involves keeping information about not only the customer, but about the customer's actions as well. This may include information about what the customer owns (i.e., which devices), how they are used, when they are used, device energy consumption, device operational costs, etc. By mining this data, a company can more effectively select rewards for customers that give those customers an incentive for continuing to do business with the company. Similar actions are famously performed by Walmart on customers buying habits to predict supply chain management. This is often described as customer relationship management (CRM).

Customer profile data is also useful for obtaining feedback about how a product is used or how small distributed energy sources may be dispatched back to the electric power grid. In software systems, this is often used to improve the customer/user experience or as an aid to testing or to set pricing parameters for deploying distributed energy resources. Deployed systems that have customer profiling communicate customer actions and other data back to the development organization. That data is analyzed to understand the customer's experience. Lessons learned from that analysis is used to make modifications to the deployed system, resulting in an improved system.

Customer profile data may also be used in marketing and sales. For instance, a retail business may collect a variety of information about a customer, including what customers look at on-line and inside "brick-and-mortar" stores. This data is mined to try to identify customer product preferences and shopping habits. Such data helps sales and marketing determine how to present products of probable interest to the customer, resulting in greater sales.

However, the collection of customer profile information by power utilities, retail electric providers or any other market participant that sells retail electric commodity to end customers (residential or commercial) has been limited to customer account information of gross electrical consumption and inferential information about how power is being consumed but requires customers to take their own actions. Because power utilities, REPs, market participants typically are unable to collect detailed data about what is happening inside a customer's home or business, including patterns of energy consumption by device, there has been little opportunity to create extensive customer profiles.

Thus, none of the prior art systems, methods, or devices provide complete solutions for financial settlement associated with power management, including grid elements and network management, and settlement for grid element participation in supplying and/or receiving power from the electric power grid, including messaging over communication networks and energy management over the electric power grid network, wherein the grid elements are attached to the electric grid and registered therewith. Therefore, a need exists for systems and methods for grid element participation settlement and management to overcome the shortcomings of the prior art.

SUMMARY OF THE INVENTION

The present invention provides systems, methods, and apparatus embodiments for electric power grid and network registration and management of grid elements, their participation in the electric power grid, and financial settlement for grid element participation in the electric power grid, the financial settlement including compensation and/or payment relating to that participation in real-time and/or less than about 15 minute settlement intervals. Accordingly, grid elements are transformed into active grid elements following initial registration of each grid element with the system, preferably through network-based communication between the grid elements, a Coordinator, a translator, and a settlement processor. Also preferably, messaging is managed through a network by a Coordinator using IP messaging for communication with the grid elements, with the energy management system (EMS), Distribution Management System (DMS), and with the utilities, market participants, and/or grid operators. Furthermore, the Coordinator is operable for receiving information communicated from grid elements, authenticating, and registering grid elements, and for receiving and communicating data associated with the participation for supply, curtailment as supply, and/or consumption of electric power from the grid, and settlement associated with that participation for each of the grid elements, again as contemplated by the aforementioned and any follow on FERC or NERC Order that is meant to influence resources for capacity, energy, energy equivalents, micro/macro generation, storage technologies, transmission capacities, grid elements, ancillary services, settlement intersections know and defined or those defined through the implementation of this art, thereby transforming real-time or less than about 15 minute interval data into automated settlement. The Coordinator is further operable for communicating data with a database, a persistence layer or cache, an ASIC or memory contained in a grid element or the processor, or combinations thereof and to provide an overall assessment of electric grid operations (normal or emergency) including but not limited to energy flows within the system, grid stabilization information, operating reserves, capacity, transmission and distribution capacities, grid element capacities, settlement, and combinations thereof.

Following registration, the multiplicity of active grid elements function in the grid for control, reporting, status, grid operations (normal or emergency), any source of macro supply capacity/energy, supply as distributed energy resources from a plurality of methods, supply/energy through storage devices, and/or load curtailment as supply or capacity, wherein the registered, active grid elements and their corresponding activities and information associated with those activities deliver electric supply to the electric grid, curtail load sources, control active or passive grid elements used in the operation of the grid, or any other device that is attached to the electric grid for its normal or emergency functions and are tracked and managed in accordance with regulations and standards governing the electric power grid. Reporting and tracking status of those grid elements with and through the coordinator or the coordinator in communication with legacy grid operator subsystems is also important in determining settlements for the aforementioned use cases. When grid elements are inactive, unanticipated outages, growth or changes in the electric grid, replacement of defective or upgrades to grid elements or a portion of the transmission or distribution system becomes inactive for a plurality of reasons (grid element outage), the impact of these changes in normal grid operation will impact settlements for those Market Participants or individual sources of supply, curtailment and their associated settlements inclusive of grid elements.

Accordingly, one aspect of the present invention is to provide a system for electric power grid network management including: at least one grid element constructed and configured for electrical connection and network-based communication with a server and/or a processor operatively coupled with memory; wherein the grid element is transformed into at least one active grid element after initial connection with the server and/or the processor operatively coupled with the memory via a network, preferably a communications network, wherein the registration is preferably automatic and/or autonomous.

Another aspect of the present invention is to provide an apparatus for smart electric power grid communication including: a grid element constructed and configured for electrical connection and network-based communication with a server associated with an electric power grid; wherein the grid element is transformed into an active grid element after initial connection with the electric power grid, and preferably wherein each active grid element has a unique identifier. By way of example and not limitation, at least one of the grid elements is a control device that operates, programs and updates select load consuming device(s) or generating devices associated with the electric power grid (including but not limited to control systems, thermostats, controllers, anything that controls the device, switch gear, large control systems operating from a control center or box with interface to a large control system, such as a distribution automation control system; transformation process includes whatever control systems are attached to the electric devices, their databases, tables, memory, ASICs, firmware, software, operating systems, and combinations thereof and/or other grid elements).

Also, in one aspect of the present invention a method for electric power grid network management is provided, including the steps of: providing at least one grid element constructed and configured for electrical connection and network-based communication with a server; the at least one grid element communicating a message to the server, wherein the message is preferably standards-based or proprietary; the at least one grid element automatically connecting to at least one other active grid element for functioning actively within the electric power grid, wherein the at least one grid element makes an initial connection with the server via a network. Also, methods may further include the step of: connecting the at least one grid element to an electric power grid. Also preferably, the at least one grid element is operable for sending and/or receiving a message via communication with the server via a network, and the message is routed by a coordinator to the server. Messages are sent via the network and include Internet Protocol (IP)-based messaging, which provides for secure communication, for example using encryption, private networks, or IP encapsulation over proprietary networks. The present invention thus preferably provides secure communications, which are improved over the prior art's use of analog telemetry such as in outage detection systems, and telemetry sub-systems.

These and other aspects of the present invention will become apparent to those skilled in the art after a reading of the following description of the preferred embodiment when considered with the drawings, as they support the claimed invention.

DETAILED DESCRIPTION OF THE PRESENT INVENTION

Figure 1:
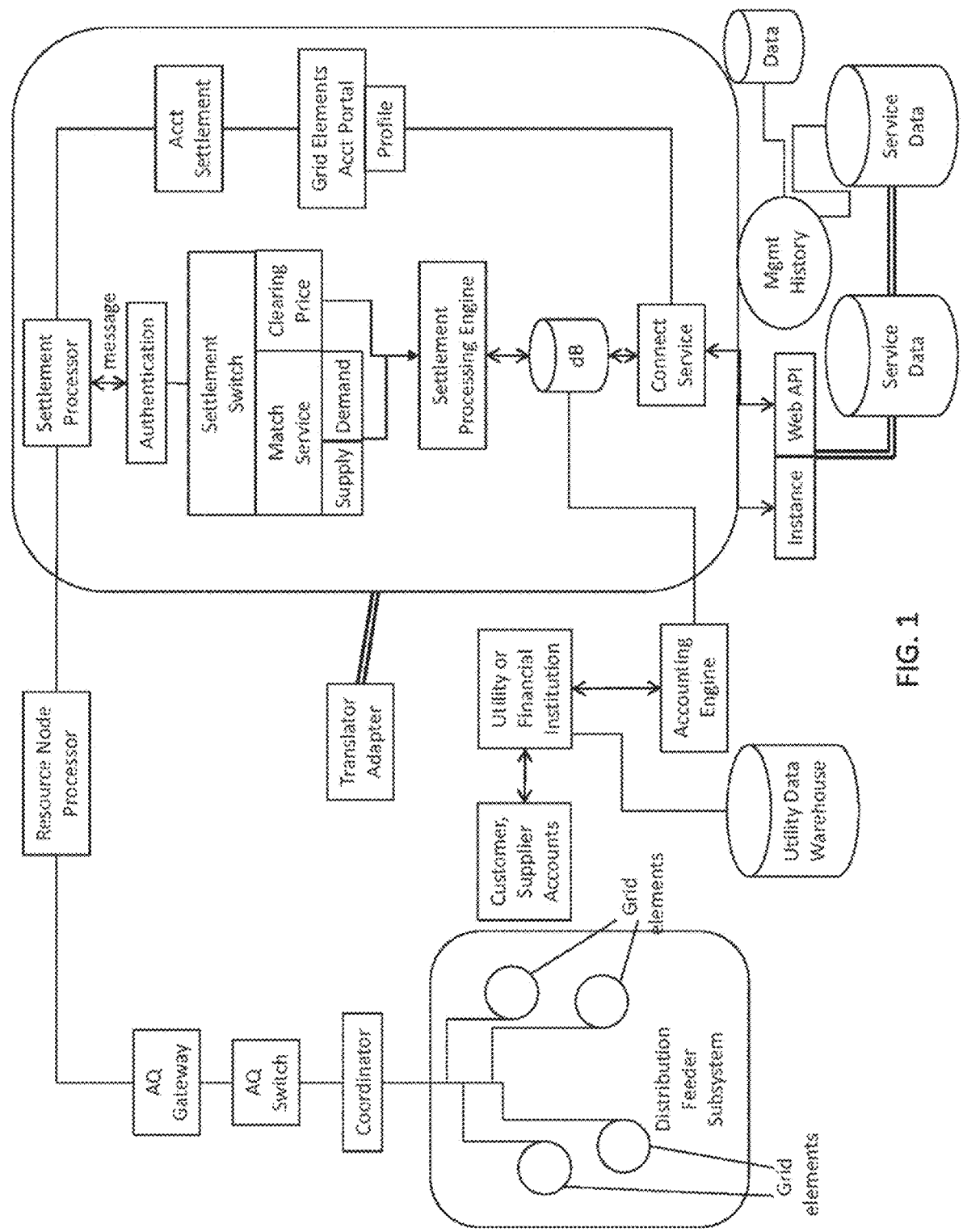
FIG. 1 is a schematic diagram illustrating settlement processor systems and methods of the present invention including grid elements, coordinator, translator, and settlement processor components.

By way of background context for financial settlement systems under existing market rules for electric power grids, any generation supplier, including Market Participants (supplier), may elect to participate in an economic dispatch for supplying electric power or Operating Reserves to the electric power grid. For example, Pennsylvania, Jersey, Maryland Independent System Operator (ISO), (PJM) is a non-profit entity that provides for economic dispatch; PJM Interconnection (PJM) is a regional transmission organization (RTO) that coordinates the movement of wholesale electricity in all or parts of several states within the USA (www.pjm.com). Acting as a neutral, independent party, PJM operates a competitive wholesale electricity market and manages the high-voltage electricity grid to ensure reliability for millions of customers in the USA under the jurisdiction of the Federal Energy Reliability Commission (FERC). Under the current system, the supplier submits voluntary price and quantity bid(s) on a day-ahead basis or real-time basis, specifying the price(s) the supplier is willing to accept within a predetermined or specified range of output(s). Voluntary price and quantity bids supersede PJM's previous reliance on cost-based estimates. Suppliers have equal access to all wholesale loads served, and PJM's bidding and dispatch rules apply uniformly, without regard to suppliers' ownership or affiliation. Note, however, that prior art systems and methods fail to provide equal access to all suppliers, particularly those suppliers who do not provide at least a minimum level of supply quantity; this is one reason that distributed power systems and methods fail to provide for reasonable market-based settlement for all suppliers, regardless of volume or quantity of supply.

By contrast to the prior art, the systems and methods of the present invention provide for aggregation of suppliers until at least the minimum acceptable quantity is reached, i.e., a power trading block (PTB) unit (minimum) is reached or achieved by the aggregation of suppliers distributed who are willing to supply and accept at predetermined market pricing levels. Thus the present invention advantageously provides for market-pricing-based settlement for all suppliers, even those who are willing and able to supply an amount less than the minimum, since the aggregation of a multiplicity of suppliers' quantity into a minimum PTB unit is realized under the systems and methods of the present invention.

Furthermore, on the basis of voluntary price and quantity bids received, PJM determines market clearing prices at each location or node on the electric power grid, i.e., locational marginal prices (LMP) based upon the marginal cost of serving the last increment of load at each location. Market clearing prices are paid to all suppliers participating in the economic dispatch, while differences in locational prices between the point of withdrawal and the point of injection of electrical power into the electrical power grid are used to price the transmission between those points and to account for congestion in transmission and distribution of the power in the grid. After reviewing all scheduled and actual flows on the grid, PJM adjusts generation and loads as needed to maintain frequency, equilibrium between loads and resources, and meet voltage and other reliability constraints. To relieve transmission constraints, PJM is required from time to time to dispatch generation out of merit order.

Additionally, and alternatively to integrating with existing PJM-based or legacy-based settlement systems and methods for improving settlement accuracy and for providing grid element-specific settlement data, real-time or near-real time (less than about 15 minute intervals) bidding and acceptance is provided under the systems and methods of the present invention, thereby providing an automated clearinghouse for grid element participation in electric power supply to the electric power grid on a real-time or near-real-time (less than 15 minute interval) basis, or any sub-increment of time required for settlement of curtailment technologies as contemplated by FERC Order 745 (137 FERC ¶ 61,215 issued Dec. 15, 2011 and 134 FERC ¶ 61,187 issued Mar. 15, 2011), incorporated herein by reference in its entirety, which one not skilled in the art could reduce to "Negawatts equals Megawatts" for purposes of compensation. Any sub-increment of time as contemplated by FERC Order 750 (135 FERC ¶ 61,041 issued Apr. 21, 2011) and FERC Order 755 and 755-A (755 can be found at 137 FERC ¶ 61,064 issued Oct. 20, 2011; 755-A can be found at 138 FERC ¶ 61,123 issued Feb. 16, 2012), both Orders being incorporated herein by reference in their entirety, which one not skilled in the art could reduce to a general description as ANY micro or macro supply source that provides capacity, energy, and grid stability via its operation may be paid the clearing price for providing this energy resource at the nearest clearing location, which could be a resource node, a LMP, a utility service boundary, a balancing authority, a transmission intersection, a point where metering defines a boundary between two Market Participants as defined by FERC, NERC, ISO, or any governing body that regulates matters associated with the electric power grid. Furthermore, to facilitate advanced settlements, the automatic registration of any grid element is essential for the automated settlement under the present invention.

At the time of the present invention, the electric power grid provides for pricing and settlement based upon the market pricing on at least a one-day-ahead basis. However, because of newly issued FERC orders 745, 750, 755, micro and macro technologies evolving for meeting the requirements of FERC 755 would require improved timing of pricing and settlement.

Advanced Settlements Overview

To address the shortcomings of the prior art and to meet these requirements, the present invention provides for real-time and/or near-real-time pricing and settlement in less than the day-ahead basis provided in the prior art, and more preferably less than about 15 minute intervals. IP-based messaging communications from grid elements as suppliers and through corresponding coordinators, the registered grid elements may participate in offering on a geodetic basis from specified nodes or attachment points associated with the electric grid, pricing and quantity available on the real-time and/or near-real-time basis, which is preferably automatically accepted by market participants through the communications system and energy routing systems and methods of the present invention.

The present invention further provides for a resource settlement point or resource settlement node, which provides for the location of the settlement of the grid element for participation in the electric power grid. It functions as the attachment point for the grid element, and it can be either static or dynamic, i.e., it may provide for the grid element participation location at or across the intersection of transmission boundaries, utility service areas, and provides that the grid element itself serves as a point of demarcation for settlement of financial transactions for load, supply, transmission, capacity; the resource settlement point or resource settlement node is determined by the governing entity, and is changeable or dynamic, for example, by the TDSP. For batteries, or mobile supply or storage device, such as by way of example and not limitation, electric vehicles, which are mobile and attach to the electric power grid for consuming power (charging) and/or supplying power (discharging), the resource settlement point or resource settlement node, is dynamic, and is preferably reported through the coordinator, and then translated back to the legacy systems, such that the mobile grid element (in this example, an electric vehicle) becomes the financial settlement point, and is moveable to more than one location at the grid, for supply and/or demand or consumption of energy. The resource service node functions to route or change the routes depending upon the congestion detected within the transmission or distribution of the grid, which provides for dynamic pricing, depending upon the congestion in the grid. So the coordinator provides for least cost routing in conjunction with GUIs and web services with the legacy systems and the settlement processor of the present invention. The ISO reports the status of the grid to the coordinator, which determines the optimal financial settlement for grid element participation. The profiles are further considered by the coordinator for the grid elements for assessment of grid element participation location, timing, and combinations, for the supply and/or consumption of energy from the grid with respect to optimal pricing for that grid element.

The present invention also facilitates the ability to bid, clear, and settle in more locations and by new methods than those in current art. Legacy grid operations and EMS are in communication with the coordinator; SCADA control, distribution automation, transmission reporting, OASIS, and other legacy systems for grid operations and settlement. According to the present invention, the coordinator monitors capacity, position and/or location of grid elements, state of grid elements, their operational purpose on the electric grid, supply pricing and quantity bids by grid elements registered with the coordinator to participate in supplying and/or consuming power from the grid, wherein load curtailment is also offerable as supply by those grid elements, and considered for settlement based upon market price as set forth hereinabove. The price per kilowatt packet, which includes kilowatt hour(s), PSV, PTB, grid stability information, and combinations thereof, is communicated between the coordinator and grid elements, and those grid elements participating in the market pricing acceptance, such as PJM.

When a grid element is introduced to the electric power grid, the grid element communicates to the grid network, via standards-based or proprietary protocol, through a plurality of communications methods whether they be wired or wireless, its necessary information to be incorporated and function as designed or intended on the electric power grid. The grid element registers through a coordinator, preferably, after which the coordinator tracks the grid element and its participation in the electric power grid. The information relating to the participation of the grid element is also communicated to the legacy or operational grid systems, as well as the financial sub-system(s), which receives the information about the function and participation of the grid element, registers the grid element for settlement-based (or financial) participation in the grid; preferably this information is network-based communication through the coordinator and/or the translator, according to embodiments of the present invention. The financial sub-system updates the market, preferably via communication to the market participant or utility, the grid element, and coordinator. A customer identifier, a billing identifier, a grid element unique identifier, and combinations thereof are assigned to the grid element. Importantly, the grid element is registered for participation in the electric power grid as a supplier and/or consumer of electric power from the grid.

A profile is provided or created for the grid element, by the market participant, utility, etc., by the owner of the grid element, and combinations thereof. Preferably, various parameters, inclusive of market pricing conditions via a customer profile that can be loaded via a smart phone, tablet, or any web-enabled appliance for accepting or modifying a profile or moreover a profile that automated controls based upon previously selected economic messages.

An attachment model is created depending upon the function and purpose of the grid element's participation and provided by the grid element to the utility, grid operator, ISO, market participant, and combinations, with that communication also being IP-based messaging through the coordinator via a communications network. Preferably, encrypted IP-based messaging is used for grid element communications. Settlement for a grid element is preferably less than about 15 minute intervals for supply, curtailment as supply, and consumption of electric power, and includes the grid element geodetic location at the time of the grid element participation. Improved settlement provides for communication with the financial sub-system, the market, the ISO, the market participant, utility, and combinations, all via web-based communications. The financial sub-system serves as a clearinghouse for the grid element(s), and functions as a point of sale for electricity to the electric power grid. Additionally, active grid element profiles for power consumption are included in the present invention. The embodiments described utilize concepts disclosed in published patent application US 2009/0062970, entitled "System and Method for Active Power Load Management" which is incorporated by reference in its entirety herein. The following paragraphs describe the Active Management Load System (ALMS), which includes at least one Active Load Director (ALD), and at least one Active Load Client (ALC) in sufficient detail to assist the reader in the understanding of the embodiments described herein. More detailed description of the ALMS, ALD, and ALC can be found in US Application Publication 2009/0062970, which is incorporated herein by reference in its entirety. Generally, the embodiments described encompass a closed loop system and method for creating a profile, calculating and deriving patterns of energy usage and/or supply, and making use of those patterns when implemented through the machinery of a system comprised of active grid elements combined with the physical communications link and when these inputs are manipulated through a computer, processor, memory, routers and other necessary machines as those who are skilled in the art would expect to be utilized.

In another embodiment, energy consumption patterns in active grid elements profiles are used to identify active grid elements that are the best targets for excess power sharing or for supporting grid stability. This would occur when renewable energy such as solar or wind is added to the grid, resulting in power that cannot be compensated for by the grid except typically "net metering" for installations less than 1 MW. Under "net metering" a supplier of solar energy is compensated at the grid element at the retail rate or a pre-negotiated rate and is not compensated for the supply of power based upon market conditions or in support of grid stability. For wind generated power, oversupply conditions could occur, for example, on very windy days. When this happens, utilities or market participant, grid operator, EMS, or equivalent are faced with the problem of what to do with the excess energy. Instead of cutting power to service points in order to affect power savings, a utility, market participant, grid operator, EMS, or equivalent could add energy to service points and through active grid elements associated with those services points in order to effect power dissipation. The service points and/or active grid elements selected by the Coordinator may be different (or even the inverse) of those selected for power savings. The devices at these service points would be turned on if they were off or set points for climate-controlled devices would be adjusted to heat or cool more than normal. Spread out over many control points, this can provide the energy dissipation needed. Those grid elements are then compensated for offering grid stability in the over supply condition which is recognized in the industry as supplying regulating reserves for the purpose of grid stability In a further embodiment, energy consumption patterns within active grid elements profiles could be used to identify opportunities for up selling, down selling, or cross selling. These opportunities may be determined by the power utility or by its partners. Data from active grid elements profiles and their participation on the electric power grid may be used to provide insights on inefficient devices, defective devices, or devices that require updating to meet current standards. Active grid elements profiles data, and/or data associated with their participation on the electric power grid, individually or collectively (or selectively) in the aggregate, may also be used to identify related power grid participation opportunities.

Active grid elements profiles and the active grid element participation on the electric power grid may also be dynamic, and settlement processing associated with those grid elements includes consideration of those profiles, in addition to the data from participation of the grid elements for supply and/or curtailment, and for energy consumption as well. By way of example, the active grid elements and their participation within the electric power grid to utilize real time communications from an electric utility grid, market, market participant, utility, REP, CSP or any other entity authorized on behalf of the owner, in combination with the profiles of the active grid element, to act on their behalf to control load consuming devices owned by the consumer and connected to the electric utility grid. Preferably, the active grid elements receive this information automatically through a plurality of methods utilizing IP-based communications methods and web based devices such as smart phones, computers, text messages, paging messages, or even voice response units or live customer service agents. Under this real time scenario, active grid elements could dynamically "Opt In" to a pre-determined profile or "Opt Out" or more importantly change the profile dynamically to take advantage of real time market pricing of electricity being sold by the utility, market participant, REP or any entity authorized to buy, sell and trade electric commodity or demand response products on behalf of the owner.

Transmission and distribution losses are generally modeled to estimate losses, rather than having actual data, in the prior art financial settlements for the electric grid; power flow and power loss models are used due to the lack of availability of actual data or lack of use of information made available by actively reporting grid elements. Modeling is usually provided by the transmission distribution supply (TDSP) and/or utility; they are given information so that they can calculate (or model) the transmission losses, rather than use actual data for the losses. Transmission and distribution loss modeling are used in each feeder and each electrical bus and substation to approximate losses between electrical buses, substations and end point where the load is being served. These are also used when empirical data is available; they are industry-accepted practices that provide a level of engineering safety and capacity factors which are widely accepted practices. Instead of relying only on modeling, the empirical data are used to correct the models, but it is important to note that the losses and some grid operations that are affected by transmission and distribution use modeling for grid operations and inherently are less effective than the use of real-time and measured data from actively reporting grid elements where models are replaced with actual values. All models have coefficients of loss that may be improved; the modeling is improved for all the data provided. Transmission loss models are considered for frequency, distance, size of cable, etc., and combinations thereof.

Generation losses are also a function of the efficiency of transfer, efficiency of transformers, efficiency of resource node, etc. and combinations thereof. Age of transmission cables, size/capacity of cables, material utilized in the transmission line, temperature, insulation, capacitance and reactive power elements, age of material, type of material, degradation, bending radius, etc. and combinations thereof are all factors used in modeling and will also affect the actual empirical measurements or data. Empirical data is characterizing the distribution environment so that the modeling is more accurate. Self-correcting algorithms employed in the model that consider the empirical data can be used to create closed loop systems that act upon the data without the need for human intervention. Temperature, humidity, physical environment factors (e.g., connector/connection, etc.).

By way of example and not limitation, consider the grid element as a smart meter, small-scale generation, load curtailment applications. In the example of small scale generation, or independent power generation, such as a back-up gas-powered, diesel or any fossil fueled generator or fuel cell, a resource node is designated by the grid operator and provided with a revenue grade meter associated therewith to provide the grid operator with information about the amount and type of energy or reserve provided to the electric grid, and a coordinator associated with the grid element (back-up) supply source. Prior art approximates with whatever interval data is provided at the resource node and supplied by the revenue grade meter what each supplier provides on any given day. Payments in current art are staggered over a typical 30 days interval from each generation day where energy and reserves are provided to the electric grid. Data from the suppliers are submitted to the ISO to indicate what was provided but the teachings in the present invention introduce more dynamic methods that may increase the accuracy of the settlements provided to each supplier while decreasing the interval of time required to receive payment. Payment is provided about 30 days to about 1 year later. In current art, minimum PTB is about 100 kilowatts to be considered for a bid for supply to the electric power grid. The present invention provides metrology grade active load client (ALC), which is also an active grid element, providing to the EMS through a coordinator in communication by IP-based messaging over a network, and then to an active supply director. The grid element supplying power (generating power for supply to the electric power grid) provides its output through a TDSP smart meter, collecting near-real-time information, telemetry, and metrology through the reading of ANSI or other approved C12.19 tables, communicated to qualified scheduling entity (QSE) and/or energy registration or trader that presents the aggregated generation (at least one PTB unit minimum) and/or operating reserves PTB to the market. Alternatively, the market supplies information to the coordinator, which communicates to the ASD, to call immediately or in near-real-time to generate supply at market prices and to introduce it to the feeder associated with an electrical bus or substation of an electric power grid. The coordinator communicates with the market for obtaining market price at the time of supply, and with the market participant(s) or utility, NERC/FERC, preferably with bi-directional communication. The market is always providing transmission information, price per kilowatt packet, modeling, forecasting, clearing, schedules, and combinations in real-time or near-real-time. The ASD and/or coordinator preferably communicate over a reliable IP-Based network, one-to-many small generation supply or load curtailment grid elements.

Market information is supplied from the market through the coordinator to the grid elements so that profiles associated with grid elements may be matched, or modified or changed to match, the market needs at that time. Preferably, each grid element has a unique grid element identifier, unique grid profile, and further includes financial account information, for supply or consumption of power to the electric power grid. The profiles are provided from the grid elements through the coordinator to the market and/or market participants. The coordinator also works with the ASD, ALD, and the legacy systems in a Web Services environment through a translator, if necessary, to ensure communication between the operating systems providing electric power throughout the electric power grid and the financial settlement systems and communications associated therewith.

Complex financial pooling agreements are provided to allow for dispatch capability of calling up resources on stand-by to meet reserve requirements for a utility, market participant or grid operator. Forecasting is provided for a generation schedule to each active supplier of energy and reserves based either upon the forecasted grid need or based upon market awards based upon bids submitted to the grid operator, ISO etc. Because of a lack of real-time information and a lack of modeling accuracy, the grid operator, market participant, utility, and combinations must monitor the grid constantly due to the lack of large scale storage of energy and since supply to the grid, net of grid losses, must always meet supply plus the Operating Reserve requirement as specified by the governing entity. Grid transmission and dispatch (under commercial applications such as OASIS) is observed to determine the market pricing and availability of transmission capacity and power (quantity) flows across transmission intersection points, balancing areas, LMPs or any junction specified by the governing body; the transmission capacity is made available to all market participants, whether supply or generation.

The present invention provides systems, methods, and apparatus embodiments for electric power grid and network registration and financial settlement of participation of grid elements in supply, curtailment, and/or consumption of power within the electric power grid. Accordingly, grid elements are transformed into active grid elements following initial registration of each grid element with the system, preferably through network-based communication between the grid elements and a Coordinator. Also preferably, messaging is managed through a network by a Coordinator using IP-based messaging for communication with the active grid elements, with the energy management system (EMS), and with the utilities, market participants, and/or grid operator's subsystems necessary for electric grid operations and grid stability. Following initial registration, the multiplicity of active grid elements function in the grid through the coordinator and any associated control systems such as an Active Load Director an Active Supply Director, an Energy Management System, Master SCADA system or any new or legacy system utilized for reporting, telemetry, command & control, status, normal or emergency electric grid operations in the generation subsystems (of all generation capacities and types) that supply capacity/energy to the electric grid, storage devices that supply capacity and energy to the electric grid and/or load curtailment acting as supply or capacity (as in FERC 745), wherein the registered, active grid elements and their corresponding activities and information associated with those activities are tracked and managed in accordance with regulations and standards governing the electric power grid. Furthermore, settlement is provided for activities of grid elements, namely, financial settlement that corresponds to participation by each of the grid elements within the electric power grid, wherein the settlement is preferably provided in real-time or near-real-time, or less than about 15 minute intervals or any sub-15 minute settlement increment as determined by the aforementioned bodies that regulate the activities of the electric power grid, but within the physical limitations of current grid element technologies and that contemplate, through this art, the ability for grid elements to report more frequently to improve grid stability and to provide efficiencies and cost savings to consumers of energy, based upon data supplied through the coordinator and through a translator via network-based communication with the settlement processor, as illustrated in FIG. 1. Included with the settlement processor are components for authentication, customer verification, location, attachments, settlement switch and associated match service for supply and demand, and clearing price, operable within a settlement processing engine having rules illustrated in FIG. 1, and in communication with a database, connect service for account management and grid element account portal, including grid element profiles, and further connected with web APIs and service database, enterprise service bus, and service data, further including management, historical, and settlement history data stored in corresponding database(s) or proprietary custom interfaces necessary for newer grid elements and their subsystems to interface with older subsystems of control and settlement of the grid operators or Market Participants. A translator further connects in network-based communication with the settlement processor to an accounting engine, utility and/or financial institution accounts, and customer and/or supplier accounts for settlement associated with the grid elements and their owners. The grid elements are physically electrically and network-based communication connections within distribution feeder subsystems, including connection to the electric power grid at a multiplicity of attachment points. The grid elements are further connected via a coordinator, which is preferably, but not exclusively, co-resident with the settlement processor, and further in electrical network-based connection with an acquiring switch, an acquiring gateway, and then with a resource node and corresponding resource node processor, which is in network-based communication connection with the settlement processor, as illustrated in FIG. 1. Also preferably, the settlement processor communicates with legacy settlement processor(s) and/or database(s) associated with the resource node and/or load zone, and the settlement processor accesses or references the related location-based marginal price for the grid element participation associated with the resource node(s) and/or load zone(s) corresponding to the grid attachment point for that participation and/or activities within the electric power grid.

According to the present invention, at least one grid element of the grid element(s) includes transmission or distribution control node(s), monitoring node(s), telemetry node(s), routing node(s), electrical routing node(s), fault protection node(s), generation node(s), load control node(s), devices (active & passive), sensors, etc., wherein a node may further include an interface and/or an attachment to the grid. The grid operations include functionality that is provided by a multiplicity of different grid elements associated with supply, command/control, monitoring, and curtailment activities as separate activities for active grid elements.

Overall, the systems and methods, and apparatus of the present invention provide grid element(s) and their registration for initializing their functionality within the electric power grid, wherein the registration transforms the grid element(s) into active grid element(s) through network-based communication with a server and/or a processor operatively coupled with a memory. The functionality of each grid element, following registration and transformation into active grid element(s), varies according to the grid element itself and its physical connection to the electric power grid. In many instances, the active grid elements function to provide power supply and/or curtailment as power supply, and/or capacity for same, that provides for grid stability, operating reserves, and/or other reserves of an electric power grid. However, in every case, any active grid element registered with the electric power grid management system must be operable for network-based communication with the server and/or the processor operatively coupled with memory. More preferably, grid elements communicate through a Coordinator via messaging communicated over a network, wherein the messaging is Internet protocol (IP)-based messaging, or proprietary communications network protocols and transported by a plurality of network methods as described hereinbelow.

Each grid element has a first location within a first boundary, which is referenced as a home identifier. A corresponding foreign identifier is used for each grid element with respect to other entities outside the first boundary, i.e., wherein the grid element(s) change connection or position with respect to the electric power grid connection point or node, or the grid element(s) are also identified with a second location at another point in time relating to settlement. For the case of movement or change in connection or position for each grid element(s), the corresponding unique grid identifier changes to reflect the location change, and the rules governing settlement for the grid element change with respect to function, timing, location, boundary, etc., as well as changes in security. The present invention further provides for a home location register wherein at that point in time within the boundary the grid element is an active grid element that is registered to participate in the electric power grid by supply and/or curtailment. Correspondingly, a visitor location register is provided and associated with the second location of the grid element(s).

The present invention further includes messaging to mobile device(s) and/or remote computer devices or processors relating to activation or deactivation of any grid elements registered and associated with communications through that mobile device, and for settlement information to be including with the messaging of grid element(s) participation within the electric power grid. By way of example and not limitation, the systems and methods of the present invention provide for automated messaging to the grid element owner(s) regarding the most efficient settlement zone and/or attachment point for the grid element and communication of information for mobile settlements. A maintenance port is provided within each IR reader for changing the billing plan and retail electric provider instantly if the message is not transformed thru the existing mobile device. If sharing databases or persistence layers, then messaging makes automatic modifications to billing system, etc. Included with the systems and methods of the present invention are the context of relevant boundaries (or zones) to determine how to define and invite new participants automatically based upon profiles and location and registration attributes.

DETAILED DESCRIPTION

The present invention systems and methods for settlement of transactions within an electric power grid network include: a settlement processor, comprising a server and/or a processor operatively coupled with a memory, database, constructed and configured for electrical connection and network-based communication via a network with at least one coordinator, wherein each of the coordinator(s) is constructed and configured for electrical connection and network-based communication with at least one active grid element that is registered to participate within the electric power grid.

The present invention systems and methods further include a translator constructed and configured in network-based communication with the coordinator and with at least one legacy system for financial settlement processing. Note that settlement for participation in the electric power grid for supply, curtailment as supply, and/or consumption or usage of power (demand) includes electric utility power settlement, alternative energy settlement or credits, including but not limited to carbon credits, and combinations for at least one power trading block (PTB) unit within or across any boundary, balancing authority, grid operator or market. The financial settlement is provided in at least one currency, and preferably is provided in an electronic financial settlement or digital financial settlement, which does not require physical currency exchange between participants in the electric grid.

In preferred embodiments, the settlement processor operates to provide an automatic and/or autonomous financial settlement for each of the active grid elements based upon their participation within the electric power grid. Furthermore, the settlement processor provides a financial settlement based upon a kilowatt packet (KWP) unit, a power supply value (PSV) unit, a power trading block (PTB) unit, and combinations thereof. A KWP is one or less kilowatt hours units, or any government, regulatory, or governing entity for an electric power grid accepted method for quantifying rate for monetization for any unit of kilowatts with respect to time. Thus, the financial settlement of the present invention is optimized for each KWP, PSV, PTB, and combinations for each grid element that participates in the electric power grid (in any way). The present invention provides settlements that are currency and/or commodity agnostic, i.e., the settlement is not restricted to a single currency or commodity. The present invention systems and methods provide any improvement in settlement from the initial settlement where the participation in the electric power grid is financially compensated in either direction (supply or demand) including but not limited to: improved data, improved accuracy, improved analytics relating to grid element participation, and combinations thereof. These improvements reduce the amount of uncertainty associated with losses, lack of data, gaps in data, etc. with respect to the electric power grid and grid element participation thereon and financial settlement therefor. Notably, aggregation analytics ensure optimized settlement for each grid element, including consideration of boundaries, timing, attributes, etc. The effect is that electric power flows through the grid are considered equal irrespective of source, so long as the supply meets regulatory requirements associated with the functioning of the grid. This provides for essentially functioning cooperatives of grid elements that are not retail electric providers, but have the net effect of and/or function virtually as retail electric providers, because their aggregation, analytics, combination, integration, and combinations thereof allow them to function and to receive compensation as if they are macro generation, due to increased data sampling and/or accuracy within predetermined locations that is different from other geodetic locations due to the spreading effect that is greater at the first location. So then because the data provided by the systems and methods of the present invention are more accurate and better than anyone else within the boundary or settlement zone on that day, grid elements and their owners using these systems and methods will always receive the best compensation for their participation in the grid at that time. Additionally, the systems and methods provide for connecting or forming of aggregation blocks that are boundary independent and that are contrary to the existing geodetic boundary for providing a virtual utility zone with the aggregated PTBs. The creation of the PTBs and power supplied by multiplicity of grid elements has its own carbon footprint and corresponding carbon credits, so then alternative energy credits, offsets, or other form of settlement may also be aggregated, including carbon credits, NOx, sulfur reduction, are effectively aggregated into alternative energy credits as PTBs. The present invention provides for grid elements to have virtual settlement points (or attachment points) and/or virtual PTB groupings. Thus, virtual grid element settlement points provide a substitution for physical boundary-based settlements.

By way of improvement over the prior art, the settlement of the present invention is processed by the settlement processor in a predetermined timeframe associated with reporting frequency associated with the participation of grid element(s) within the electric power grid, wherein the day of participation is considered day zero (0); data relating to the participation for those grid elements is more accurate than any other because the data gathering, modeling, sampling, and combinations are made at less than 15 minute intervals.

The at least one coordinator is remotely positioned from the settlement processor, and the participation of the grid element is communicated to the coordinator via the network. Preferably, the participation of the grid element is automatically and/or dynamically communicated to the coordinator via the network, preferably in real-time or in a predetermined timeframe, and the network-based communication is a standards-based communication or a proprietary communication, and more preferably includes IP-based communication that is routable through a router and/or through a coordinator.

Within the electric power grid or any sub-grid level, a multiplicity of grid elements aggregate and/or integrate through a master or aggregator grid element and/or a virtual grid element that represents the participation of the multiplicity of grid elements as one grid element, i.e., digital cross-connection wherein the master grid element is over the other grid elements associated with it. Thus, following registration with the system, each of the multiplicity of grid elements, upon aggregation or integration, and association with the master grid element, transform into sub-grid elements, wherein the sub-grid elements have corresponding financial settlements that are unique and correspond to each of the sub-grid elements, and wherein a financial settlement is unique to each sub-grid element, and furthermore, is unique to the location and function of each sub-grid element for its participation in the electric grid. The unique financial settlement for each sub-grid element further includes coordination with at least one virtual ID and/or smart meter. Furthermore, each of the grid element(s) is a device that provides any power that is monetized and recognized by a governing entity associated with the electric power grid.

In the case where at least one of the at least one grid elements is a control device, the control device operates, programs, and/or updates the power-consuming device. The grid element(s) may be selected from the group consisting of: a sensor, a power-consuming device, an appliance, a meter, a switch, a controller, a control device, a power control subsystem integrated with grid element for supply, a thermostat, a building control system, a security device, any electrical device, and combinations thereof. At least one of the grid elements is under the control of an energy management system (EMS) and/or SCADA system. In any case, preferably each grid element includes telemetry, wherein the telemetry follows industry standard for EMS and/or SCADA control.

According to the present invention the transformation relating to the active grid element enables the active grid element to provide operating reserves and/or grid stabilization for the electric power grid. The grid elements transform into a corresponding plurality of active grid elements after initial connection with the server via the network. The grid element(s) is/are an electrical device that provides or consumes electric power from an electric power grid, wherein the supplied power is reactive power, voltage support, supplied power for operation, and combinations thereof. Data is transformed at the grid element level, or at the sub-meter level, based upon location with the grid, the function it performs with respect to the participation in the grid, monetizable equivalence (which may be paid for settlement differently in different ISOs, e.g., ERCOT for emergency interruptible load service, PJM for interruptible load reserves, wherein the timing is different. Attributes and/or profiles for each of the activated, registered grid elements are associated with each grid element after its transformation. Preferably, each of the at least one grid elements has a unique grid element identifier, which includes at least one of an unique customer identifier or a tax identifier. An unique grid element identifier includes an IP address, equipment identifier, mac address, or combinations thereof. Preferably, the unique grid element identifier further includes location-based factors, such as Google Earth, ray tracing for geodetic locations, physical mapping and combinations thereof, time-based factors, grid-function-based factors, and combinations thereof.

In one embodiment of the present invention, the server initiates the financial settlement of the participation of the at least one grid element, and the financial settlement of the participation of the at least one grid element is stored in a database or any data storage such as ASIC chips, wherein the data is persisted at the grid element, accessed from memory registers, transformed, and communicated or transmitted to the server through the network and preferably via the coordinator, wherein the database is registered with an ISO, BA, control area, utility service area, any geodetic junction where settlements are performed as determined by the governing entity, and/or FERC. Settlement of the present invention is preferably associated at or proximal to the grid element location and/or the participation of the grid element within the grid, and the financial settlement is a function of load or supply.

A multiplicity of databases that are constructed and configured in network-based communication for receiving settlement data from a multiplicity of grid elements may be provided, wherein the databases may be cross-linked or associated in network communication, and may further include internal tables with rows, columns, and values; the server may extract, transform, and replicate data across the databases. As will be appreciated to one of ordinary skill in the art, the databases include at least one production database, and connection layers in at least two parts, further including middleware that connects multiple applications to databases (APIs that are SOA-based), and that allow native applications to send info in SIMM format to allow connection to databases, messaging engine(s) that may interact with a cache or persistence layer, and applications that sit on top of it, as well as firewalls and other physical security, encryption layers, and combinations. Encryption may be direct networked, cloud-based, IP-based or Ethernet-based network encryption.

The at least one coordinator provides for routing messages from the multiplicity of grid elements through the network connecting the databases, and wherein servers operating the databases exchange information associated with the grid elements for affecting grid stabilization.

Each grid element is registered with the system and wherein the registration of grid elements is stored in the databases for predetermined periods of time for use with a financial settlement associated with the grid elements, and the information relating to financial settlement of the participation of the at least one grid element is stored in a database, and any raw measurement data is transformed into settled measurements for storage in a database. Furthermore, the information relating to grid elements participation is transformed from raw data into settlement data, and wherein the settlement data is stored in a database. Preferably, a web-based graphic user interface (GUI) display operates to communicate information to the grid operator(s) via encrypted IP-based communication. Raw measurements are not required to be retained in the database(s); however, transformation methods are retained and transformed settled data are retained; such that if market rules change, then the system and methods of the present invention provide for optimized settlement based upon updating the settled data to reflect latest rules. Thus the analytics engine(s) provides for reversible, updatable data from raw to settled, and then updated settled, to improve the settlement financial amount to compensate the participation of the grid element(s) within the electric power grid at the optimal rates for that period of time for the participation. Overall, the present invention provides for better, more accurate settlements in any format, including traditional currency or commodity trading or valuation, bartering KWP in PTB unit(s) in exchange for non-currency remuneration, credits, and combinations thereof.

The registration information associated with grid elements is used to determine attachment points to the electric power grid for distribution and transmission of power, and wherein the attachment point information associated with the grid elements is communicated to the settlement processor.

The settlement information associated with grid elements is preferably further communicated to or accessible by the market participant, utility, grid operator, etc., wherein a settlement is made for each grid element, and the settlement complies with regulations and/or standards established by FERC, NERC, and/or a governing authority for the electric power grid.

The server communicates a settlement message to each of the at least one grid elements via the network, wherein the settlement message is preferably an IP-based message. The grid element participation in the grid is provided for use by market participants via a display through a web-services enabled GUI. It may be accessible to and/or communicated via the network to payer and payee, trader, consumer, resource provider, TDSP, and/or market participant or entity who would benefit from having the capacity to monitor settlements including but not limited to ISO, RTO, etc., which need visibility to clearing price, and to financial settlements for grid element participation. Empirical data of the present invention associated with each grid element, because of its actual data collection over less than 15 minute intervals, has more granularity than modeling used in the prior art, so that the present invention systems and methods provide higher accuracy information that is relevant to making market-timing decisions and actions relating to participation by grid elements and owners thereof. For example and by way of comparison, this is not unlike futures trading in the markets, which requires visibility into clearing price. The exchange of information and its display and representation of data for advanced and automated settlements is preferably associated with kilowatt packets, PSVs, and PTBs. Real-time access for trading and for participation in the grid by grid elements is improved. Speed and security of data, in addition to increased accuracy and increased timeliness of data provided and communicated within the systems and methods of the present invention provide for improved financial settlements for participants. Empirical data has more granularity than modeling used in the prior art, the present invention provides higher accuracy information that is relevant to making market-timing decisions and actions relating to participation by grid elements and owners thereof, for example and by way of comparison like futures trading in the markets, which requires visibility into clearing price.

This settlement message associated with the grid element participation is transmitted either wired or wirelessly by grid elements, and includes an interface that facilitates communication of the settlement message with the grid elements, such as an interface that includes an IP-based interface. An IP-based interface is preferably selected from the group consisting essentially of WiMax, High Speed Packet Access (HSPA), Evolution for Data Only (EVDO), Long Term Evolution (LTE), any first or second generation wireless transport method such as EDGE, or Code Division Multiple Access, Ethernet, any proprietary Layer 1-4 protocol that contains or is capable of transporting an Internet Protocol message, and combinations thereof. Preferably, the settlement message includes a derived Power Supply Value that meets the minimum requirements for measurement, verification and reporting accuracy as determined by the Governing Entity that regulates the operation of the electric power grid that includes utilities, market participants and/or grid operators.

Also, the systems and methods of the present invention include a security interface associated with each of the grid elements operable to receive security system messages from at least one remotely-located security system, wherein the security interface is standards-based or determined by the governing entity that regulates grid operations for utilities, market participants or grid operators.

The settlement message may further include a delivery priority including at least one of a plurality of methods to include priority access flags, virtual private networks, independent identifying addresses (MAC, IP, Electronic Serial Numbers), manufacturers specific identifying codes, or combinations thereof, wherein the methods comply with standards as determined by the governing entity that regulates grid operations for utilities, market participants or grid operators. There may be dedicated routes, private networks that are Ethernet or proprietary, or other prioritized packet or encryption formats that have been created or approved for settlements by the governing body and/or standards bodies.

The grid element(s) further include at least one mobile device having at least one access point name (APN) for providing a priority of delivery for the message, wherein the at least one grid element transmits a signal or communicates a message to the server at the point of initial connection with the server via the network. Thus, the system may initiate the settlement request based upon disconnection, etc., or a customer or owner of any grid element (user) may initiate the settlement based upon user-inputs (from a mobile device, a computer, etc.) or by any profile change for any grid element.

The grid elements communicate a signal or a settlement message to initiate a financial settlement corresponding to participation in the electric power grid, and the signal or the settlement message is routed through a coordinator, which routes the settlement message to the settlement processor.

The settlement message further includes at least one of: a geodetic reference, an element identifier, a grid element type, a grid element function, a grid element capacity, a grid element profile, a grid element attachment point reference, a kilowatt packet (KWP) value, a grid element power supply value (PSV), a grid element power trade block (PTB) value, a grid element balancing authority association, a grid element owner identifier, a grid element compatibility identifier, and combinations thereof.

The financial settlement of the present invention includes factors for grid stability-based pricing, operating reserves-based pricing, factors considering peak and off-peak timing, and combinations thereof, and further include measured data that provides higher rate for settlement compared with projected, estimated, or VEE rate, and includes variable, higher, and more accurate rate for settlement, compared with projected or VEE. Thus the coordinator and/or server with information from the coordinator transforms the raw data from grid element participation in the grid into more accurate settlement data, which is then compensated at the optimal rate for that participation for that given time period. Preferably, the financial settlement is managed by a clearinghouse between market participants and utilities, and may further include individual cooperatives, groups (non-traditional), and non-boundary constrained groups, cooperatives that function to aggregate groups, etc.

Preferably, upon registration with the grid, each of the grid elements have a home location identifier and a non-home location identifier, and wherein the financial settlement includes factors and attributes for grid element participation associated with the home location identifier and with the non-home location identifier, which may further include factors associated with boundaries, regulations associated with each of the boundaries including factors affecting settlement across boundaries, within boundaries, etc., and considers the participation of the grid elements based upon location, and rules governing their Market participation.

DETAILED DESCRIPTION OF THE FIGURES

As illustrated by FIG. 1, a settlement processor is provided for systems and methods of the present invention.

Advantageously, and by way of comparison to electronic settlement associated with point of sale transactions, for example as with gasoline purchases at a pump station with electronic payment, traditional boundaries used with financial settlements for grid elements are not restrictive factors with the systems and methods of the present invention. By way of illustration and not limitation, a grid element may be an electric vehicle; once registered through the coordinator to participate in the system, the mobility of the grid element allows it to connect and participate within the power grid to consume or draw power (charging) and to supply power (discharging the battery) at a multiplicity of locations across traditional boundaries. With the systems and methods of the present invention, the grid element location for its participation (consuming or supplying power) is automatically identified with the activities and the settlement for that participation is provided at the point of attachment.

Figure 2:
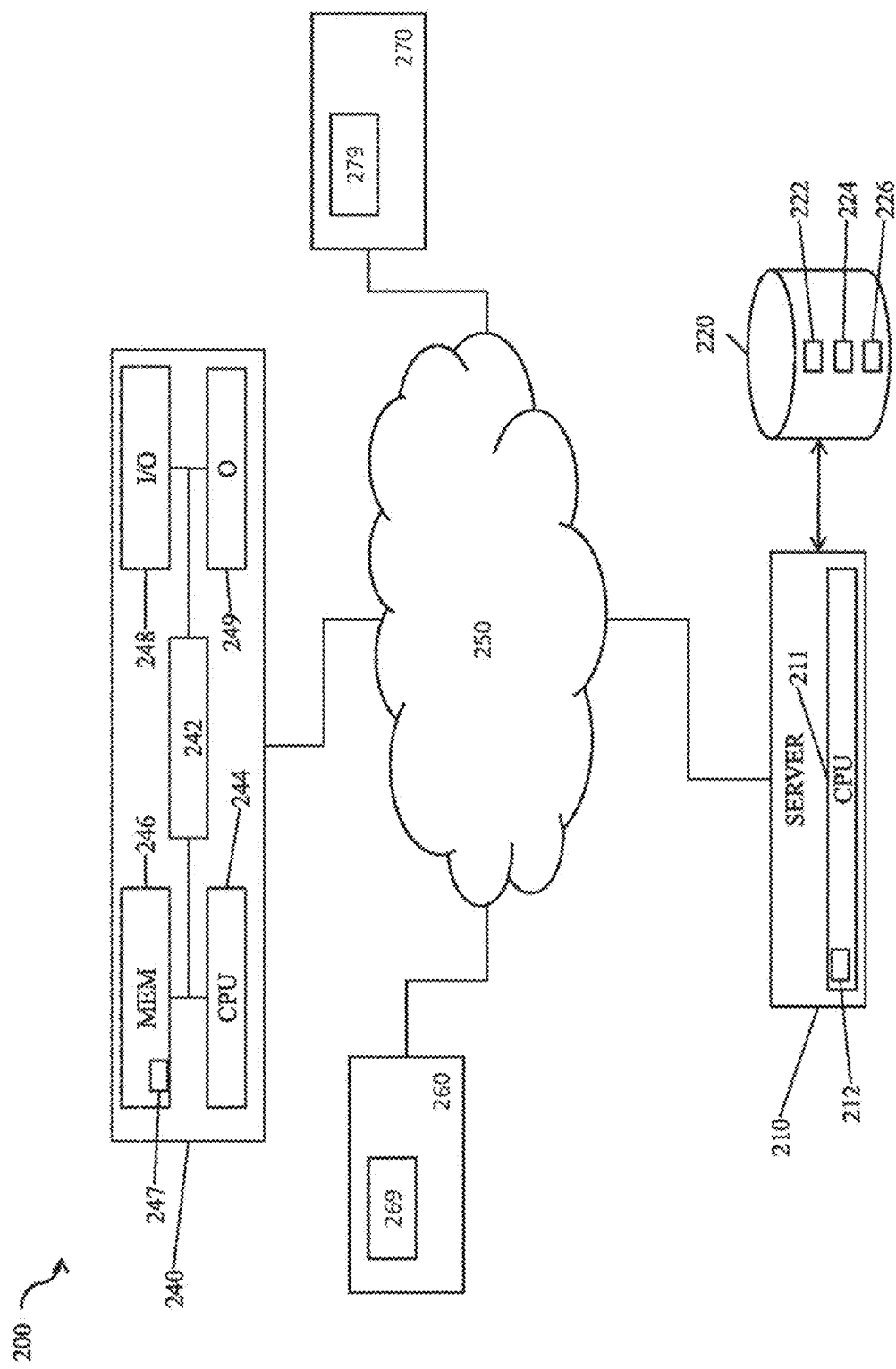
FIG. 2 is a schematic diagram illustrating a virtualized computing network used in one embodiment of the invention for automated systems and methods.

Referring now to FIG. 2, a schematic diagram illustrating a virtualized computing network used in of one embodiment of the invention for automated systems and methods is shown. As illustrated, components of the systems and methods include the following components and sub-components, all constructed and configured for network-based communication, and further including data processing and storage. As illustrated in FIG. 2, a basic schematic of some of the key components of a financial settlement system according to the present invention are shown. The system 200 comprises a server 210 with a processing unit 211. The server 210 is constructed, configured and coupled to enable communication over a network 250. The server provides for user interconnection with the server over the network using a personal computer (PC) 240 positioned remotely from the server. Furthermore, the system is operable for a multiplicity of remote personal computers or terminals 260, 270. For example, a client/server architecture is shown. Alternatively, a user may interconnect through the network 250 using a user device such as a personal digital assistant (PDA), mobile communication device, such as by way of example and not limitation, a mobile phone, a cell phone, smart phone, laptop computer, netbook, a terminal, or any other computing device suitable for network connection. Also, alternative architectures may be used instead of the client/server architecture. For example, a PC network, or other suitable architecture may be used. The network 250 may be the Internet, an intranet, or any other network suitable for searching, obtaining, and/or using information and/or communications. The system of the present invention further includes an operating system 212 installed and running on the server 210, enabling server 210 to communicate through network 250 with the remote, distributed user devices. The operating system may be any operating system known in the art that is suitable for network communication as described hereinbelow.

The present invention further provides systems and methods for settlement of participation in the electric power grid by grid elements that include a coordinator and/or translator network-based communication to communicate with legacy systems associated with the electric power grid, the legacy systems including network management systems, energy management systems, ISO, utility, SCADA, EMS, meter data, tables, graphical information system asset management server including updated changes within the distribution system, customer information systems, enterprise billing systems, outage management systems, data warehouse, historical data, legacy demand-side management system, legacy information and/or control system having grid information for grid elements for active control of those grid elements, and combinations thereof. Regardless of type and frequency of telemetry for those legacy systems, the present invention provides for increased frequency up to real-time data, and improved accuracy of data associated with the participation of the grid elements in the electric power grid. Benefits for the consumer of electric power from the grid include more accurate data associated with grid element participation in the grid, and therefore reduced payments and/or increased total compensation in the case of a power generator or curtailment activities acting as supply.

For the present invention, a node is a point within the electric power grid at which power is generated or drawn out. Resource nodes are the points at which power is passed back, connectivity nodes of the generator to the system. Settlement quality measurement of the injections and withdrawals; 15 min price is calculated and used for real-time energy settlement through the use of reporting grid elements that possess revenue grade metrology, as defined by standards bodies, such as ANSI in North America, or the appropriate standards bodies that specify the accuracy to classified as revenue grade by the governing body and are transformable by changes in the software and or firmware to improve the accuracy of the power measurement at the point of settlement. Thus the systems and methods of the present invention provide for accuracy improvements of any type, and any and all updates to profiles, preferences, and any other upgrade associated with any grid element, in particular those providing for increased settlement accuracy, which are communicated over the network by IP-based messaging or proprietary messaging.

The ratings of the GSU are provided by the resource entity and are entered into the model. The 15 min price is calculated for the resource node, even if the resource node is offline. A clearing price is still calculated, even if no additional power is supplied by a generator at that node and also, for the resource node, in the event transformers de-energize for maintenance. Grid elements are deployed and are configurable in a loop (or a loop feeder) fault tolerant design so that if there is a fault, the power is re-routed automatically. The 15 minute-based prices can change and be recalculated in the event that part or all of the electrical bus is de-energized. Some feeders off of electrical buses are not in a fault tolerant configuration and when they fail or are de-energized, it is still possible to clear a price for providing resource if a supply or curtailment source has been registered through the art and ultimately to the grid operator, Market Participant, ISO, utility, or plurality thereof. In this use case a distributed energy resource can inject energy to the de-energized distribution or transmission lines and thus create the use case of settlements per attachment or per measuring grid element per customer. Nodal price is equal to the subsystem average in the prior art; this teaches away from the present invention inasmuch as the systems and methods of the present invention provide for real-time accurate measured contributions and load consumption. Thus, price for generation is optimized and/or maximized for each grid element that participates in supply of power or load curtailment as supply to the grid at those nodes. Clearing price for power is provided at the node, in the example case wherein the electrical bus is de-energized and alternative and/or distributed power supply is provided to any and/or all of the power-consuming grid elements associated with that node, includes not only the capacity and energy charges, but also preferably includes the base distribution and attachment charges, which are normally granted to the TDSP for that period of time in which such power is supplied, measured, tracked, communicated, transformed, etc. according to the present invention for settlement.

Preferably, systems and methods of the present invention consider the information provided by ISO, which publishes a day ahead, a week ahead, a month ahead and/or real time pricing for capacity, energy and operating reserves. Consideration of this information provide by ISO is provided through a pricing element communicated through the Coordinator. The pricing element may further include factors and/or information relating to the impact of commodity pricing (e.g., natural gas) as an input to the settlement systems and methods of the present invention.

A resource node is associated with the electrical bus, in which a resource is measured and an output is settled. It is theoretically possible to settle at the electric bus for generation resource connected to the grid at only one electric bus, then at that bus as the resource node. For all others, the resource node is the generation resources side of the e-bus where the generation source is connected to the electrical power grid or where there are aforementioned boundaries that also possess a grid element that employs revenue grade metrology and reporting thereof.

Settlement for grid elements according to the present invention considers the location of each of the grid elements, the location settlement at the closest node for the connection of the grid element(s) to the electric power grid, including the physical attachment point to the distribution system or at the grid element that measures the "net" power injected at the attachment point to the electric grid that is also capable of grid stabilization (frequency synch, voltage support, etc.).

As set forth hereinabove, the prior art includes estimations and network models that are used to approximate the electric power flows in the grid, particularly the transmission, distribution system and losses at or approximate to the attachment points of loads; however, the present invention includes estimations, network models, and, significantly, real-time measurement of actual participation by each of the grid elements, and the losses associated with transmission, distribution, and resource nodes, versus estimations. By way of example and not limitation, the present invention provides for kilowatt packet based settlement, including power supply value (PSV) factors and, where appropriate or required, including aggregation of supply and/or load curtailment as supply activities by a multiplicity of grid elements and/or entities to provide a power trading block (PTB) or minimum amount required for settlement. Thus, the estimations and approximations are replaced with actual data captured under the present invention systems and methods; therefore the efficiency of the electrical power grid settlement and functionality, because increased capacity so that additional resources utilize existing infrastructure to its fullest extent without incurring redesign or new construction to expand capacity of the grid distribution and transmission. Furthermore, because the new art contains an active coordinator which when in combination with processing and database elements allow for the decision making and ultimately pricing and resource nodes to be defined further down in the distribution system and closest to the end consumer, ultimately improving the operations and efficiency of the grid, maximizing transmission and distribution capacity and most importantly saving the consumer money or its equivalents for compensation. It also facilitates the participation of the same consumers who possess distributed energy or curtailment technologies to participate in the market and respond to market pricing conditions to improve the supply and grid stability.

By contrast to the prior art, embodiments of the present invention preferably provide for real-time data to be used to inject grid elements that further improve grid operations and functionality for distribution of electric power in the grid. Clearing and monetizing the increased capacity is another benefit of the present invention systems and methods, which provides that increased capacity is measured and settled.

In one embodiment of the present invention, metering for settlements and billing is preferably provided with the advanced communications via network, preferably IP-based communication for grid elements through the coordinator to allow participation in the electric power grid by grid elements for supplying, providing curtailment as supply, and/or consuming power or usage and financial settlement that allows customers to provide supply, curtailment as supply, and/or consume power beyond their committed base rate or anticipated rate in response to requirements of the grid (for increased supply, for grid stability, etc.) that are communicated or projected by EMS. This allows the grid operator and/or market participant with the ability to activate supply from any source and provide for financial settlement therefor including consideration for the cost of the infrastructure and transit commits, if any, capacity, grid stability, and combinations thereof. This provides an alternative to either capped ports with fixed billing or actual data transferred, which are models more frequently seen in the prior art electric grid settlements, where occasional usage "bursting" is either not allowed or penalized with higher bills, either of which penalizes the customers. In preferred embodiments of the present invention, systems and methods provide for advanced financial settlements for grid element participation, including data communication through the coordinator and/or translator to interact with legacy systems, as needed, and to interact with the grid elements and/or their controlling owner through network-based IP communication of actual participation with supply, curtailment as supply, and/or consumption or usage of power (demand), wherein the data rate sampling of activity for participation and corresponding settlements are provided on a less-than-15-minute interval, preferably less than 10 minutes, and more preferably less than 5 minutes. Exemplary data sampling techniques are provided in unrelated art, such as for $95^{th}$ percentile metering, with such techniques as set forth in the article entitled "$95^{th}$ percentile bandwidth metering explained and analyzed," (written by Dylan Vanderhoof, dated Apr. 4, 2011) for datacenter bandwidth metering as described in the article being incorporated herein by reference in its entirety.

By contrast to the settlement systems and methods of the present invention, OASIS is an example of prior art that reserves capacity on transmission subsystems at boundaries where transmission control between two grid operators intersect. OASIS "tags" transmission capacity at these boundaries; only providing that information at boundaries, notably because the utility or grid operator may own or control the lines within the boundaries. New developments in the FERC regulated transmission subsystems allowing for the private ownership of transmission lines that also regulated by tariff and by FERC also must present capacity information to industry accepted market information subsystems at the boundaries. Without actual loss information as present art provides, the likelihood that consumers (loads) are overpaying for inefficiencies of the "wires" can reach as high as 50% in some estimates of the industry. If the information and transformation of grid elements provided by the described art provides more capacity for the "wires" utility or grid operator, the transmission distribution service provider (TDSP) can sell more electricity at higher rates if real-time measured data is available and used for settlement, rather than merely extending to all consumers, as a percentage and/or flat fee charge in addition to usage-based, rate-based charges. There is otherwise no incentive for utilities/TDSPs who are rate-based to improve the efficiency of the electric grid for distribution and transmission within their boundaries. The present art teaches away from legacy methods by necessity. Without the present art, long term costs of power for end-consumers will dramatically increase as world-wide power consumption is projected to double in the next 20 years while capacity within the networks of most utilities is not being replaced and new transmission subsystems are not keeping pace with demand. Public Policy and FERC have recognized these facts hence the issuance of the aforementioned FERC orders, with more to come, and projections from the NERC Long Term Reliability Assessment report projecting capacity margins declining in most RTOs, utility service areas and other geodetic references.

The coordinator within the systems and methods of the present invention provides for settlement for grid element(s) participation in the electric power grid by energy and communications routing through and with the existing settlement infrastructure for the electric power grid. The systems and methods further include at least one translator or converter to work within the legacy systems, ISO, market participants, etc. for the electric power grid for importing and exporting data and information relating to settlement. This data is integrated automatically by the systems and methods of the present invention at the translator or converter so that the data associated with the grid element(s) participation in supply or demand curtailment as supply, or load (power consumption), and translate the data for use in automated real-time settlement. Preferably, the automated real-time settlement includes actual, measured data for each of the grid elements, transformed into kilowatt packet (KWP) units. Also, preferably, KWPs are further combined with power supply value (PSV), and aggregated to form a minimum power trading block (PTB), and combinations, as required for optimized and maximized settlement values for load and for generation, respectively, i.e., power consumers are charged accurately for actual power consumed, and generation supply providers are paid maximally for their participation (availability for supply and/or actual supply), due to the improved data accuracy, and improved data availability (more data and/or continuous data supply, or anything improved over the standard, which is about 15 minute intervals). Preferably, financial settlement for each of the grid elements is provided by systems and methods of the present invention for participation by grid elements in real-time or less than 15 minute interval data-time.

Grid Elements Registration & Communication

The present invention provides a system for electric power grid element and network management including: at least one grid element constructed and configured for electrical connection and network-based communication with a server and/or a processor operatively coupled with a memory; wherein the grid element is transformed into at least one active grid element after initial connection with the server and/or the processor operatively coupled with the memory via a network. Preferably, the transformation for grid elements is automatic and/or autonomous. In one embodiment of the present invention, the server and/or processor coupled with memory initiates the transformation of the at least one grid element into the active grid element. In another case, the at least one grid element transmits a signal or communicates a message to the server at the point of initial connection with the server via the network, and/or the at least one grid element communicates a signal or a message to initiate its transformation via registration with the electric power grid; preferably, the signal or the message is routed through a Coordinator, which routes the message to a grid operator's appropriate subsystem depending on the function of the grid element. For grid stability, supply, and curtailment technologies functioning as supply as contemplated by FERC Order 745 the message must be routed to an EMS. Also, preferably, the message further includes at least one of: a geodetic reference, a grid element identifier, a grid element type, a grid element function, a grid element capacity and or energy capability, a grid element profile, a grid element attachment point reference, grid element telemetry capabilities and requirements based upon its function, a grid element power supply value (PSV), a grid element power trade block (PTB) value, a grid element balancing authority association, a grid element owner identifier, a grid element compatibility identifier, and combinations thereof.

Also preferably, the network-based communication is a standards-based communication or a proprietary communications protocol, and the communication is routable through a router and/or through a Coordinator, wherein the Coordinator receives and sends messages through a communications router. A translator is preferably further associated with the settlement processor and/or coordinator(s), for example, but not limited to the illustration of FIG. 1. The message includes a derived Power Supply Value that meets the minimum requirements for measurement, verification and reporting accuracy as determined by the Governing Entity that regulates the operation of the electric power grid that includes utilities, market participants and/or grid operators such that the derived PSV may be settled in the appropriate power market by a settlement manager or appropriate market participant or entity determining economic benefits associated with the provision of supply and/or curtailment by the active grid elements registered and functional within the electric power grid and responsive to the needs and requirements of the grid. Also, the message has a deliver priority including at least one of a plurality of methods to include priority access flags, virtual private networks, independent identifying addresses (MAC, IP, Electronic Serial Numbers), manufacturers specific identifying codes, or combinations thereof, wherein the methods comply with standards as determined by the governing entity that regulates grid operations for utilities, market participants or grid operators. Also, the active grid element(s) may further include at least one mobile or network device having at least one access point name (APN) for providing a priority of delivery for the message.

The present invention provides for a plurality of grid elements that transform into a corresponding plurality of active grid elements after initial connection with the server via the network, and the at least one grid element includes at least one electrical device, a device that consumes electric power from an electric power grid, and/or a device that provides power to an electric power grid, a control device, that operates, programs, and/or updates other active grid elements. Active grid elements are eligible to participate in settlement-related activities, as illustrated in FIG. 1, and described hereinabove. Thus, grid elements are also selected from the group consisting of: a sensor, a transmission reporting or control device, a distribution system reporting or control device, a power-consuming device, an appliance, any inductive device that consumes power, any resistive device that consumes power, a meter (revenue grade or non-revenue grade), a switch, a controller, a control device, a thermostat, a building control system, a security device, any other distribution automation and elements that are part of distribution system such as transformers, traditional and solid state bi-directional, capacitor banks, reclosers, and combinations thereof. Also, at least one of the grid elements is under the control of an energy management system (EMS) associated with the electric power grid. Preferably, systems and methods of the present invention provide for micro-economic dispatch capabilities, including sub-micro-economic dispatch, and settlement therefor, which provide for security of grid operations and corresponding settlement for grid element participation in response to information provided by ISOs relating to outage, pricing, transmission congestion, and combinations thereof. The systems and methods of the present invention provide micro-level responsiveness since each grid element's participation includes forecasting modeling associated with "asset" availability at the macro level, as well as sub-EMS level market economic modeling at the resource node at the micro level, with all communications relating to the micro-level being communicated through the coordinator to allow KWP, PSV, and aggregation to form at least one PTB for grid element participation and corresponding financial settlement for that participation.

Following the registration through the Coordinator, the transformation relating to the active grid element enables the active grid element to provide status and function for providing normal and emergency grid operation, energy flows, transmission losses, reactive power, operating reserves and/or grid stabilization for the electric power grid, and the transformation is registered in a database, and the database is registered with an ISO, BA, Market Participant, NERC, utility service area, and/or FERC. For security and management by the Coordinator, preferably each of the at least one grid elements has a unique grid element identifier associated with it. Where the Coordinator interacts with or interfaces with legacy systems, in particular relating to settlement, as illustrated in FIG. 1, the Coordinator preferably updates the legacy systems associated with the grid and relevant to the grid element(s) through the translator or other dedicated software interface with the legacy systems.

The present invention also provides a multiplicity of databases constructed and configured in network-based communication for receiving registration data from a multiplicity of active grid elements, wherein at least one Coordinator for routing messages from the multiplicity of active grid elements through the network connecting the databases, and wherein servers operating the databases exchange information associated with the active grid elements for affecting electric grid operations, reporting, and/or stabilization, including service oriented architecture (SOA), Web Services (Web Services Description Language "WSDL"), published APIs, private APIs, and combinations thereof. Also, registration of grid elements and information or data relating to their transformation into active grid elements, including the attributes of the active grid elements, are stored in the databases for predetermined periods of time for use with economic and energy accounting settlement associated with the active grid elements, and the registration information associated with active grid elements is used to determine attachment points to the electric power grid for distribution and transmission of power, and may be further combined with information about the generation, transmission, and distribution system of the electric power grid, stored in the database, and processed with analytics to simulate modeling for attachment of active grid elements to the electric power grid. Furthermore, the registration information associated with active grid elements is used for communication with an EMS or other grid subsystems necessary for normal or emergency grid operations. Additionally, a registration is made for each active grid element, and the registration complies with regulations and/or standards established by Federal Energy Regulatory Commission (FERC) North American Electric Reliability Commission (NERC), Independent System Operator (ISO), Regional Transmission Organization (RTO), and/or a governing authority for the electric power grid. In any case, the server communicates a message to each of the at least one active grid elements after the initial connection and registration through the coordinator via the network, wherein the message is an IP-based message, which is preferably transmitted over a plurality of Ethernet capable communications networks, wired or wirelessly transmitted over a communications network.

In preferred embodiments of the present invention, the system further includes an interface that facilitates communication of the message with the grid elements, the interface including an IP-based interface, which is selected from the group consisting of WiMax, High Speed Packet Access (HSPA), Evolution for Data Only (EVDO), Long Term Evolution (LTE), any first or second generation wireless transport method such as EDGE, or Code Division Multiple Access, Ethernet, any proprietary Layer 1-4 protocol that contains or is capable of transporting an Internet Protocol message, and combinations thereof. The present invention may further include a security interface associated with each of the grid elements operable to receive security system messages from at least one remotely-located security system, wherein the security interface is standards-based or determined by the governing entity that regulates grid operations for utilities, market participants or grid operators.

In another embodiment of the present invention, an apparatus for smart electric power grid communication is provided, including: a grid element constructed and configured for electrical connection and network-based communication with a server associated with an electric power grid; wherein the grid element is transformed into an active grid element after initial connection with the electric power grid, and wherein the grid element includes a unique identifier. Preferably, the transformation is automatic and/or autonomous, following initial activation of the grid element, and then the grid element is authenticated, registered, and then performs the function intended to do within the grid. So then as grid elements are transformed to active grid elements for participation in the electric power grid, in particular for those having a function intended as providing supply, including providing the TDSP with a network simulation model, as part of the registration process, the grid element has either loaded in its processor and memory or is capable of downloading grid information that allows for the grid to "self model" the impact of the attachment of that element to the grid.

Preferably, the grid element transmits a signal or a message to the server, more preferably through a Coordinator, for registering with the electric power grid, and communicates wirelessly with the server, preferably via IP messaging with the server after attachment to the electric power grid. Such apparatus embodiments for active grid elements include or are selected from the group consisting of: a sensor, a power-consuming device, an appliance, a meter, distribution and/or transmission elements, telemetry elements, power supplying device, storage device, controller, and combinations thereof.

In methods for electric power grid network management, the present invention includes the steps of: providing at least one grid element constructed and configured for electrical connection and network-based communication with a server, energizing the at least one grid element and/or connecting the at least one grid element to an electric power grid; the at least one grid element making an initial connection with the server via a network and communicating a message to the server; and the at least one grid element automatically transforming into at least one active grid element for functioning actively within the electric power grid. Preferably, the method further includes the step of: the at least one grid element sending and/or receiving a message via communication with the server via the network, wherein the message is routed by a coordinator to the server. Also preferably, the communication is wireless transmission, and includes wireless IP-based messaging.

In operation of the system and methods of the present invention, the communication further includes power event messages that further include at least one of: status of device(s), supply source(s), and/or demand; location of attachment; line losses; distribution and transmission capacity information; and combinations thereof, and the power event messages are based upon inputs initiated from a market participant, a utility, or an electric grid operator. Also, the power event messages include information about PSV or PTB associated with the at least one grid element.

While present invention relates generally to the field of electrical power control systems and more particularly to systems, methods, and apparatus embodiments for transforming grid elements into active grid elements following an initial registration with the electric power grid through a coordinator, following transformation of the grid elements to active grid elements, the electric power grid is functional for active management of power supply from any electric power generation source or storage device for introduction to an electric power grid, and/or load curtailment for consideration as supply. Preferably, these systems and methods and any apparatus embodiments of the present invention are in compliance with standards that are currently contemplated and are changing in response to the recognized need in the United States and other countries where the electric utility grid is not fully developed, but the demand for energy is expected to grow substantially over the life of the invention (e.g., NERC, FERC orders 745, 750, 755, etc.). Once transformed into active grid elements, the present invention systems, methods, and apparatus embodiments are operable to further provide for actively managing power supply from any generation source supply or storage and/or power supply from curtailment events applied to load consuming devices, thereby creating operating reserves for utilities and market participants, while optionally tracking power savings for both the individual customer, broadly defined as any consumer of electrical power whether this is an individual residential consumer, a large commercial/industrial customer or any combination thereof inclusive of retail electric providers and market participants, as well as the electric utility or electric power generation source supply (GSS), whether generating or distributing power for the electric power grid. Therefore, active grid elements include functionality for power generation supply, power storage supply, and/or load curtailment as supply, as well as load-consuming elements, telemetry elements, sensors, meters, controls, and combinations thereof. Where active grid elements change location or attachment to the electric power grid, then their active grid element attributes change accordingly to indicate the new, updated location and/or attachment point information or data. Where a portion of the electric power grid changes due to normal operation, or due to any element being out of service for any reason, including dysfunction of distribution and/or transmission of electric power along the lines to active grid elements and/or the communications network changes or has dysfunction, then preferably, the active grid elements are acknowledged by the system through the coordinator upon their reconnection with the grid and/or communications network. Furthermore, any active grid element is replaced with a new or substitute grid element, or taken out of service for more than a predetermined period of time, then the replacement or substitute grid element must be registered to be transformed into an active grid element as with any new grid element being introduced into service at any location or attachment point associated with the electric power grid. Where reconfiguration, repair, or other updating occurs, corresponding information related to the reconfiguration, repair, or other updating associated with each active grid element is communicated through the coordinator and updated in the database.

Grid Functionality

The following descriptions and definitions are included herein for the purpose of clarifying terms used in the claims and specification of the present invention, in addition to explanation of the relevant prior art, including the PRIOR ART figures and those figures illustrating the present invention.

Power Distribution Engineering: Fundamentals and Applications, James J. Burke, Marcel Dekker, Inc., NY (1994), describes basic power electric power systems, including distribution and transmission throughout an electric power grid, and grid elements and basic functionality of grid elements, is incorporated herein by reference in its entirety. Also, acronyms and abbreviations and definitions for terms related to electric power grids and systems and grid elements associated therewith, and regulations and authorities related thereto, are known in the art, and are also defined in the book Creating Competitive Power Markets: the PJM Model, Jeremiah D. Lambert, Pennwell (2001), and are incorporated herein by reference.

When curtailment or supply is provided in a distributed manner from a plurality of sources through some of the grid elements of the present invention, capacity is also created on the transmission and distribution system that is used to carry the physical energy to the load consuming devices, and/or the attachment point of the supply devices, and those consumers at their attachment point to the grid. This is sometimes referred to in both the industry and the description of the present invention as a "service point" and can represent any attachment point along an electric grid whereby the physical layer of wires meets the physical attachment of either load or supply that is used in accordance with the present invention. The creation of capacity for these "wired" networks is in itself new to the art, and is tracked with the other messaging described in the present invention via the Coordinator and with specific messaging that is used and identified for the purpose of transmission and distribution capacity created along every grid element that is used to distribute electric power in the electric power grid. These created capacities are preferably aggregated by service point, by attachment wires, by transformer, by feeder wire, by substation/electrical bus, by transmission line(s), by grid area, by geodetic points, by utility or MP service area, by LMP, by balancing authority, by state, by interconnect, by ISO, and combinations thereof. Thus, created capacity by active grid elements according to the present invention, includes both the actual capacity due to supply introduction or load curtailment, and/or the location of the capacity created, which is a function of the attachment point and with respect to the electrical bus (substation) and/or transmission feeder that is supplying it. This capacity is reported to the financial settlement system through the Coordinator and/or translator; in the case of translator communication, a translator interface is provided with the legacy elements, e.g., OASIS; alternatively, the Coordinator and/or translator tracks the capacity and has a market price input for transmission costs for the purposes of providing a settlement for the created capacity.

The present invention provides systems, apparatus, and methods for managing a multiplicity of grid elements that function within an electric power grid, and for managing the settlement associated with their active participation in the grid. Following registration and transformation into active grid elements, the system provides for transmission and distribution of electric power supplied by an electric utility and/or other market participants to a multiplicity of the active grid elements (including but not limited to devices and nodes), some of which consume power, some supply power, some store power, and combinations. Active grid elements may function within the grid to provide for supply and/or load curtailment as supply. Each of the active grid elements have a Power Supply Value (PSV) associated with its energy consumption and/or reduction in consumption and/or supply (through generation and/or storage). And each grid element further operates to communicate (send and/or receive) messaging that is preferably managed through a network by a Coordinator using IP-messaging for communication with the active grid elements, with the energy management system (EMS), and with the utilities, market participants, and/or grid operators. However, in some cases, messaging is provided between grid elements without passing through a Coordinator.

Before describing in detail exemplary embodiments that are in accordance with the present invention, note that the embodiments reside primarily in combinations of system and apparatus components, and processing steps, communications, protocols, messaging and transport all related to actively managing power load or supply on an individual subscriber basis and optionally tracking power savings incurred by both individual subscribers and an electric utility or other market participant, all of which directly involve active grid elements of the present invention. Accordingly, the systems, apparatus, and method steps components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used in accordance with the description of the present invention NERC is described and defined as follows: http://www.nerc.com/files/Glossary_12Feb08.pdf Balancing Authority (BA), as used in accordance with the description of the present invention is defined as the responsible entity that integrates resource plans ahead of time, maintains load-interchange-generation balance within a Balancing Authority Area, and supports Interconnection frequency in real time. Balancing Authority Area (BAA), as used in accordance with the description of the present invention is defined as the collection of generation, transmission, and loads within the metered boundaries of the Balancing Authority. The Balancing Authority (BA) maintains load-resource balance within this area (BAA).

Also, if demand changes so abruptly and quantifiably as to cause a substantial fluctuation in line frequency within the utility's electric grid, the utility must respond to and correct for the change in line frequency. To do so, utilities typically employ an Automatic Generation Control (AGC) process or subsystem to control the utility's regulating reserve. This subsystem when coupled with transmission, generation and distribution telemetry, processors, and industry standard software in its aggregate is referred to as an Energy Management System (EMS) as exemplified and manufactured for the energy sector by many OEMs such as, by way of example, GE, OSIsoft, and Areva. To determine whether a substantial change in demand has occurred, each utility monitors its Area Control Error (ACE). A utility's ACE is equal to the difference in the scheduled and actual power flows in the utility grid's tie lines plus the difference in the actual and scheduled frequency of the supplied power multiplied by a constant determined from the utility's frequency bias setting.

The aggregation of the longstanding, unmet needs in the relevant art is the basis for new innovation, including solutions offered by the present invention, having systems and apparatus components that include the following attributes:

a. The system, apparatus, methods and devices utilize standards-based Open Systems Interconnect (OSI) Layer 1-4 communications protocols with a plurality of security encryption methods.

b. The communication layer is Internet Protocol (V4 or V6 or its derivatives thereof) based such that the messages, instructions, commands, measurements and telemetry is transmitted via physical layer delivered Ethernet, first generation wireless communications methods (analog or digital), second generation communications methods such as Code Division Multiple Access (1×RTT), Enhanced Data Rates for GSM Evolution (EDGE), third generation protocols such as Evolution for Data Only (EVDO), High Speed Packet Access (HSPA), Fourth Generation protocols Long Term Evolution (LTE), IEEE 802.11 (X) "WiFi", or any derivative standard approved by the IEEE, International Telecommunications Union or any domestic or international standards body or any proprietary protocols that can operate in near real time and contain an Internet Protocol packet for the transmittal of their command, control, telemetry, measurement, verification, and/or settlement information, whether wired or wireless.

c. The command and control for the purpose of (b) can be created and controlled from a centralized processor, a distributed processing apparatus, or at the device level.

d. The aggregation of these methods result in the creation of real-time load curtailment that may be classified broadly as "Demand Response", macro or distributed generation and can be native load (i.e., real-time supply) as required by the electric power grid where the invention is utilized, and also be utilized to create Operating Reserves as defined by NERC, FERC, and/or any other governing body that regulates the operation of an electric power grid and/or utilities or other market participant providing power to an electric power grid.

Figure 3:
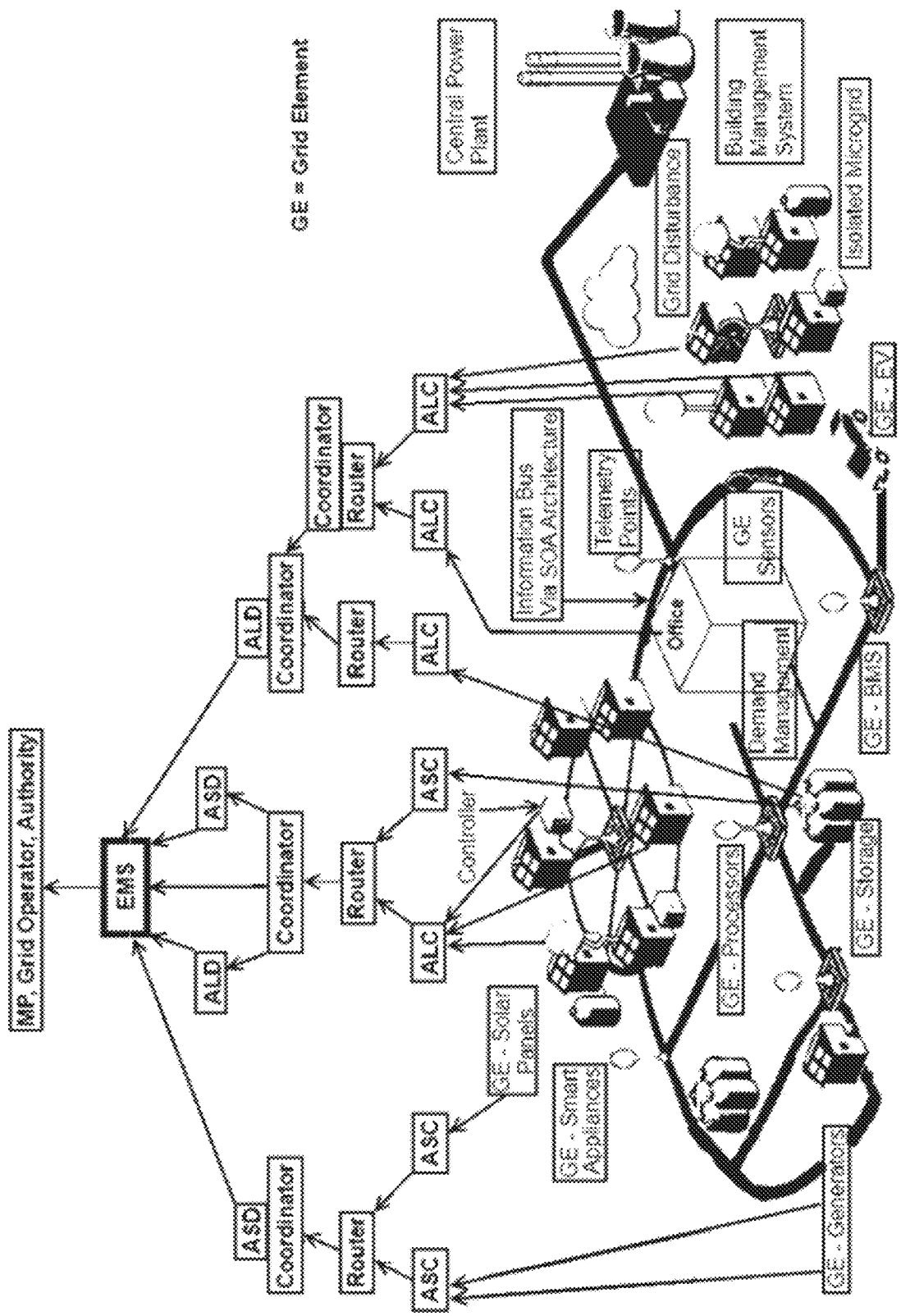
FIG. 3 is a schematic diagram illustrating a coordinator and grid elements within the systems and methods of the present invention.

FIG. 3 is a schematic diagram illustrating at least one coordinator and a multiplicity of grid elements within a system and methods of the present invention. Grid elements illustrated for example, and not limitation of the present invention, include smart appliances, smart meters, building control systems, sensors, storage devices, power generators (including alternative energy sources like wind, solar, water, etc.), active load clients (ALCs), active load directors (ALDs), active supply clients (ASCs), active supply directors (ASDs), controllers, coordinators, distribution elements, transmission elements necessary for grid operations and stability, and combinations thereof. Following registration with the system, and transformation to active grid elements for managed participation within the electrical power grid and corresponding systems and methods of the present invention, the active grid elements communicate with and through at least one coordinator and to the energy management system (EMS) or other grid operations subsystems, such as RTO/ISO operations systems, transmission operation systems, distribution operation systems, and function according to their intended purpose. By way of example and not limitation, a smart meter provides meter functions to track and communicate load consumed by one or more active grid elements and/or devices; a thermostat or building control system provides for HVAC and/or environmental conditions indication and control, including temperature management, humidity, lighting, security, etc.

Figure 4:
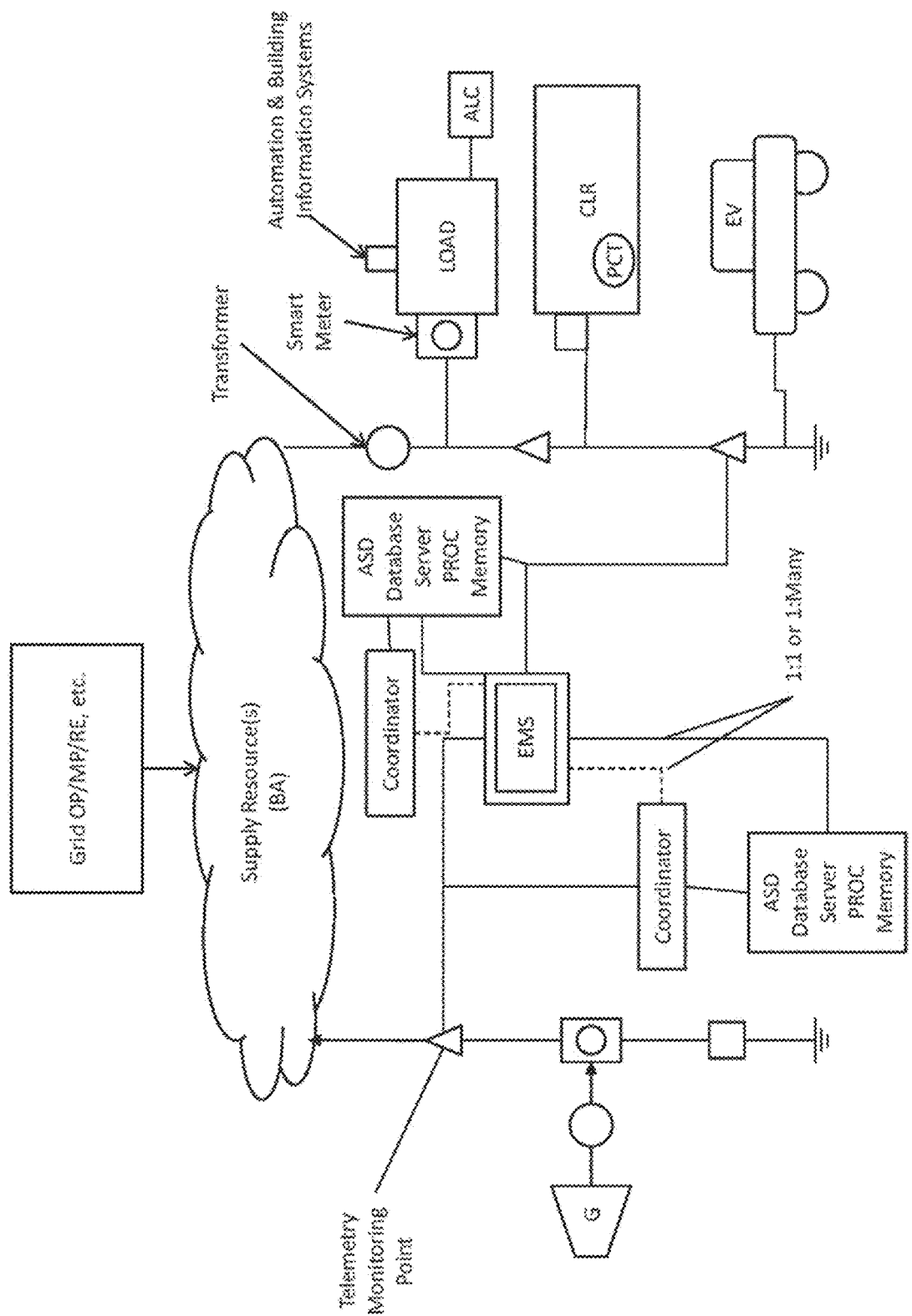
FIG. 4 is a schematic diagram illustrating grid elements, attachment points, and telemetry through a network associated with the systems of the present invention.

FIG. 4 is a schematic diagram illustrating grid elements, attachment points, and telemetry through a network associated with the systems of the present invention. FIG. 4 illustrates at least one controlling or participating entity, selected from the group consisting of a grid operator, utility, market participant, retail electric provider and/or distributor, and combinations thereof, an EMS, in electrical power connection and communication with a multiplicity of active grid elements, all within at least one balancing authority (BA), and all connected through an electrical power grid and communications network(s). The active grid elements provide telemetry and messaging relating to a multiplicity of grid element attributes and/or grid element factors, including but not limited to attachment point information, geodetic information, status, capacity, grid element identifier(s), grid element profile(s), power consumption and flows (instantaneous and historical), and combinations thereof. Preferably communication among active grid elements and the controlling or participating authority is provided over a network and routed through at least one coordinator via Ethernet and/or IP connectivity. A counter may also be included for tracking packets, and packet switching and routing is provided within the systems and methods of the present invention, wherein network communication for energy routing and energy information routing is provided with a messaging structure having layering, similar to an Open Systems Interconnection (OSI) model including layers for application, presentation, session, transport, network, data link, and physical communication functions, which defines the communications tasks of the system, and which provides a vertical set of layers forming a communication infrastructure for interconnection over public and private networks. Information describing general OSI model communication structures and functionality is known to one of ordinary skill in the art and described in Data and Computer Communications by William Stallings, MacMillan NY (1985), which is incorporated herein by reference in its entirety.

The structure of OSI modeling for the systems and methods of the present invention are considered to provide communications networks for use in coordination with the physical structure and network of the electric power grid and the active grid elements registered therewith, and may further include TCP/IP. Ideally, the OSI model for communication network would be integrated with the physical network for electric power distribution and transmission, including active grid elements and controls, database, server, coordination with supply and load, etc. The present invention provides for the application of an energy network (i.e., the electric power grid) and a communications network, including the OSI-based model, and coordination to integrate the messaging with the power movement through the system.

Figure 5:
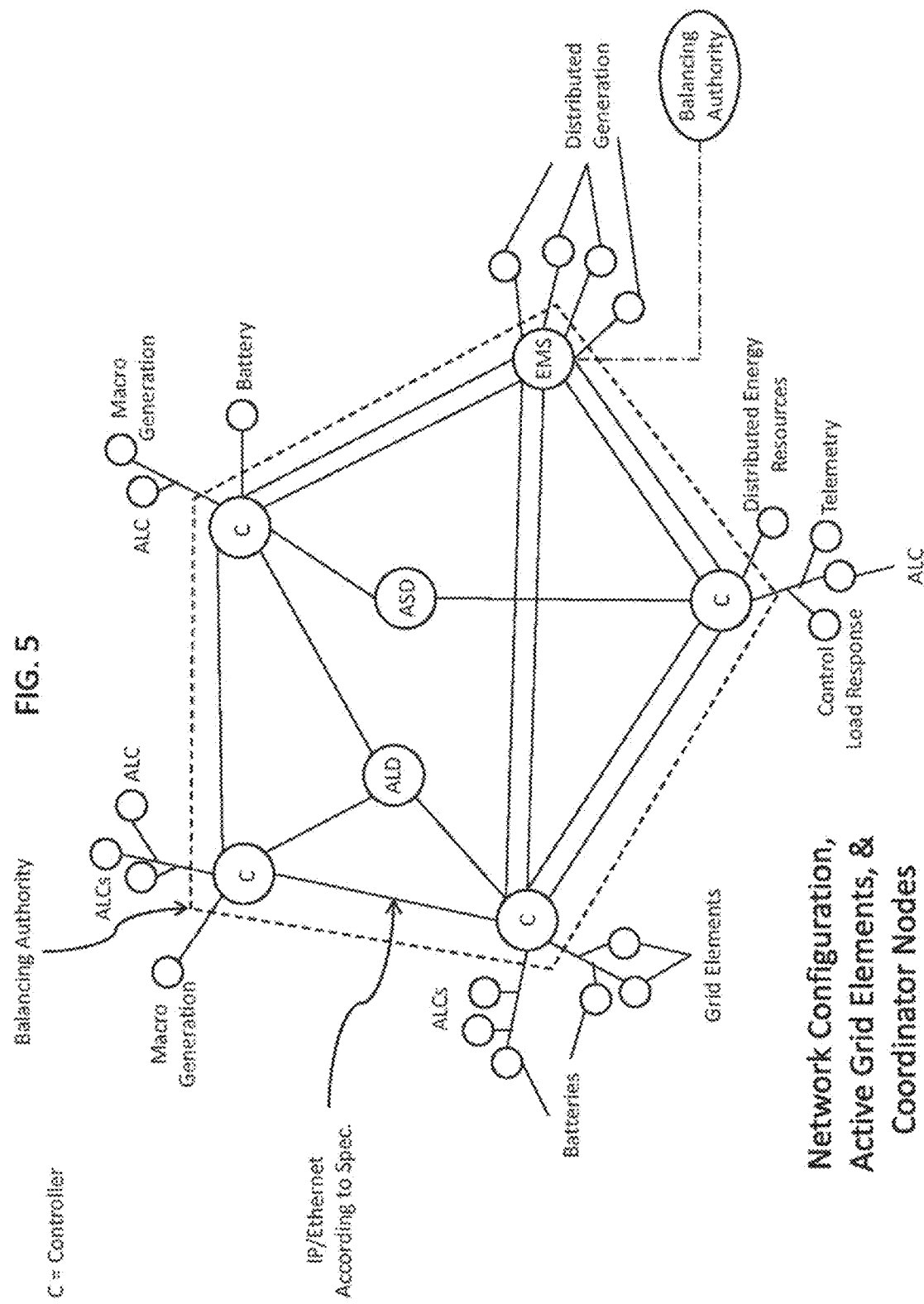
FIG. 5 is a schematic diagram illustrating an exemplary network node configuration for grid elements registration and communication.

FIG. 5 is a schematic diagram illustrating an exemplary network node configuration for grid elements registration and communication. In one embodiment of the present invention, the network for communication involving active grid elements and the coordinator and/or other grid elements includes a packet-switched network that is used to accept packets from a source node and deliver them to a destination node, such as in the case wherein a grid element makes initial registration with the system by sending an initial communication to a coordinator, and the coordinator responds and the systems and methods of the present invention then provide for automatic and/or autonomous transformation into active grid elements, wherein at the moment of registration the active grid elements are functional within the electric power grid to perform their designated or predetermined operations and roles or functions. FIG. 3 illustrates an example network configuration illustrating a multiplicity of paths or routes through a network for communication and energy routing within the electric power grid. The connections between active grid elements and coordinator(s) and other active grid elements are illustrated. In preferred embodiments of the present invention, at least one balancing authority (BA) includes at least one coordinator in network-based communication with a multiplicity of active grid elements, and further connected in electrical and data communication connections with at least one source of power and at least one EMS. By way of example, a new grid element prior to registration with the system of the present invention initiates a signal or message via the network following its initial energizing with power from any source (battery or externally-supplied power), wherein initial message includes at least one of the following: unique grid element identifier, equipment identifier, class of service information, capability, capacity, function information, geodetic information (GPS, physical address, etc.), attachment point, IP address information, communication format and content information, security, authentication information, and combinations thereof. Thus, after initial energizing of the at least one grid element, the grid element searches for at least one network available for communication with the electric power grid, preferably with the coordinator, and determines how to engage with the coordinator or at least to establish initial network communication with the coordinator, identification of network protocol, etc. A network identifier is included in the transformation and network interface for each of the at least one grid elements. Preferably, messaging between the at least one grid element and the at least one coordinator is provided by IP-based messaging over the network. Following the initial response and registration of the at least one grid element, there is a transformation into at least one active grid element, which provides that each of the at least one active grid elements is operable to function automatically and/or autonomously for its predetermined function within the electric power grid, including telemetry at predetermined intervals, continuously, or when change in state occurs for each of the at least one active grid elements.

In preferred embodiments of the present invention, the registration of grid elements may be provided using one or more of the following for providing unique identification for each grid element: messaging and/or signaling between active, inactive, IP address, V4, V6, proprietary, mesh or direct, TDM or pots, analog or digital telemetry, RFIDs, and combinations thereof. A registration for grid elements may further include registration into a home network or a visitor network, and/or movement of any of the active grid elements (following transformation after initial registration) to different locations or geographies and/or to different or new attachment points provides for at least one update of status for the movement or change for that active grid element. Attachment points are preferably provided in a location register that is defined by proximity to an electric bus or substation within the electric power grid, or any other predetermined geodetic location within the physical structure of the electric power grid.

Figure 6:
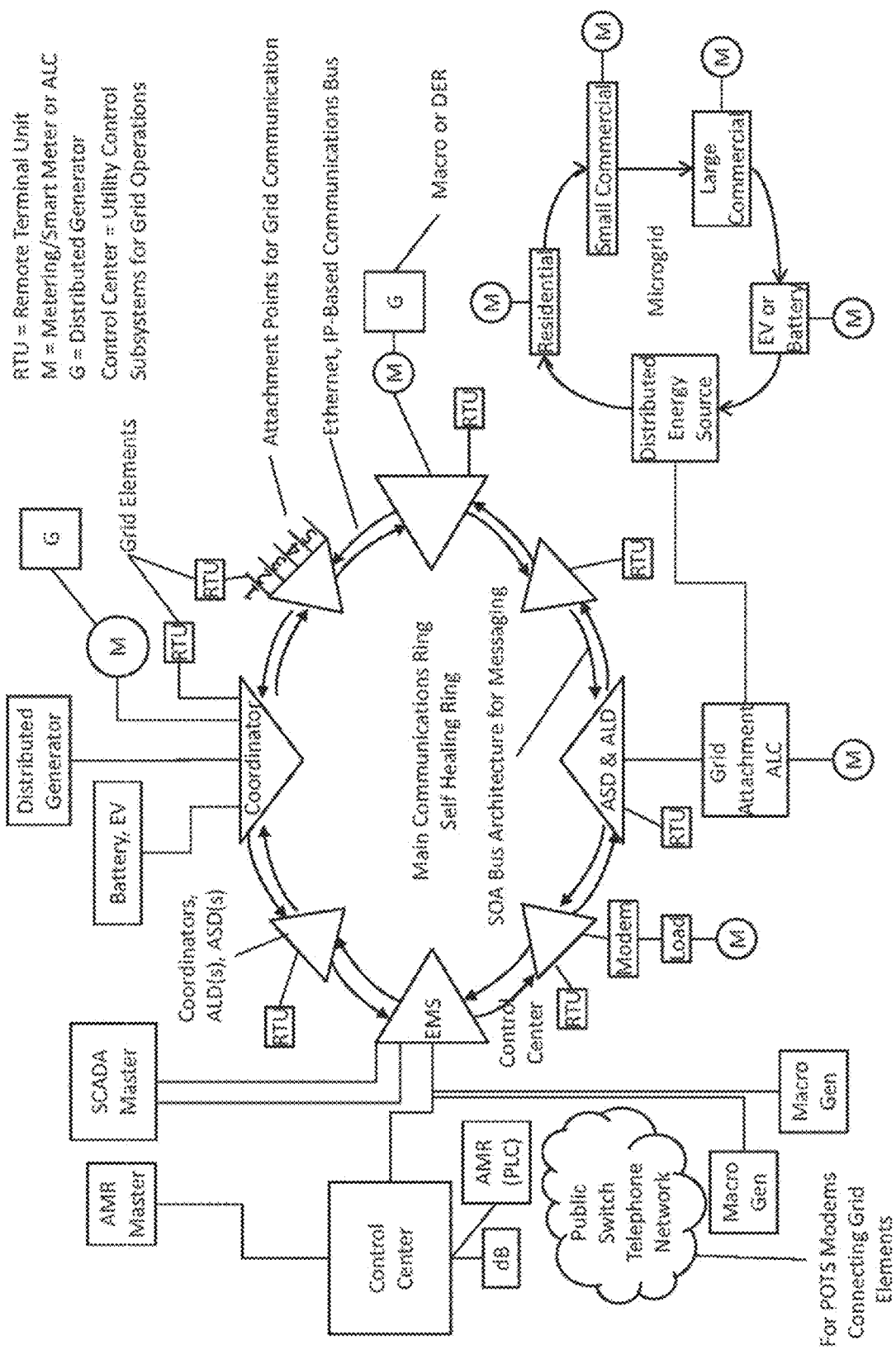
FIG. 6 is a schematic diagram illustrating a distribution automation communications network.

FIG. 6 is a schematic diagram illustrating a distribution automation communications network as part of systems and methods of the present invention, including a main communications ring having a multiplicity of active grid elements associated therewith, and further including at least one master control center and corresponding database, SCADA master, AMR master, switches and electrical network lines and connections (copper wire) and communications network lines and connections (fiber) and at least one distributed ring having a multiplicity of active grid elements associated therewith. In this exemplary network sector, the active grid elements and electrical power network and communications network are included within one balancing authority (BA). Several active grid elements function as meters and/or smart meters and provide for automated meter telemetry through the network from the grid elements to at least one coordinator. In a typical network architecture, at least one core network for a balancing authority is provided, and wherein a multiplicity of grid elements are constructed and configured in electric power transmission and/or distribution connection and network-based communication connection for sending and receiving messages between each of the grid elements and at least one Coordinator.

Figure 7:
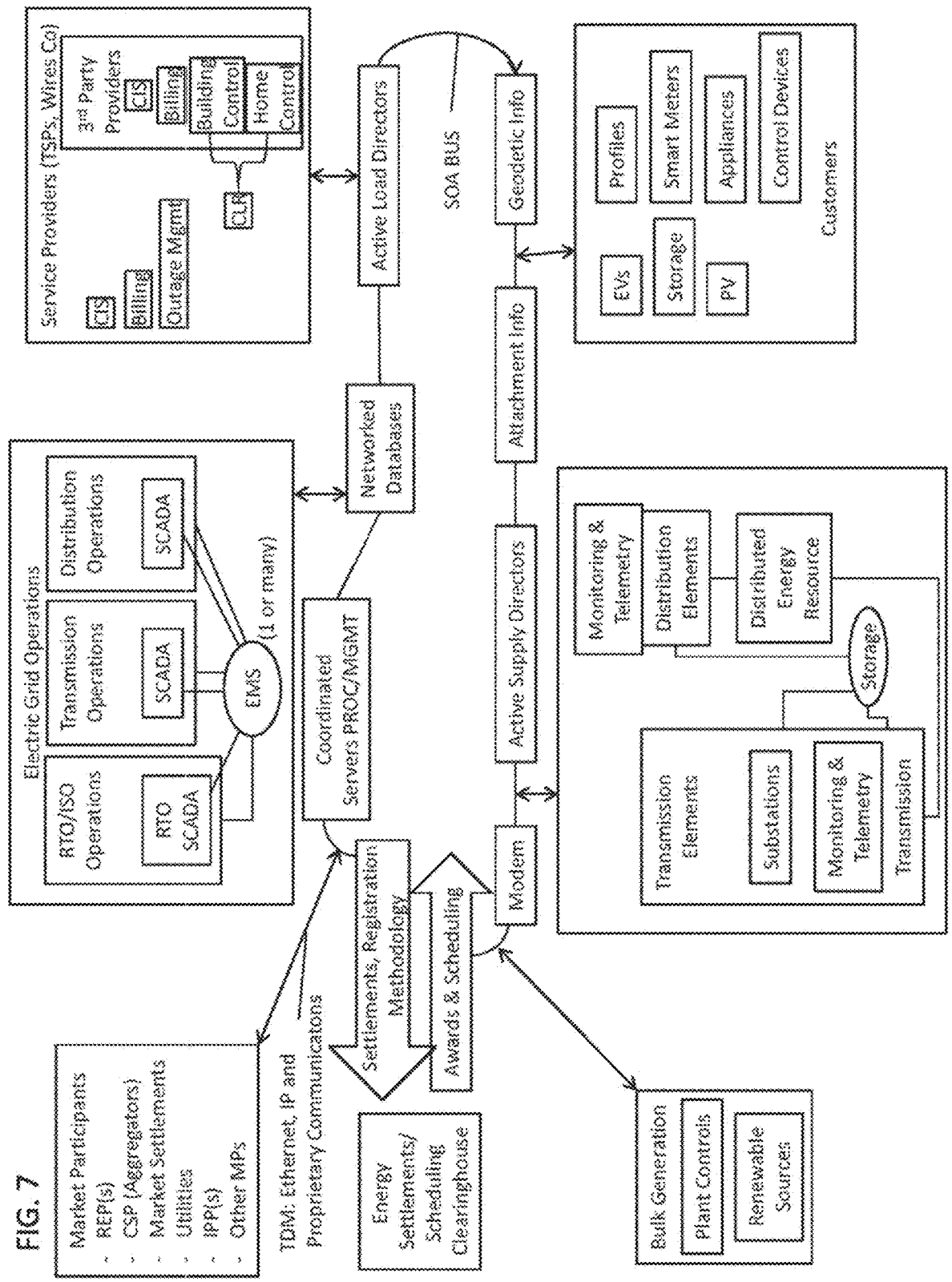
FIG. 7 is a schematic diagram showing energy system operations and communications via network-based connections.

FIG. 7 is a schematic diagram showing energy systems operations and communications network-based connections as part of systems and methods of the present invention, including compatibility and/or compliance with US National Institute for Standards and Technology (NIST) standards applicable to transmission and/or distribution lines for the electric power grid in communications network connectivity with a multiplicity of grid elements, market participant(s), utility or electric power generator supplier and/or third party energy provider (for GSS, as described hereinbelow), an energy market clearinghouse (ECM), an aggregator for providing at least one power trading block (PTB) for settlement for energy supply and/or curtailment as supply providing by at least one of a multiplicity of grid elements, including power consuming devices, ALCs, ALDs, ASCs, ASDs, and at least one coordinator.

Figure 8:
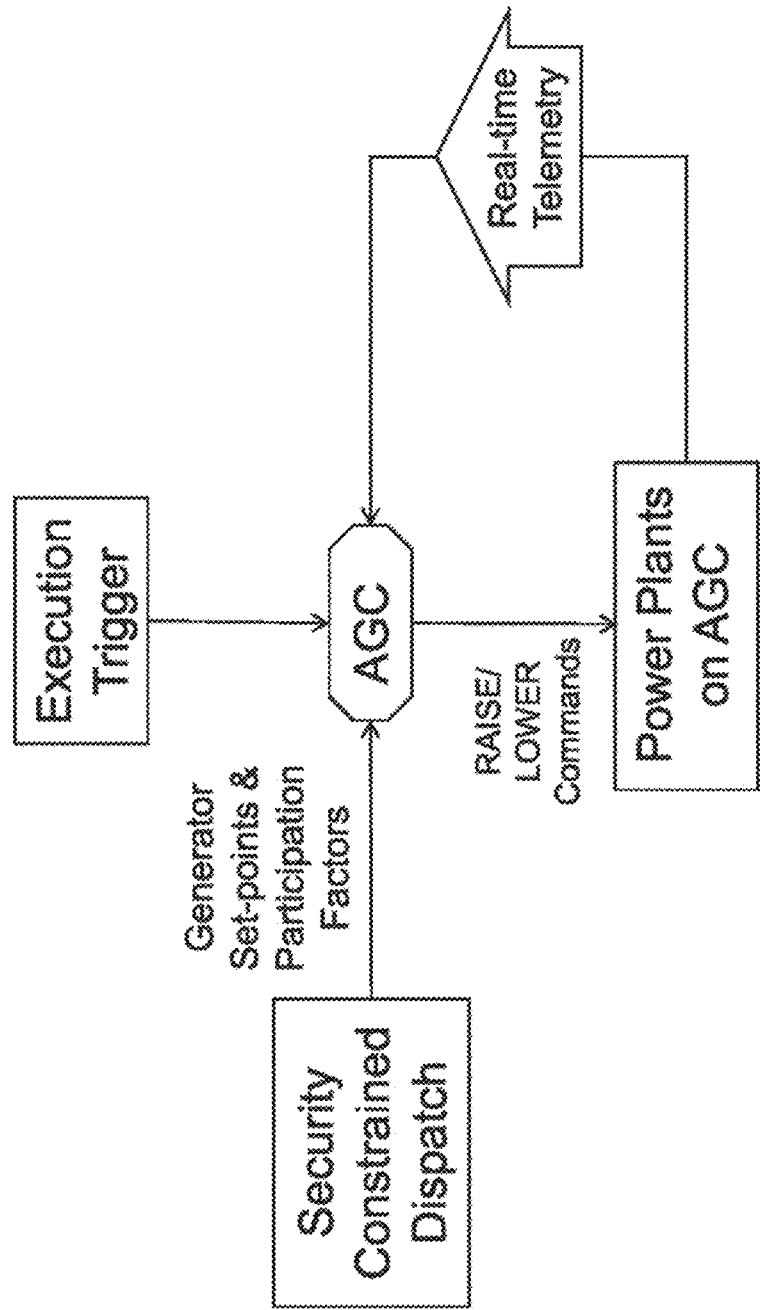
FIG. 8 is a schematic diagram showing a basic Automated Generator Control (AGC)/energy management system (EMS)/distribution management system (DMS) representation.

FIG. 8 is a schematic diagram showing a basic AGC/energy management system (EMS) representation.

The present invention provides automated advanced settlements for IP-based active power management (load and supply) systems having active grid elements, which have predetermined functionality within the electric power grid, and are addressable with IP-based messaging within the communications network by an active load director (ALD) and/or Coordinator wherein the messaging occurs over communication networks, such as the Internet. The present invention improves and expands upon prior art systems and methods, including U.S. Pat. No. 5,560,022 issued Sep. 24, 1996, filed Jul. 19, 1994 by inventors Dunstand, et al., and assigned on the face of the document to Intel Corporation, for Power management coordinator system and interface, which is, including its specification and figures, incorporated herein by reference in its entirety.

US Patent Applications for the following: U.S. patent application Ser. No. 13/528,596 filed Jun. 20, 2012, entitled METHOD AND APPARATUS FOR ACTIVELY MANAGING ELECTRIC POWER OVER AN ELECTRIC POWER GRID; U.S. patent application Ser. No. 13/549,429 filed Jul. 14, 2012, entitled Method and Apparatus for Actively Managing Electric Power Supply for an Electric Power Grid; and U.S. patent application Ser. No. 13/563,535 filed Jul. 31, 2012, entitled SYSTEM, METHOD, AND APPARATUS FOR ELECTRIC POWER GRID AND NETWORK MANAGEMENT OF GRID ELEMENTS; all by common inventor to this patent application, Joseph W. Forbes, Jr., each of which, including their complete specification, figures and descriptions, are incorporated herein by reference in their entirety, provide detailed descriptions of the systems, methods, and apparatus embodiments relating to active management of electric power grids and their corresponding supply and demand components. By way of example, Active Supply Director (ASD) and Active Supply Client or Element (ASC) provide for the corresponding management of electric power available or actually supplied to the electric power grid, whether by Generation Source Supply (GSS) elements or by Storage Source Supply (SSS), including battery or fuel cell, or compressed air, stored water, or any subsystem that includes a potential for discharging electricity as stored energy to the electric power grid, available for discharge or actually discharged into the grid. In any case, whether electric power supply for the grid is provided by generation or load curtailment, the supply is evaluated and rated by Power Supply Value (PSV) and Power Trade Block (PTB), which indicates the amount of power, including aggregated amounts acceptable for settlement by the grid, which are communicated by the active grid elements through the Coordinator and then to an energy management clearinghouse for settlement based upon PSV, PTB, and market factors associated with and communicated by the active grid elements and timing, duration, quality, type of event (for supply and/or demand response) within the electric power system energy management to the coordinator. Preferably, all information required for settlement is communicated within the systems and methods and by apparatus embodiments of the present invention, automatically and/or autonomously and preferably with IP-based messaging via the network; this information is routed by at least one coordinator and stored in memory in a database that is accessible by the energy management clearinghouse.

Each active grid element associated with supplying power and/or providing load curtailment within the electric power grid, includes with its attributes at least one Power Supply Value (PSV) associated with its activity and function within the grid. Power Supply Value (PSV) is estimated, modeled, measured, and/or determined or calculated at the meter or submeter, building control system, supply source, or at any device or controller that measures electric power within the standard as supplied by the regulatory body(ies) that govern the regulation of the grid. PSV depends on operating tolerances, operating standard for accuracy of the measurement. Notably, the PSV provides a uniform, systematic unit for addressing the power curtailment or power supply that is responsive to an energy management system (EMS) or equivalent for providing grid stability, reliability, frequency as determined by governing authority, grid operator, market participant, utility, and/or regulations applicable to the electric power grid operations. The PSV enables transformation of curtailment or reduction in power, in addition to the introduction of power supply to the grid, at the device level by any system, apparatus, and/or device that sends or receives an IP message to be related to or equated to supply as presented to the governing entity that accepts these values and award supply equivalence. PSV may be provided in units of electrical power units, flow, monetary equivalent, and combinations thereof. The PSV and/or PTB addresses the longstanding unmet need within the electric power management systems for a consistent or standard unit(s) that provide for blocks or bundles of energy are introduced, aggregated, and settled; the prior art nowhere teaches or discloses these functional units. Thus, the present invention includes a PSV that provides a unit for measuring and settling for each active grid element the power available for/introduced to the electric power grid and/or the curtailment power available (consistent with FERC orders 745, 750, 755) as a requirement for providing supply to the power grid, and, particularly wherein the supply to the power grid is provided for grid stability, voltage stability, reliability, and combinations thereof. Notably, "high performance reserves" from FERC order 755 covers for "deadband", i.e., the time between receipt of reg-up/reg-down, recognition of that order, and response to impact on the grid, which is about 5 minutes for high performance reserves, which are faster for supply than the traditional utilities.

PSV is preferably settled as traditional power delivery or curtailment systems at the nearest interconnection point, Location Marginal Price (LMP), node, transmission interconnection, balancing authority, utility service area, retail electric provider service area, ISO, state, and combinations thereof, i.e., settlement is available at the point of delivery and/or acceptance (or attachment point), and is facilitated by ALC, ASC, Coordinator, metering device, smart meter, sub-meter, and combinations thereof, or any revenue grade device accepted by the governing authority to determine PSV and/or settlement for each active grid element. Also preferably, PSV includes consideration for line losses proximal to those devices and/or grid elements, if not through real-time metrics then through modeling and/or estimation. Furthermore, regarding PSV and other metrics, where no real-time metrics for verification and settlement exist, modeling is used. Preferably, analytics is used in connection with the present invention for modeling, estimation, optimization, and combinations thereof, such as those analytics taught by U.S. Pat. Nos. 8,180,622, 8,170,856, 8,165,723, 8,155,943, 8,155,908, 8,131,401, 8,126,685, 8,036,872, 7,826,990, 7,844,439, 7,840,395, 7,729,808, 7,840,396, 7,844,440, 7,693,608, and US Patent Application Publication Nos. 20070239373, 20080262820, 20080263469, 20090076749, 20090083019, 20090105998, 20090113049, 20100023309, 20100049494, 20100168931, 20100268396, 20110082596, 20110082597, all of which are incorporated herein by reference in their entirety.

The present invention methods, systems, devices, and apparatus provide transformation of grid elements to active grid elements following their automatic registration with IP-based messaging communicated via the network and preferably through a coordinator. Following registration, the active grid elements operate according to their respective intended functions, and also preferably continue to have automatic communications and messaging via the network through at least one coordinator. Because of the automatic and preferably autonomous registration and ongoing messaging, active grid elements operate collectively for managing flow of power for an electric grid, micro grid, or other system, or combinations thereof, more particularly the supply of electric power for the grid, whether by generation, storage for discharge, electric vehicles (EV), which function as transportable storage and load consuming devices, either standalone or in aggregate, (and must be tracked to ensure proper settlement and grid stability management), and/or load curtailment, and function to ensure grid stability and to supply electric power from any source of power generation, storage, and/or curtailment that equates to supply.

According to the present invention, grid stabilizing metrics including voltage, current, frequency, power factor, reactive and inductive power, capacitance, phase control, and/or any other grid metric that is required by a grid operator, market participant, utility, and the like, to operate and maintain electric power grid stability as determined by the grid operator or the governing entity therefor. Preferably, these metrics are monitored and/or measured at a multiplicity of points, and more preferably using active grid elements and their attributes and status information throughout the electric power grid, including but not limited to locations within or at the distribution system, transmission system, electrical bus (substation), generation source, supply control devices, load control devices, load consuming devices (particularly those involved in curtailment activities), at least one Coordinator, and combinations thereof. The metrics apply to any size and type of active grid element, regardless whether the generation source is macro in nature, e.g., large scale generation such as large coal, nuclear, gas or other traditional or non-traditional sources of generation, micro-grid generation, emergency back-up power generation, alternative energy generation, e.g., wind, solar, etc., or a power storage device or fuel cell that is potentially available for discharge.

Also, at least one of the active grid elements may include client devices or the associated power consuming or generation control devices have the ability to independently execute commands from an Active Load Director (ALD), Active Load Client (ALC), a $3^{rd}$ party Energy Management System (EMS), Active Supply Director (ASD), Coordinator, Generation Source Supply (GSS), Storage Source Supply (SSS), transmission/distribution capacity, messaging, settlements, security, and combinations thereof, that provide for both load consuming and generation to engage with the electric power grid at attachment points with assured grid stability as indicated by the grid stability metrics for compliance with requirements of the grid operator, utility, market participant, grid governing authority, and/or any other regulations applicable to the electric power grid. All of these active grid elements preferably receive their commands and send communications and/or messaging via an IP message via a Coordinator or Layer 3 router capable of handling all current and future iterations of IP messaging contemplated during the life of this invention.

Also preferably, all messaging to and from active grid elements is controlled, managed, and transmitted through the Coordinator, which communicates between the many active grid elements, including and following their initial registration, and the EMS and/or grid operator, utility, governing authority, and combinations thereof. More preferably, all commands and communications are routed through and by the Coordinator, which is constructed and configured for direct and/or wireless communication with the multiplicity of grid elements, and further includes components of processor, memory, persistence layer, memory cache, messaging engine, security interface, status and/or change-in-status indicator, geodetic locator, telemetry, connections with the network, software operable for managing and changing the connections, database with software operable for storing and analyzing data associated with transmission and distribution attachments, service points, active grid elements, registration, authentication, PSV, PTB, identification, capacity and capability of load and supply, software version control for active grid elements, software improvement control, software for settlement, and combinations thereof. Other switch elements, which may be included as active grid elements, that may be applicable to the Coordinator, and are included with the present invention include customer identification and authentication, customer security, attachment information and capacities, reservations for utilizing the transmission and distribution system, signaling to the electric grid or its operator the plurality of all the above. The Coordinator functions as an "energy router" whereby the messaging required to route supply, demand and transmission/distribution capacity to and from the grid is differentiated from pure communications routing and relates to grid stability and improved grid performance. Thus, the Coordinator is not merely functional as a traditional telecommunications router, but further includes the aforementioned messaging, management, and control functionality required for supply or curtailment to the electric power grid. The Coordinator is consistent with compliance as contemplated in the aforementioned FERC orders where frequency deviations, security, and grid performance are all now needed in an era of aging grid infrastructure and a changing and dynamic load environment where the legacy macro grid and the interim "Smart Grid" elements are not capable of responding to the new needs that FERC and NERC have identified and charged the market participants to solve, which have not yet been solved by any prior art, but which are addressed by the present invention. The energy routing function of the coordinator serves as a traffic manager, and a messaging engine, to track all the active grid elements, secure reservations and settlement information on the electric power grid and the interface for one-to-many (i.e., one port for EMS to the many active grid elements under the control of an EMS and supplying grid stability from the many to the one) allowing for microelements and distributed generation and distributed load curtailment to perform with the macro grid without taxing and destroying the legacy infrastructure beyond its capabilities and limitations; the Coordinator is further operable for tracking and maintaining status of all devices within its defined boundaries, or as described hereinabove with respect to PSV, or determined by the governing authority for the grid, which includes a balancing area, an ISO, a utility, a market participant, and combinations thereof.

Preferably, the Coordinator manages all registered active grid elements according to their characteristics, profiles associated therewith, location, and capability for responsiveness to the various electric power grid resource requirements. The Coordinator further operates to match and prioritize these registered active grid elements and provides messaging of their information and/or matching and prioritization to communication elements, including wireless and/or wireline carriers, so that the messaging is then prioritized through any or all of the networks for communication of any messages to the utility, market participant, grid operator, EMS, and combinations thereof, based upon the grid resource requirements at any given time. Thus, the Coordinator provides priority "flags" on messaging that may be communicated over existing telecommunications infrastructure to provide grid stability and resources messaging with priority messaging over other information transmitted through those communications networks regardless if they have been configured to offer priority or "class" of service or not, VPNs or not. In particular, since electric power generation, distribution and transmission is part of critical infrastructure and provides an asset for national security in many countries, including the United States of America, the present invention provides for enhanced critical infrastructure security with the priority messaging associated with the Coordinator and allows the Coordinator to take advantage of new chip and ASIC technologies that will accommodate multiple routes, VPNs, APNs, and IP addresses per active grid element, ALC, ASD, GSS, SSS, Smart Meter, Service Point, transmission, distribution element or combinations thereof.

The Coordinator is operable for and includes Layer 1-4 for communication, but additionally, and significantly, the Coordinator further tracks and communicates and controls where elements are attached to the grid, makes or communicates decisions about how the resources are used either with or without communication to any active grid element, including but not limited to ALD or ASD, or EMS, communicates the status of any and all active grid elements to legacy distribution automation and transmission reporting subsystems and provides for new methods for direct contribution by active grid elements to the grid stability through load curtailment and/or supply from any source, and for settlement of same, and the security, authentication, initial registration of the devices with the grid, ALD, ASD, market participant, grid operators, their legacy subsystems and/or EMS for the electric power grid; and change of status for those active grid elements; and combinations of these, while simultaneously facilitating and routing those messages to the appropriate subsystem to achieve the supply, curtailment, and/or grid stability requested by the legacy subsystems, or through the present invention, all with IP-based messaging. Most preferably, using digitally encrypted secure IP messaging delivered through a network via Ethernet, wireless messaging, or proprietary methods, including carrier-grade wireless and/or wired networks for communication.

SCED—Security Constrained Economic Dispatch

Security messaging is provided by systems and methods of the present invention. NIST and NERC provide standards for encryption of data, market data is provided by rules according to those standards. Data generated in the systems and methods of the present invention for automated financial settlements associated with the grid element participation, due to the increased accuracy and timeliness of the data, are preferably provided with secure messaging and access consistent with the standards for NIST and NERC, which are incorporated herein by reference in their entirety (including the version published as of the date of the filing of the present invention). Preferably, this data is secured and access is provided to market participants on a subscription basis, provided that they agree to all security and data usage requirements associated with market rules and privacy rules and/or laws governing the electrical grid and/or energy markets. If regulatory bodies or market governing bodies deem the data to significantly advantage those who have adopted it, due to the speed and execution of trading energy consumption, forecasting and projection, then the market may purchase subscription access. By way of example, security is provided in at least one form, such as VERISIGN and PAYPAL certificates provided to ensure secure financial transactions; group keys, dynamic keys, certificates, VPNs, etc. used with the communications of financial settlement messaging according to the systems and methods of the present invention. Verisign authentication, and functionally similar security services associated with electronic communications of financial settlement, which are incorporated herein by reference herein, includes SSL (secure socket layer), PKI (public key infrastructure), Verisign Trust Seal, and Verisign Identity Protection (VIP) services are owned by Symantec.

Priority messaging for financial settlement is also provided by systems and methods of the present invention. OSI equivalent for financial messaging, including price, consumption, location, trouble, loss of connectivity, increase or decrease consumption or supply (associated with price), etc. Prioritization for participation messaging is provided under the present invention; initial registration is followed by messaging associated with the grid element relating to participation, profiles, etc. Authentication is preferably included with registration, and any and all updating or changes to settings, profile, preferences, and particularly including location. Location defines resource node, attachment point, losses, electrical bus, PSV, PTB, and combinations thereof, and therefore, financial settlement factors and final value of settlement for the participation for each of the grid elements.

The Coordinator operates further for communication of all telemetry, settlement, tracking, and combinations thereof for each active grid element. All active grid elements associated with the grid for supply and/or load curtailment are registered with the Coordinator and are routed within one or more ports within the EMS, for example as illustrated in the Figures; thus, the Coordinator and its application or functionality within the electric power grid sends signals, telemetry and messaging for primary frequency control, grid stability, control events, dispatch schedules for supply sources (both pre-scheduled and dynamic/real time in response to electric power grid conditions), and combinations thereof through messaging and coordination with the active grid elements. The Coordinator also preferably includes functionality for clearing and reporting to and with transmission reservations subsystems associated with the active grid elements. By way of example, prior art transmission reservations subsystems can be represented by companies such as OATI's OASIS transmission reservation system (illustrated at the Internet website www.oatioasis.com), which is overseen and regulated by FERC, but whose clearing and reporting is deficient in enabling reservations below macro transmission levels, and whose reservation systems include "firm" capacity and "non-firm" capacity that has very little value since its reliability is not assured. The present invention solves many of these problems and creates "actual measurable and verifiable transport capacity" by enhancing power distribution, settlement, and combinations thereof, by grid element, by service point, by device and by consumer. Additionally, telemetry for settlement for curtailment, supply from storage, and combinations thereof, are managed through the Coordinator. The Coordinator is further constructed, configured, and operable in IP-based or proprietary messaging communication, for providing a routing and control architecture and methods analogous to the OSI model used in telecommunications networks worldwide, applied for all active grid elements management and for supply, whether GSS or SSS, and load curtailment management for any of the multiplicity of active grid elements, and grid stability. The messages contemplated by this type of energy routing and capacity creation in itself creates the potential for a new standard for achieving FERC and NERC goals while seamlessly integrating into legacy subsystems of current art of macro electric utility architecture.

The method, system and apparatus embodiments of the present invention further provide that the active grid elements are operable to send change in state messages in lieu of a constant stream of IP messages via a telemetry path. The change-in-state messages provide the ability to only communicate the "deltas" (or change in state) and have the ALD, ASD, and/or server transmit, send, or stream the telemetry from the last "known value" until that last known value has changed, by communicating a "delta" message, rather than constantly streaming values, and may use "machine to machine" communications, text telemetry, or any low bit rate telemetry method that meets the requirements as established by the governing entity, but is capable of complying while simultaneously utilizing the transmission bandwidth and latency that is available at a service point or active grid element location. These change-in-state messages associated with the active grid elements preferably include the necessary information to report the Power Supply Value (PSV), PTB, and/or any other grid stability messages on an event basis rather than merely a telemetry basis and to send those messages through a server, and are transmitted to an energy management system (EMS) via a format as determined by the grid operator, microgrid operator, and/or other grid control entity while simultaneously achieving primary frequency control and grid stability at the service point and/or active grid elements and storing at the ALC, ASD, ALD, ASD or combinations thereof the necessary information in granular format sufficient to transmit for settlement or measurement and verification processes later either when better transmission speeds are available or retrievable by a manual intervention such as a smart phone, tablet or drive by apparatus where the memory may be downloaded to a mobile client.

The systems, methods, and apparatus embodiments of the present invention further provide for commands issued either directly by the EMS, Coordinator, ASD, ASC, ALD, ALC, load consuming device, "Smart Electric Meter" and its subcomponents (processor/memory), or by programming any active grid element, for example, a client device such as a programmable thermostat or building control system, wherein the commands anticipate the activation of a load curtailment event for any load consuming device (such as an HVAC system, a system profile that has been programmed for supply side indices such as market price of power or Operating Reserves or load side indices that take a consumer's preferences into account, or any other sensor) or the activation of a supply or demand event for any supply source associated with the electric power grid.

The balancing areas (BAs) provide for opportunities for the electric power grid and/or a multiplicity of grids that are constructed and configured for networked communication and power distribution therebetween. In one embodiment of the present invention, communication with active grid elements passes through or is routed by at least one Coordinator for providing the one-to-many coordination of communication, messaging, etc. between the many active grid elements and the EMS, inside a given BA or between BAs, which may involve at least one Coordinator for each BA, thereby providing for managed, coordinated cross-communication of status, change-in-status, grid stability metrics, control messages, and combinations thereof.

The present invention systems and methods provide hereinbelow for power trade blocks or power trading blocks (PTBs) for facilitating the collaboration across balancing areas and regions for supply and load curtailment management, for increasing power available, operating reserves, and/or grid stability. In preferred embodiments of the present invention, at least one PTB is introduced and/or provided to the electric power grid, including method steps of: valuing, trading, selling, bartering, sharing, exchanging, crediting, and combinations thereof. Thus the present invention provides for electric trading markets across BAs or microgrids or individual active grid elements, including load consuming customers or supply sources, whether generation, storage, distribution or transmission.

Telemetry, measurement, verification, PSV, PTB, and other factors described herein, in compliance with FERC 745, 750, and 755, provide with the present invention the capacity for active grid elements functioning for providing curtailment as operating reserves to be compensated for megawatts at the clearing price, and for supply to be provided or indicated as available to be provided, and compensated or settled for megawatts at the clearing price. Clearing prices are either determined by many attributes including their location of where the power is delivered or accepted by a generator of power or a purchaser of power. The term "Locational Marginal Pricing (LMP)" refers to a node where power is either delivered from a generator or accepted by a purchaser. A node corresponds to a physical bus or collection of buses within the network or any other geodetically defined boundary as specified by the governing entity. A load or supply zone is defined as an aggregation of nodes. The zonal price is the load-weighted average of the prices of all nodes in the zone. A hub is defined as the representative selection of nodes to facilitate long-term commercial energy trading. The hub price is a simple average of LMPs at all hub locations. An external or proxy node is defined as the location that serves as a proxy for trading between ISO-Balancing area and its neighbors. According to the present invention, the at least one grid element(s) includes transmission or distribution control node, monitoring node, telemetry node, routing node, electrical routing node, fault protection node, generation node, load control node, devices (active and passive), sensors, etc., wherein any node includes an interface and/or an attachment.

For vertically integrated utilities that do not have open markets as ISOs, their delivery or acceptance of power can occur at the boundaries of their "Balancing Area", which is defined as the geography where their transmission and distribution system extends and is subject to grid stability maintained by that utility. Balancing Authority boundaries can also be delivery points or (LMP) pricing points. It should be noted that vertically integrated utilities are subject to the same FERC and NERC rules as decoupled utilities in ISOs, except in vertically integrated utilities, local public utility commissions have more authority to enforce and enhance rules since the rate base is being charged for improvements to the grid within the balancing area (BA) that the utility serves. FIG. 17B is a table illustrating three FERC orders (745, 750, 755—all issued in 2011) and their applicability to the electric power grid load management and distributed supply addressed by the various systems, including active grid elements and their registration and functionality within the system according to methods and apparatus embodiments for present invention. The trend in the world market is to inject market forces to utilities such that they must follow new FERC rules that permit the use of demand response technologies/load curtailment technologies to promote the need for fewer large scale, primarily fossil fuel power plants.

Power is generally traded in terms of "Capacity"—the reserved peak amount of power that a generator agrees to reserve for the utility, market participant, or REP- and "Energy," defined as the amount of power consumed by the utility, market participant, REP or any entity that is authorized to buy, sell or distribute power for the electric power grid; consumers, particularly commercial accounts, also purchase power in this manner. Energy is settled on the wholesale market in "MegaWatt Hours", which is defined as one (1) million watts of electricity consumed at a metering point, or interchange of power such a LMP, transmission tie point between two utilities, a commercial customer large enough to consume such an amount, a utility (generating or distributing) or a market participant including a REP that generally purchases the power from a generating utility and utilizes the distribution network to supply its power purchased at the wholesale level and distributes its power to end consumers/customers generally in smaller increments of measurement "kilowatt hours (kWH)." These increments are important due to the introduction of programs involving utilizing curtailment technologies enabled by FERC Order 745, 750, 755 whereby utilities, market participants, REPs and CSPs may aggregate their curtailment/DR and/or supply in increments of "kW-representing a capacity figure" and "kWH" which represents avoided energy. Peak "capacity" charges are settled based upon intervals whereby the instantaneous peak (kW/MW) determines the "capacity" charge.

In particular, by way of more detailed explanation, FERC issued a series of orders (745, 750, 750-A, 755) that have had a pronounced impact on the injection of new technologies, particularly distributed load resource, curtailment, demand response technologies, and distributed supply sources, to the market to be implemented across all of the US and with direct applicability to World markets. FERC Order 745 provides that utilities, market participants, CSPs, REPs or any other entity that can aggregate a minimum trading block of power that can be accepted into the market, BA, utility service area, or regional trading area (RTO) must be compensated for such curtailment/load resource and demand response technology at the clearing price at the nearest LMP as though it was generation; this provides that active grid elements associated with these supply and/or curtailment activities may be individually tracked, managed, reported, and compensated based upon their individual contribution to the aggregated settlement. Said plainly, "Negawatts" have the same value as "Megawatts." Controversial, particularly to those utilities that still have the antiquated practice of rate base recovery of assets to insure profits, the conditions of which these "Negawatts" are compensated as "Megawatts" place a high value on those curtailment/load resource/demand response technologies that can create utility Operating Reserves for the benefit of grid stability. Operating Reserves, previously defined, come in different capacity and energy products or their equivalencies in the case of curtailment/load resources/demand response and are compensated at the nearest LMP based upon their ability to perform to the same level of measurement, verification, responsiveness (latency) and settlement as generation. This high standard has the practical effect of rewarding those advanced technologies that can perform as generation equivalencies (load resources), while still allowing capacity products (traditional and advanced demand response) to also participate in the market and perform the valuable function of providing capacity and energy resources without the need for transmission losses (avoided power avoids transmission of kWH/MWH to the endpoint, therefore freeing up transmission and distribution lines to carry power elsewhere where it is needed). It should be noted that most utilities do not have accurate measurements of distribution losses below their electrical bus (substation levels) and as such high performance, IP-based active grid elements and corresponding service points that allow this information to be brought forward to the utility operations promote the Operating Reserves and "Negawatts" and add to their value.

The following related US Patents and Patent applications, U.S. application Ser. No. 13/172,389, filed Jun. 29, 2011, which is a continuation of U.S. application Ser. No. 12/715,195, filed Mar. 1, 2010, now U.S. Pat. No. 8,032,233, which is a divisional of U.S. application Ser. No. 11/895,909 filed Aug. 28, 2007, now U.S. Pat. No. 7,715,951, are incorporated herein by reference in their entirety. These documents include descriptions of some active load management within power grids, and provide additional background and context for the present invention systems and methods.

Also, in this document, relational terms, such as "first" and "second," "top" and "bottom," and the like, may be used solely to distinguish one entity or element from another entity or element without necessarily requiring or implying any physical or logical relationship or order between such entities or elements. The terms "comprises," "comprising," or any other variation thereof are intended to cover a non-exclusive inclusion, such that a process, method, article, or apparatus that comprises a list of elements does not include only those elements, but may include other elements not expressly listed or inherent to such process, method, article, or apparatus. The term "plurality of" as used in connection with any object or action means two or more of such object or action. A claim element proceeded by the article "a" or "an" does not, without more constraints, preclude the existence of additional identical elements in the process, method, article, or apparatus that includes the element.

By way of definition and description supporting the claimed subject matter, preferably, the present invention includes communication methodologies for messaging via a communication layer. IP-based communications over a network are most preferred. Correspondingly, and consistent with the communication methodologies for messaging according to the present invention, as used throughout this specification, figures and claims, the term "ZigBee" refers to any wireless communication protocol adopted by the Institute of Electronics & Electrical Engineers (IEEE) according to standard 802.15.4 or any successor standard(s), the term "Wi-Fi" refers to any communication protocol adopted by the IEEE under standard 802.11 or any successor standard (s), the term "WiMax" refers to any communication protocol adopted by the IEEE under standard 802.16 or any successor standard(s), and the term "Bluetooth" refers to any short-range communication protocol implementing IEEE standard 802.15.1 or any successor standard(s). Additionally or alternatively to WiMax, other communications protocols may be used, including but not limited to a "1G" wireless protocol such as analog wireless transmission, first generation standards based (IEEE, ITU or other recognized world communications standard), a "2G" standards based protocol such as "EDGE" or "CDMA 2000" also known as "1×RTT", a 3G based standard such as "High Speed Packet Access (HSPA) or Evolution for Data Only (EVDO), any accepted 4G standard such as IEEE, ITU standards that include WiMax, Long Term Evolution "LTE" and its derivative standards, any Ethernet solution wireless or wired, or any proprietary wireless or power line carrier standards that communicate to a client device or any controllable device that sends and receives an IP-based message. The term "High Speed Packet Data Access (HSPA)" refers to any communication protocol adopted by the International Telecommunication Union (ITU) or another mobile telecommunications standards body referring to the evolution of the Global System for Mobile Communications (GSM) standard beyond its third generation Universal Mobile Telecommunications System (UMTS) protocols. The term "Long Term Evolution (LTE)" refers to any communication protocol adopted by the ITU or another mobile telecommunications standards body referring to the evolution of GSM-based networks to voice, video and data standards anticipated to be replacement protocols for HSPA. The term "Code Division Multiple Access (CDMA) Evolution Date-Optimized (EVDO) Revision A (CDMA EVDO Rev. A)" refers to the communication protocol adopted by the ITU under standard number TIA-856 Rev. A.

It will be appreciated that embodiments of the invention described herein may be comprised of one or more conventional processors and unique stored program instructions that control the one or more processors to implement, in conjunction with certain non-processor circuits, some, most, or all of the functions for managing power load distribution and tracking individual subscriber power consumption and savings in one or more power load management systems as described herein. The non-processor circuits may include, but are not limited to, radio receivers, radio transmitters, antennas, modems, signal drivers, clock circuits, power source circuits, relays, meters, smart breakers, current sensors, and user input devices. As such, these functions may be interpreted as steps of a method to distribute information and control signals between devices in a power load management system. Alternatively, some or all functions could be implemented by a state machine that has no stored program instructions, or in one or more application specific integrated circuits (ASICs), in which each function or some combinations of functions are implemented as custom logic. Of course, a combination of the two approaches could be used. Thus, methods and means for these functions have been described herein. Further, it is expected that one of ordinary skill in the art, notwithstanding possibly significant effort and many design choices motivated by, for example, available time, current technology, and economic considerations, when guided by the concepts and principles disclosed herein, will be readily capable of generating such software instructions, programs and integrated circuits (ICs), and appropriately arranging and functionally integrating such non-processor circuits, without undue experimentation.

Recently, the IEEE and ITU have released improved WiMax and Long Term Evolution wireless standards that have facilitated the consideration of new technologies to improve the response and control of power load control devices employing smart breaker and smart disconnect switches that include advanced smart meters where IP multimedia gateways are embedded or attach as separate connected printed circuit boards, and submetering technologies that possess sufficient "revenue grade" metrology such that the measurements provided by these devices may be accepted for settlement purposes. The term "revenue grade" is an industry term, as will be appreciated by one of ordinary skill in the art, a percentage of accuracy determined by ANSI, which means that power measurement must be within ½% of the actual value being consumed. Thus, calibration standards are provided accordingly to OEMs of power measuring devices and/or chips. In embodiments of the systems and methods of the present invention, these calibration standards are met via components, including a chipset and related software, and the transmittal of the power measurement information via IP-based communications as set forth hereinabove. Baselining techniques that provide a reference power usage point, sampling techniques that allow for verification of the power "state" and power consumption data for electricity consuming devices (inductive or resistive), reactive power, Power Factor, start-up current, duty cycles, voltage, consumption forecasts and most importantly real-time or near real-time power measurement sampling, etc., are required to derive a Power Supply Value (PSV) that includes an American National Standards Institute (ANSI), ISO, grid operator, governing body revenue measurement, etc., which is preferably aggregated to reach the size of at least a single Power Trade Block (PTB) unit for the purposes of optimally monetizing the active load management from the customer perspective. PTBs are dependent on a grid operator, regional transmission operator, or independent system operator to determine the capacity size (in kW or MW) or energy data in (kWh or MWh) that can be accepted for bidding, trading, settlement by the utility, the end consumer/customer, the market participant, the CSP, demand response aggregator or any entity authorized by the government entity that regulates grid operators such as FERC, NERC etc. Generally due to measurement, verification, transmission and/or distribution modeling (which considers the impact to the grid from the curtailment activities at any geodetic location on the grid, but generally modeled by electrical bus or substation), the minimum acceptable PBT is 100 kW at the time of the present invention. This limitation is not expected to be permanent, given these advancements in measurement/verification, the near real time or real time IP/Ethernet based telemetry capabilities presented by a plurality of various communications methods as discussed in this embodiment and the advancements in service oriented architecture based (SOA) software and hardware subsystems, when combined with an ALD and ALC that can perform at a sublevel such that the minimum PTB can be determined at the device, home, building, service point, commercial, industrial, transformer, feeder, substation, transmission line and any sub-point along the transmission and distribution feeder system of an electrical grid as so long as minimum telemetry, measurement, verifications, validation are met and are capable of being aggregated to a minimum PTB acceptable to the grid operator, ISO, RTO, BA or any other increment of grid topography used now or in the future for settling power block increments by sub-PTB.

Embodiments of the present invention expand upon and enhance prior technologies by, among other things, employing WiMax, High Speed Packet Access (HSPA), Evolution for Data Only (EVDO), both considered $3^{rd}$ generation wireless standards, Long Term Evolution (LTE), considered at the time of the invention as a "4G" standard and its derivative standards that are most assuredly to be introduced during the life of this invention, IEEE 802.11 (X) also known as "WiFi" and its derivative standards inclusive of "Multiple Input Multiple Output" (MIMO), as set forth in the communication methodologies hereinabove, a plurality of proprietary mesh and point to point communications solutions or any Internet Protocol (IP)-based load control in a system with the ability to monitor and measure, in real time or in sufficient time increments to satisfy the telemetry performance standards as established by the Government or governing bodies (e.g., National Electric Reliability Corporation (NERC), Federal Energy Reliability Commission (FERC)) the amount of power deferred, conserved or removed (or carbon, $SO_2$, or $NO_2$ eliminated), such as, by way of example, the Kyoto or Copenhagen Protocols that set up carbon credits. These improvements allow new options for electric utilities or any market participant to defer or invest in new power generation that is friendlier to the environment.

The present invention provides the ability to project lost revenues, and provide actual data to support the projections, without disadvantaging the consumer, especially residential consumers of electric power from the grid, for example in the case of utility wherein the customer is charged any fees associated with the inefficiency of the network, even where those inefficiencies may be due to the lack of maintenance or upgrades to the system, or to natural disasters, or the inability to maintain frequency or voltage or grid stability in accordance with requirements of FERC, NERC, etc. The utility was not assessed a NERC financial penalty for its failure to assure and maintain grid stability and operations. The prior art smart meter infrastructure with 15-minute interval data daily cannot settle or transmit the information to calculate the capacities in the transmission distribution system, the faults in the system, or the faults of the generation system, because the smart meter infrastructure provides past data only for modeling, rather than dynamic modeling, as with the present invention, wherein the dynamic modeling provides real-time results to maximize the efficiencies of the system while providing consumers control over consumption by being able to buy, sell, trade, exchange, barter, and combinations, with real-time or near real-time data. So instead of waiting 15 minutes for the next KWP, the consumer can "check-out" immediately and track spending, just like with consumer products for tracking any other expenditures, automated check outs, payments, and statement reviews, as in online banking.

The present invention provides for mobile devices used for updating the PSV, meters, etc., which are also used by consumers and businesses for real-time review of financial information on their respective accounts, and for making changes to profiles, settings, and preferences.

Pass-through individual coordinators, or linked coordinators, which are connected and feed into one or more databases, preferably consider all attributes for curtailment, supply, profiles, price, etc., and combinations thereof for the grid elements that communicate with the coordinators. TDSP subsystems provides for master SCADA information, market (ISO or vertically integrated) information, that are communicated with the EMS. Preferably, all systems are linked together with SOA, with a communications network for sharing data, information, etc., preferably Ethernet, according to the present invention. The ISO and TDSP produce the information for the market, which is communicated via network to the coordinator(s). The EMS has ICCP associated with the bus; and the ISO provides for grid stability, pricing, etc. The TDSP provides for grid health, losses (reported at the electrical bus). The present invention further provides for resource settlement nodes associated with the grid resource nodes, where the generators or supply sources connect to the electrical power grid. The present invention provides for financial settlement generating transactions at any grid element attachment point, as well as, and including the resource settlement nodes. ALD, ASD, and/or coordinator(s) communicate with the grid elements associated with supply or generation for the grid, and are all connected, both in electric power grid transmission and communication network connection, to a resource node. Grid elements may further include (but are not limited to) transmission, transformers, end points, smart meters, attachment points, and combinations. Preferably, all grid elements have geodetic references associated with them. The transaction for financial settlement for grid elements occurs at the supplier and/or consumer points of connection to the grid. Settlement at the grid elements, in any location associated with grid element participation in the grid, is provided by the present invention.

Outside the electrical bus or substation within the electric power grid, the financial transaction subsystem provides information between the subsystems and from the electrical bus to the market. Since the present invention's settlement processor provides for clearing of financial settlement data at or less than 15 minute increments, at 15 minute intervals or increments, with better and more accurate data than with any prior art systems, customers (or owners of the grid elements participating in the electric power grid) clear the market with the best price for power supplied to the grid and also pay less for energy consumed (demand) from the grid supply. This occurs because inefficiencies are factored out or reduced in terms of allocation to those grid elements, control generation, control usage/consumption, make informed decisions about participation, or based upon profiles, automatically participate. All information automatically clears and settles, i.e., the systems and methods of the present invention automatically provide a financial settlement for each active grid element for its participation in the electric power grid, to the grid element owner, with communications through the coordinator and with settlement through the settlement processor as described herein and illustrated in FIG. 1.

By way of contrast to the prior art, wherein inefficiencies are spread amongst all participants (e.g., the leaks out of the lakes and pipes), whether they are consuming or supplying, the present invention systems and methods provide for each of the grid elements that are registered and participating within the financial settlement system to have improved accuracy of data relating to such participation, thereby reducing or eliminating the inefficiency "spread" losses that would have been associated with those grid elements under the state of the art distribution. Thus the present invention provides solutions for the longstanding, unmet needs of participating grid element owners to supply empirical data relating to their participation that directly evidences the specific losses, if any, that are directly related to their participation. Improved modeling based upon data provided for less than 15 minute intervals is provided, and eventually, modeling is eliminated due to the supply of real-time data for actual participation, rather than assumptions associated with modeling, as exists in the prior art. So then the inefficiencies are accurately associated with the loss points and grid elements that function inefficiently, rather than assuming distribution on a pro-rata basis to all participating grid elements. Notably, even nonparticipating grid elements may be assessed for losses and inefficiencies if they are registered with the grid (e.g., power consuming customers are assessed a general charge even if they do not consumer power during a predetermined billing period, which is generally at 30-day intervals).

Manual settlement using spreadsheets is still used today; however, even in the case of manual settlement, the present invention provides for improved accuracy and timeliness of the financial settlement of the participation of the grid element.

Settlement for consumers of electric power of the grid is considered within the scope of the present invention. Rate plans include tracking consumption patterns and profiles. Customizable plans are developed on a per-market-consumer basis under the present invention systems and methods. So then grid elements participating in the systems and methods according to the present invention include electric power consumers having at least one power consuming device, and at least one registered account associated with a geodetic location of the at least one power consuming device.

The present invention further provides for aggregation of financial settlement by power consuming devices for a single consumer. Also and alternatively, classes of customers may be grouped by "buckets" of consumption that maximize the ability of consumers to afford the plans they want and for utilities and/or grid operators to predict and manage the power supplied over the grid to consumers. By way of comparison, real-time settlements and customizable plans for electric power consumption for registered grid elements (and correspondingly, their owners) are provided similar to mobile telephone rate plans customized or grouped for consumers having similar patterns, profiles, and/or geographic locations.

By way of example, based upon the power supplied, the reduction in consumed power (curtailment as supply) and/or the consumption of power, the systems and methods of the present invention provide for generating at the coordinator a power supply value (PSV) corresponding thereto by the active grid elements associated with their participation in the grid. Importantly, the PSV is an actual value that includes measurement and verification of the reduction in consumed power; such measurement and verification methods may be determined by the appropriate governing body or authority for the electric power grid(s). Power Supply Value (PSV) is calculated at the meter or submeter, building control system, or any active grid element that measures power supplied or consumed within the standard as supplied by the regulatory body(ies) that govern the regulation of the grid. PSV variations may depend on operating tolerances, including operating standards for accuracy of the measurement. The PSV enables transformation of curtailment or reduction in power, power supplied, and/or power consumed at the active grid element level by any system that sends or receives an IP message to be related to or equated to supply as presented to the governing entity that accepts these values and awards supply equivalence (e.g., for example of a power generating entity or an entity allowed to control active grid elements and their participation on the electric power grid such as power consuming devices as permitted by the governing body of the electric power grid, e.g., FERC, NERC, etc.).

PSV associated with active grid elements and their participation within the electric power grid may be provided in units of electrical power flow, monetary equivalent, and/or combinations thereof. Thus, the PSV provides an actual value that is confirmed by measurement and/or verification, thereby providing for supply and/or curtailment value(s) as a requirement for providing supply to the power grid, wherein the supply to the power electric power grid is provided for grid stability, voltage stability, reliability, and combinations thereof, and is further provided as responsive to an energy management system or equivalent for providing grid stability, reliability, frequency as determined by governing authority for the electric power grid and/or grid operator(s).

Energy consumption and/or supply patterns associated with active grid elements and their participation on the electric power grid are subject to analysis that may be used for a variety of different types of activities. For example, based on the energy consumption patterns created from this data, the Coordinator will derive performance curves and/or data matrices for each service point to which the active grid elements are attached and determine the amount of energy reduction that can be realized from each active grid element and its functionality within the electric power grid. The Coordinator(s) create a list of service points associated with the active grid elements and their participation on the electric power grid through which energy consumption can be reduced via demand side management, interruptible load, or spinning/regulation reserves. This information can be manipulated by the Coordinator and/or ALD processes to create a prioritized, rotational order of control, called "intelligent load rotation" which is described in detail below. This rotational shifting of the burden of the interruptible load has the practical effect of reducing and flattening the utility load curve while allowing the serving utility to effectively group its customers within the ALD or its own databases by energy efficiency.

Generally, the embodiments described encompass a closed loop system and method for creating a profile, calculating and deriving patterns of energy usage and/or supply, and making use of those patterns when implemented through the machinery of a system comprised of active grid elements combined with the physical communications link and when these inputs are manipulated through a computer, processor, memory, routers and other necessary machines as those who are skilled in the art would expect to be utilized.

The present invention also considers the concept of "drift" as applied to electric power grids and active grid elements associated therewith. The data gathered for the active grid element profile is used to empirically derive the decay rate or drift, temperature slope, or a dynamic equation ($f\{x\}$) whereby the service point (or device) will have a uniquely derived "fingerprint" or energy usage pattern for individual and/or aggregated active grid element(s).

The embodiments disclosed also make use of the "intelligent energy rotation" concept. Intelligent energy rotation uses machine intelligence to ensure that the same active grid elements are not always selected for energy control events, but distributes energy supply or load control events over a service area in some equitable way and/or least cost analysis-applied manner, or other analytical approach for optimizing the electric power grid resources and functions of the associated active grid elements registered for automated intercommunication therewith.

In another embodiment, energy consumption patterns in active grid elements profiles are used to identify active grid elements that are the best targets for excess power sharing. This would occur when renewable energy such as solar or wind is added to the grid, resulting in power that cannot be compensated for by the grid. This could occur, for example, on very windy days. When this happens, utilities or market participant, grid operator, EMS, or equivalent are faced with the problem of what to do with the excess energy. Instead of cutting power to service points in order to affect power savings, a utility, market participant, grid operator, EMS, or equivalent could add energy to service points and through active grid elements associated with those services points in order to effect power dissipation. The service points and/or active grid elements selected by the Coordinator may be different (or even the inverse) of those selected for power savings. The devices at these service points would be turned on if they were off or set points for climate-controlled devices would be adjusted to heat or cool more than normal. Spread out over many control points, this can provide the energy dissipation needed.

In a further embodiment, energy consumption patterns within active grid elements profiles could be used to identify opportunities for up selling, down selling, or cross selling. These opportunities may be determined by the power utility or by its partners. Data from active grid elements profiles and their participation on the electric power grid may be used to provide insights on inefficient devices, defective devices, or devices that require updating to meet current standards. Active grid elements profiles data, and/or data associated with their participation on the electric power grid, individually or collectively (or selectively) in the aggregate, may also be used to identify related power grid participation opportunities.

According to the present invention, PSV for any of the active grid elements and their participation on or within the electric power grid may be generated by methods including information relating to baselining historical load, also known as the customer baseline (CBL), estimating based upon curves, real-time or near-real-time value, and combinations thereof.

Advantageously, the present invention provides active load and/or supply management metrics for each of the active grid elements, including PSV, much better than merely a statistical estimate for a command as with prior art; PSV also further provides for steps of measurement and settlement, according to the present invention. FERC requires that the settlement credits are provided at point where settlement occurs; settlement information follows the transaction, most preferably, according to the present invention, occurring in real time or near real time, as in financial transactions or other commodity transactions, such as for natural gas supply. Also, preferably, there is a defined interval that is accepted or acceptable by the governing entity for the electric power grid, wherein each transaction is recorded as it occurs. Furthermore, the present invention provides for IP real-time communications that provide for settlement of the curtailment by load-consuming devices at or approximate to the time of the transaction, i.e., the curtailment. Also, preferably, there is participation data for the grid elements that provides supporting evidence attached with the IP real-time communication of the acceptance of the power event, and then automatically recorded in a settlement database and associated with each active grid elements registered within the system through the Coordinator(s), and participation on the electric power grid by the grid elements that are registered with the system. Also, some information related to this transaction and its settlement is transmitted to the energy supplier and/or energy/curtailment purchaser, permitting the seller to be paid according to the PSV and/or PTB related to the power event, e.g., curtailment or supply event(s).

Power Trading Blocks (PTBs) are dependent upon the grid operator or ISO; there must be enough curtailment or supply for the grid operator to accept, settle, and monetize, including individual and/or collective or selectively aggregated data for active grid elements registered with the system and their participation on or within the electric power grid. At this time, the PTB is 100 kW in most electric power grids, including a conventional utility, independent system operator, grid, or microgrid operator. Generally, the power available as operating reserves is traded in larger amounts, PTB size, to be significant enough to beneficially stabilize the grid and its operating reserves. At this time, the regional trading organization or geographic-specific grid and corresponding regulations therefor, determine the PTB size, which typically requires the aggregation of load from a multiplicity of consumers, residential or commercial, to reach a minimum PTB size or PTB unit. The PTB unit, combined with the PSV, and the real-time secure communications used with ALC/ALD function to lower the size of the minimum PTB required to form a PTB unit for grid reception and settlement purposes. The commercial impact determines the minimum PTB size, which corresponds to a PTB unit, due to cost and timing of communication of the information related to the curtailment event(s) and response by the device(s), and how aggregation of load curtailment by the multiplicity of devices is managed to ensure maximum compensation to the customer(s) associated with the device(s) for the curtailment event, with minimum negative physical impact to those consumers and/or devices from the curtailment event.

Active grid element profiles and their participation on the electric power grid may also be dynamic, and settlement processing associated with those grid elements includes consideration of those profiles, in addition to the data from participation of the grid elements for supply and/or curtailment, and for energy consumption as well. An example of this would be the ability for active grid elements or grid elements and their participation within the electric power grid to utilize real time communications from an electric utility grid, market, market participant, utility, REP, CSP or any other entity authorized on behalf of the owner to act on their behalf to control load consuming devices owned by the consumer and connected to the electric utility grid. Preferably, the active grid elements receive this information automatically through a plurality of methods utilizing IP-based communications methods and web based devices such as smart phones, computers, text messages, paging messages, or even voice response units or live customer service agents. Under this real time scenario, active grid elements could dynamically "Opt In" to a pre-determined profile, "Opt Out," or, more importantly, change the profile dynamically to take advantage of real time market pricing of electricity being sold by the utility, market participant, REP or any entity authorized to buy, sell and trade electric commodity or demand response products on behalf of the owner.

The present invention has adequately described in great detail how the active grid elements and their participation on the electric power grid are associated with the Coordinator and the employment of computer assisted apparatus that include, but are not limited to processors, ASICS, memory, analytics, communications interfaces and methodologies, databases, both relational, high performance "historian" databases, persistence and cache layers, metadata layers, analytics engines, monitoring and reporting active grid elements, Internet Protocol, Ethernet, carrier grade wired and wireless networks, proprietary networks, TDM wireless and wired networks, analog and digital telemetry subsystems, Coordinators, Active Supply Directors and a plurality of the above both centralized, networked together and distributed. While the previous descriptions have been detailed in the embodiment of a FERC 745 load acting as supply, one skilled in the art will correlate those functions previously described as they apply to the supply side for FERC 750 and 755, including settlement.

These highly decentralized networks must be capable of operating directly under the control of an EMS/DMS/GMS or similar control solution, through a Coordinator, and for active grid elements autonomously if they are disconnected from the macro electric grid or have voluntarily opted to disconnect themselves from the electric grid temporarily or permanently. The present invention provides through software, hardware and advanced communications methodologies the capabilities of many small Distributed Electric Resources (DER) associated with the active grid elements to perform and deliver their energy resource directly to the electric grid interconnected as if they were a macro resource with aggregated PSV values that build up to minimum PTB blocks that can be both presented, operated and monetized by a Market Participant, REP, Utility, IPP, a Company acting as their own energy agent or a plurality of all of the above.

The present invention also provides for intermittent resources previously described, and the ability of the grid elements providing supply to the grid to be balanced, regulated and offered to the grid as reliably as DER. Balancing DER would suggest that a plurality of these resources may be co-located at the same service point/attachment or be themselves disaggregated from each other physically, but interconnected via the present invention and its attributes. An embodiment of this type of DER would be a commercial building that has installed solar film, panels or combinations thereof, a wind or water turbine, and a back-up generator at the same installation. These different resources with their different DER attributes must all be combined through an ASC that would have the capability of providing for primary frequency control per supply source, voltage control, and meet the appropriate attachment regulations that may be different based upon the location of the DER supply on the distribution or transmission system and operating those systems either through a coordinator and an EMS or autonomously from both while still offering its supply to the interconnected electric grid. The present invention functions to communicate and control the DER based upon availability of the resource, what the grid's energy needs are at the moment of the energy being presented by or through a Market Participant or, if permitted by the governing entity, an individual consumer utilizing the present invention or the economic incentives that are profile-based, sold in advance through an approved trading organization approved by the governing entity, or supplied in real time at the attachment point on the grid and supplied through the present invention as directed by an Energy Management System or providing those EMS services due to an EMS not being available at the time the resource is delivered and whereby the apparatus of the present invention is providing energy and grid stabilizing resources from the available sources, balanced upon what each resource can provide reliably to the interconnection of the electric grid.

Other embodiments of DER that can be used with the present invention would be communication facilities such as wireless communications towers owned by carriers, tower leasing companies such as American Tower, Crown Castle Inc. SBA Inc etc., whereby standby generation, batteries, solar, wind or other forms of backup generation including fuel cells are present to insure reliability. Wireline facilities, such as data centers, central offices, retail stores, hospitals, fabrication facilities, manufacturing facilities, service facilities, emergency management facilities, television facilities, cable facilities, utility facilities, and other critical infrastructure, are all examples of micro and macrogrid interconnections whereby latent standby generation and DER may already be present and whereby the use of the described invention would be used to interconnect these DER to the electric power grid as active power devices.

Transmission and distribution companies are used to estimate losses, power flow, and power loss models. Modeling is usually provided by the TDSP/utility; they measure information within the grid so that they can estimate transmission losses. Transmission and distribution loss modeling are used in each substation, feeder, and electrical bus to approximate losses between the transmission and distribution device and end point where the load is being served. These models are also used when empirical data is available; they are industry-accepted practices that provide a level of engineering safety and capacity factors which are widely accepted practices. Instead of relying solely on modeling, the empirical data is used to correct the models. All models have coefficients of loss that may be improved; the modeling is improved for all the data provided. Transmission loss models are considered for frequency, distance, size of cable, etc., and combinations thereof.

Generation losses are also a function of the efficiency of transfer, transformers, resource nodes, etc., and combinations thereof. The transmission cable age, insulation type, capacitance and reactive power elements, material age and type, degradation, bending radius, etc., and combinations thereof are all factors used in modeling and will also affect the actual empirical measurements or data. Empirical data is characterizing the distribution environment so that the modeling is more accurate. Self-correcting algorithms are employed in the model, which consider the empirical data relating to the distribution environment, including but not limited to temperature, humidity, physical environment factors (e.g., connector/connection, etc.), and combinations.

Timing for EMS is set by the governing body for frequency response, reserves, etc. The telemetry is set by industry practice and governing body(ies) (including NERC, FERC, etc., in USA), and may vary by geographic location, country, etc. By way of example, European countries transmit 3-phase power to all endpoints and service attachment points, including small residential and commercial accounts, and operate at 50 Hz standards (by way of contrast and comparison, the USA operates at 60 Hz standards).

Ability to project lost revenues without disadvantaging the consumer and making whole transmission and distribution companies, especially residential consumers of electric power from the grid, for example in the case of utility wherein the customer is charged any fees associated with the inefficiency of the network, even where those inefficiencies may be due to the lack of maintenance or upgrades to the system, or to natural disasters, or the inability to maintain frequency or voltage or grid stability in accordance with requirements of FERC, NERC, etc. The utility was not assessed a NERC financial penalty for its failure to assure and maintain grid stability and operations. The prior art smart meter infrastructure that has a 15-minute interval (or greater) data daily cannot settle or transmit the information to calculate the capacities or losses in the transmission or distribution system, or the faults in the system, or faults of the generation system, because they provide past data only for modeling, rather than dynamic modeling, as with the present invention. The present invention provides modeling as well as real-time results to maximize the efficiencies of the system while providing consumers control over consumption by being able to buy, sell, trade, exchange, barter, and combinations, with real-time or near real-time data. So instead of waiting 15 minutes for the next KWP, the present invention allows for near real-time settlement at less than 15 minute intervals, including the electronic financial settlement therefor, so that the consumer or supplier for the grid (provided through at least one active grid element) can "check-out" immediately and track spending, just like with consumer products for tracking any other expenditures, and automated check outs, payments, and statement reviews, as in online banking.

The present invention provides for mobile devices used for updating PSV, meter, etc., which are also used by consumers and businesses for real-time review of financial information on their respective accounts, make changes to profiles, settings, and preferences.

Pass-through individual coordinators, or linked coordinators, which are connected and feed into one or more databases, preferably consider all attributes for curtailment, supply, profiles, price, etc., and combinations thereof for the grid elements that communicate with the coordinators. TDSP subsystems provides for master SCADA information, market (ISO or vertically integrated) information, that are communicated with the EMS. Preferably, all systems are linked together with SOA, with a communications network for sharing data, information, etc., preferably Ethernet, according to the present invention. The ISO and TDSP produce the information for the market, which is communicated via network to the coordinator(s). The EMS has ICCP associated with the bus; the ISO provides for grid stability, pricing, etc. The TDSP provides for grid health, losses (reported at the electrical bus). The present invention further provides for resource settlement nodes associated with the grid resource nodes, where the generators or supply sources connect to the electrical power grid. The present invention provides for financial settlement generating transactions at any grid element attachment point, as well as, and including the resource settlement nodes. ALD, ASD, and/or coordinator(s) communicate with the grid elements associated with supply or generation for the grid, and all are connected, both in electric power grid transmission and communication network connection, to a resource node. Grid elements may further include (but are not limited to) transmission, transformers, end points, smart meters, attachment points, and combinations. Preferably, all grid elements have geodetic references associated with them. The transaction for financial settlement for grid elements occurs at the supplier and/or consumer points of connection to the grid. Settlement at the grid elements, in any location associated with grid element participation in the grid, is provided by the present invention.

Outside the electrical bus or substation within the electric power grid, the financial transaction subsystem provides information between the subsystems and from the electrical bus to the market. Since the present invention's settlement processor provides for clearing of financial settlement data at or less than 15 minute increments, at 15 minute intervals or increments, with better and more accurate data than with any prior art systems, customers (or owners of the grid elements participating in the electric power grid) clear the market with a better price for power supplied to the grid and also pay less for energy consumed (demand) from the grid supply. This occurs because inefficiencies are factored out or reduced in terms of allocation to those grid elements, control generation, control usage/consumption, make informed decisions about participation, or based upon profiles, automatically participate. All information automatically clears and settles, i.e., the systems and methods of the present invention automatically provide a financial settlement for each active grid element for its participation in the electric power grid, to the grid element owner, with communications through the coordinator and with settlement through the settlement processor as described herein and illustrated in FIG. 1.

By way of contrast to the prior art, wherein inefficiencies are spread amongst all participants (e.g., the leaks out of the lakes and pipes), whether they are consuming or supplying, the present invention systems and methods provide for each of the grid elements that are registered and participating within the financial settlement system to have improved accuracy of data relating to the participation, thereby reducing or eliminating the inefficiency "spread" losses that would have been associated with those grid elements under the state of the art distribution. Thus the present invention provides solution for the longstanding, unmet needs for participating grid element owners to supply empirical data relating to their participation that directly evidences the specific losses, if any, that are directly related to their participation. Improved modeling based upon data provided for less than 15 minute intervals is provided, and eventually, modeling is eliminated due to the supply of real-time data for actual participation, rather than assumptions associated with modeling, as exists in the prior art. So then the inefficiencies are accurately associated with the loss points and grid elements that function inefficiently, rather than assuming distribution on a pro-rata basis to all participating grid elements. Notably, even nonparticipating grid elements may be assessed for losses and inefficiencies if they are registered with the grid (e.g., power consuming customers are assessed a general charge even if they do not consumer power during a predetermined billing period, which is generally at 30-day intervals).

Manual settlement using spreadsheets is still used today; however, even in the case of manual settlement, the present invention provides for improved accuracy and timeliness of the financial settlement of the participation of the grid element.

Settlement for consumers of electric power of the grid is considered within the scope of the present invention. Rate plans include tracking consumption patterns and profiles. Customizable plans are developed on a per-market-consumer basis under the present invention systems and methods. Thus, grid elements participating in the systems and methods according to the present invention include electric power consumers having at least one power consuming device, and at least one registered account associated with a geodetic location of the at least one power-consuming device.

Aggregation of settlement by power consuming devices for a single consumer is also provided according to the systems and methods of the present invention. Also and alternatively, classes of customers may be grouped by consumption to provide an aggregated KWP by PTB unit(s) that maximize the ability of the consumers to afford the plans they want, and for utilities and/or grid operators to predict and to manage the power supplied over the grid to consumers. By way of comparison, real-time settlements and customizable plans for electric power consumption for registered grid elements (and correspondingly, their owners) are provided similar to mobile telephone rate plans customized or grouped for consumers having similar patterns, profiles, and/or geographic locations.

It should be noted that many terms and acronyms are used in this description that are well-defined in the telecommunications and/or computer networking industries and are well understood by persons skilled in these arts, and in electric power management arts. Complete descriptions of these terms and acronyms, whether defining a telecommunications standard or protocol, can be found in readily available telecommunications standards and literature and are not described in more detail herein.

It will be appreciated that embodiments or components of the systems described herein may be comprised of one or more conventional processors and unique stored program instructions that control the one or more processors to implement, in conjunction with certain non-processor circuits, some, most, or all of the functions for managing power load and/or supply distribution, and tracking and controlling individual subscriber power consumption and savings, and power supply in one or more power load and/or supply management systems. The non-processor circuits may include, but are not limited to, radio receivers, radio transmitters, antennas, modems, signal drivers, clock circuits, power source circuits, relays, meters, sub-meters, smart breakers, current sensors, and customer input devices. As such, these functions may be interpreted as steps of a method to distribute information and control signals between devices in a power load and/or supply management system. Alternatively, some or all functions could be implemented by a state machine that has no stored program instructions, or in one or more application specific integrated circuits (ASICs), in which each function or some combinations of functions are implemented as custom logic. Of course, a combination of the two approaches could be used. Thus, methods and means for these functions have been described herein. Further, it is expected that one of ordinary skill in the art, notwithstanding possibly significant effort and many design choices motivated by, for example, available time, current technology, and economic considerations, when guided by the concepts and principles disclosed herein, will be readily capable of generating such software instructions, programs and integrated circuits (ICs), and appropriately arranging and functionally integrating such non-processor circuits, without undue experimentation.

Additionally, measurement, verification, and settlement for the PSV for those market participants involved in the power management of the system is further included in the application of the present invention. Also, the systems, methods, and apparatus of the present invention may further include a database, a processor, software operable thereon, and interfaces to outside market participants that provide for capacity reservation of the distribution and transmission systems.

In embodiments of the present invention, supply and/or load curtailment as supply active grid elements may further include additional components to facilitate their automatic registration with the systems, methods, and apparatus of the present invention. Furthermore, messaging for registration between these active grid elements and the Coordinator and/or ASD may include an initial messaging for the first registration communication that provides information necessary for activation, operation, and integration with the electric power grid, including all future messaging, prioritization, profiles, updates, upgrades, modifications, settlement, security, and combinations thereof. The Coordinator, following the initial messaging from the active grid elements, may optionally provide an "energy cookie" that functions to facilitate the activities of the Coordinator for management, control, messaging, and matching to maintain and balance the EMS requirements with those of the electric power grid and all of the registered grid elements that are transformed into active grid elements thereon.

In the foregoing specification, the present invention has been described with reference to specific embodiments. However, one of ordinary skill in the art will appreciate that various modifications and changes may be made without departing from the spirit and scope of the present invention as set forth in the appended claims. For example, the present invention is applicable for managing the distribution of power from utility companies to subscribing customers using any number of IP-based or other communication methods. Additionally, the functions of specific modules within the server and/or active grid elements may be performed by one or more equivalent means. Accordingly, the specification and drawings are to be regarded in an illustrative rather than a restrictive sense, and all such modifications are intended to be included within the scope of the present invention.

Benefits, other advantages, and solutions to problems have been described above with regard to specific embodiments of the present invention. However, the benefits, advantages, solutions to problems, and any active grid elements that may cause or result in such benefits, advantages, or solutions to become more pronounced are not to be construed as a critical, required, or essential feature or element of any or all the claims. The invention is defined solely by the appended claims including any amendments made during the pendency of this application and all equivalents of those claims as issued.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A system for market-based financial settlement of transactions within an electric power grid, comprising:
   a settlement processor;
   wherein the settlement processor receives Internet Protocol (IP)-based messages in real-time or in predetermined time intervals from at least one active grid element configured for network communication with the settlement processor via at least one coordinator;
   wherein the at least one active grid element generates revenue grade metrology data based on measurement and verification for a participation of the at least one active grid element in the electric power grid;
   wherein the settlement processor provides a market-based financial settlement message based upon the revenue grade metrology data and a quantifying market rate for monetization for any unit of kilowatts with respect to time.

2. The system of claim 1, wherein the quantifying market rate for monetization for any unit of kilowatts with respect to time is provided by at least one kilowatt packet unit, wherein each KWP unit comprises measured data transformed into market settlement data used for financial settlement for an electric power load, an electric power supply, or transmission distribution service provider (TDSP) corresponding to the participation of the at least one active grid element in the electric power grid.

3. The system of claim 1, wherein the market-based financial settlement message is further based on a systematic unit for addressing power curtailment or power supply for providing grid stability or grid reliability.

4. The system of claim 1, wherein the at least one active grid element further includes a multiplicity of grid elements that aggregate or integrate through a master grid element or a virtual grid element.

5. The system of claim 4, wherein the master grid element or the virtual grid element represents a participation of the multiplicity of grid elements with an aggregated unit representing the quantifying market rate for monetization for any unit of kilowatts with respect to time.

6. The system of claim 4, wherein the multiplicity of grid elements, upon aggregation or integration, transform into sub-grid elements.

7. The system of claim 1, wherein the at least one active grid element has a unique IP address for the market-based financial settlement.

8. The system of claim 1, wherein the at least one active grid element is an electrical device that consumes power from the electric power grid, provides power to the electric power grid, or measures power consumed from or supplied to the electric power grid.

9. The system of claim 1, wherein the at least one active grid element includes at least one environmentally-dependent device.

10. The system of claim 1, further comprising a database operable to store registration information of the at least one active grid element for predetermined periods of time for financial settlement associated with the at least one active grid element, and information relating to financial settlement of the participation of the at least one active grid element, and settled measurements transformed from raw measurement data.

11. The system of claim 1, further comprising a security interface associated with the at least one active grid element.

12. The system of claim 1, wherein the market-based financial settlement message further comprises a geodetic reference, a grid element identifier, a grid element type, a grid element function, a grid element capacity, a grid element profile, a grid element attachment point reference, a KWP value, a grid element power supply value (PSV), a grid element power trade block (PTB) value, a grid element balancing authority association, a grid element owner identifier, or a grid element compatibility identifier.

13. The system of claim 1, wherein the market-based financial settlement message is based on factors for grid stability-based pricing, factors for operating reserves-based pricing, or factors considering peak and off-peak timing.

14. A method for market-based settlement of transactions within an electric power grid, comprising:
   a settlement processor receiving revenue grade metrology data for a participation of at least one grid element in the electric power grid based on measurement and verification; and
   the settlement processor providing a market-based financial settlement message based upon the revenue grade metrology data and a quantifying market rate for monetization for any unit of kilowatts with respect to time;
   wherein the settlement processor receives revenue grade metrology data in real-time or at predetermined time intervals.

15. The method of claim 14, wherein the settlement processor receives the revenue grade metrology through an Internet Protocol (IP)-based message.

16. A system for market-based financial settlement of transactions within an electric power grid, comprising:
   a settlement processor; and
   at least one coordinator,
   wherein the settlement processor receives messages in real-time or in predetermined time intervals from at least one active grid element configured for network communication with the settlement processor via the at least one coordinator;
   wherein the at least one active grid element generates revenue grade metrology data based on measurement and verification for a participation of the at least one active grid element in the electric power grid;
   wherein the settlement processor provides a market-based financial settlement message based upon the revenue grade metrology data and a quantifying market rate for monetization for any unit of kilowatts with respect to time.

17. The system of claim 16, further comprising an Internet Protocol (IP)-based interface that facilitates communication with the at least one active grid element.

18. The system of claim 16, wherein the at least one active grid element includes at least one environmentally-dependent device.

19. The system of claim 16, wherein the settlement processor is operable to receive updates regarding at least one attribute of the at least one active grid element from the at least one active grid element.

20. The system of claim 16, wherein the at least one active grid element includes a master grid element, wherein the master grid element represents a participation of the multiplicity of grid elements with aggregated revenue grade metrology data for the participation of the multiplicity of grid elements.

* * * * *